US012659404B2

(12) United States Patent
Furuta et al.

(10) Patent No.: US 12,659,404 B2
(45) Date of Patent: Jun. 16, 2026

(54) NON-TRANSITORY COMPUTER-READABLE RECORDING MEDIUM, INFORMATION PROCESSING METHOD, AND TERMINAL

(71) Applicant: LY Corporation, Tokyo (JP)

(72) Inventors: Mieko Furuta, Tokyo (JP); Takuro Mori, Tokyo (JP); Misaki Iki, Tokyo (JP)

(73) Assignee: LY CORPORATION, Tokyo (JP)

( * ) Notice: Subject to any disclaimer, the term of this patent is extended or adjusted under 35 U.S.C. 154(b) by 102 days.

(21) Appl. No.: 18/428,351

(22) Filed: Jan. 31, 2024

(65) Prior Publication Data

US 2024/0179240 A1     May 30, 2024

Related U.S. Application Data

(63) Continuation of application No. PCT/JP2022/019572, filed on May 6, 2022.

(30) Foreign Application Priority Data

Jul. 31, 2021     (JP) ................................. 2021-126345

(51) Int. Cl.
  *H04M 3/42*     (2006.01)
  *H04N 7/15*     (2006.01)
(52) U.S. Cl.
  CPC ........ *H04M 3/42017* (2013.01); *H04N 7/152* (2013.01)
(58) Field of Classification Search
  CPC ............... H04M 3/42017; H04M 1/00; H04M 1/72436; H04N 7/152; G06F 3/16;
      (Continued)

(56) References Cited

U.S. PATENT DOCUMENTS 10,680,840 B2 *   6/2020   Jonas ................... H04L 12/1822
11,140,257 B1 *   10/2021   Voss ...................... H04L 51/046
        (Continued)

FOREIGN PATENT DOCUMENTS

JP        2001-325047 A      11/2001
KR     10-2006-0103049 A       9/2006
        (Continued)

OTHER PUBLICATIONS

Written Opinion PCT/ISA/237 for International Application No. PCT/JP2022/019572 dated Aug. 2, 2022 (English translation provided).

(Continued)

*Primary Examiner* — Akelaw Teshale
(74) *Attorney, Agent, or Firm* — Harness, Dickey & Pierce, P.L.C.

(57)     ABSTRACT

A non-transitory computer-readable recording medium storing a program, which when executed by a processor of a terminal, cause the terminal to perform a process may be provided. The process may include displaying, on a display unit of the terminal, a chat room including a user of the terminal and a first user of a first terminal, the terminal and the first terminal being different from the terminal, and displaying, in the chat room, call information pertaining to a call between at least the user and the first user, wherein the call information includes sound information pertaining to sound.

21 Claims, 41 Drawing Sheets

(58) Field of Classification Search
CPC ......... G06F 13/00; G06F 3/048; H04L 51/04;
H04L 15/04
See application file for complete search history.

(56) References Cited

U.S. PATENT DOCUMENTS

| | | | | |
|---|---|---|---|---|
| 2018/0309801 A1* | 10/2018 | Rathod | ............... | H04M 3/5175 |
| 2020/0313920 A1* | 10/2020 | Koh | ..................... | H04L 51/046 |
| 2021/0021649 A1* | 1/2021 | Rathod | ............... | H04L 65/1076 |
| 2022/0353216 A1* | 11/2022 | Chen | ..................... | H04M 1/663 |

FOREIGN PATENT DOCUMENTS

| | | |
|---|---|---|
| KR | 10-2017-0118275 A1 | 2/2017 |
| WO | WO-2016/135980 A | 9/2016 |

OTHER PUBLICATIONS

Korean Office Action mailed on Jul. 11, 2025 for the corresponding Korean Patent Application No. 10-2024-7004241.
International Search Report mailed Aug. 2, 2022 issued in PCT/JP2002/019572.
Notice of Reasons for Refusal for Japanese Patent Application No. 2021-126345 dated Jul. 26, 2022.
Notice of Reasons for Refusal for Japanese Patent Application No. 2022-175385 dated Feb. 7, 2023.
Written Opinion PCT/ISA/237 for International Application No. PCT/JP2022/019572 dated Aug. 2, 2022.
Decision of Refusal mailed on Mar. 20, 2026 for the corresponding Korean Patent Application No. 10-2024-7004241.

* cited by examiner

| Control unit | 11 |
| Application Management Processing unit | 111 |

| Storage unit | 15 |
| Application Management Processing program | 151 |
| Account Registration data | 153 |
| Call Notification Sound Registration data | 155 |
| Account Management database | 157 |

153

| User Name | Application ID | Other Registration Information |
|---|---|---|
| A.A | U0001 | { ⋯ } |
| B.B | U0002 | { ⋯ } |
| C.C | U0003 | { ⋯ } |
| D.D | U0004 | { ⋯ } |
| ⋮ | ⋮ | ⋮ |

155

| Call Notification Sound ID | Call Notification Sound Name | Call Notification Sound URI |
|---|---|---|
| SND001 | System Sound 01 | https://server/sounds/system01.wav |
| SND002 | System Sound 02 | https://server/sounds/system02.wav |
| SND003 | System Sound 03 | https://server/sounds/system03.wav |
| SND004 | System Sound 04 | https://server/sounds/system04.wav |
| ⋮ | ⋮ | ⋮ |

Account Management data

| Application ID | U0002 |
|---|---|

| Call Notification Sound Setting data | |
|---|---|
| Notification Sound type | Call Notification Sound ID |
| Ringtone | SND002 |
| Calling Tone | SND001 |

| User-Specific Call Notification Sound Setting data | | |
|---|---|---|
| Notification Sound type | Call Notification Sound ID | Call Origin Application ID |
| Calling Tone | SND010 | U0001 |
| Ringtone | SND008 | U0001 |
| Ringtone | SND009 | U0003 |
| ⋮ | ⋮ | ⋮ |

159

Music Piece Management data

| Album ID | AL02451 |
|---|---|
| Album Name | New Fusion Jazz |
| Artist ID | ATT0255 |
| Album Artist Name | DEF Band |
| Album Art URI | http://music/art/al02451.jpg |
| Other Information | {···} |

| Track Management data | | | |
|---|---|---|---|
| Track No. | Track Name | Artist Name | Track Data URI |
| 01 | Swing MNO | DEF Band | {···} |
| 02 | Octet MNO | DEF Band | {···} |
| 03 | Riff MNO | DEF Band & G | {···} |
| ··· | ··· | ··· | ··· |

Account Management data

| Application ID | U0002 |
|---|---|

| Call Notification Sound Setting data | |
|---|---|
| Notification Sound type | Call Notification Sound ID |
| Ringtone | SND002 |
| Calling Tone | AL02451-01 |

| Playlist Management data | |
|---|---|
| Music Piece Order No. | Music Piece ID |
| 01 | AL19932-02 |
| 02 | AL02451-01 |
| 03 | AL03992-04 |
| ⋮ | ⋮ |

FIG.4-2

| Display Pattern | Terminal 20 of call origin account | Terminal 20 of call destination account |
|---|---|---|
| (A)×(A) | Calling Tone for call origin account | Calling Tone for call origin account |
| (A)×(B) | Calling Tone for call origin account | Calling Tone for call destination account |
| (A)×(C) | Calling Tone for call origin account | Ringtone for call origin account |
| (A)×(D) | Calling Tone for call origin account | Ringtone for call destination account |
| (B)×(A) | Calling Tone for call destination account | Calling Tone for call origin account |
| (B)×(B) | Calling Tone for call destination account | Calling Tone for call destination account |
| (B)×(C) | Calling Tone for call destination account | Ringtone for call origin account |
| (B)×(D) | Calling Tone for call destination account | Ringtone for call destination account |
| (C)×(A) | Ringtone for call origin account | Calling Tone for call origin account |
| (C)×(B) | Ringtone for call origin account | Calling Tone for call destination account |
| (C)×(C) | Ringtone for call origin account | Ringtone for call origin account |
| (C)×(D) | Ringtone for call origin account | Ringtone for call destination account |
| (D)×(A) | Ringtone for call destination account | Calling Tone for call origin account |
| (D)×(B) | Ringtone for call destination account | Calling Tone for call destination account |
| (D)×(C) | Ringtone for call destination account | Ringtone for call origin account |
| (D)×(D) | Ringtone for call destination account | Ringtone for call destination account |

FIG.5-4

NON-TRANSITORY COMPUTER-READABLE RECORDING MEDIUM, INFORMATION PROCESSING METHOD, AND TERMINAL

CROSS-REFERENCE TO RELATED APPLICATIONS

This application is a national phase under 35 U.S.C. § 371 of PCT International Application No. PCT/JP2022/019572 which has an international filing date of May 6, 2022, which claims priority to Japanese Application No. 2021-126345, filed Jul. 31, 2021, the entire contents of each of which are hereby incorporated by reference.

BACKGROUND

Technical Field

This disclosure relates to non-transitory computer-readable recording media storing a program, information processing methods, terminals, and the like.

Related Art

These days, services that enable between-terminal calls using voice over IP (VoIP) technology and the like are becoming popular through applications that can be run on terminals such as smartphones.

SUMMARY

According to an example embodiment, there is provided a non-transitory computer-readable recording medium storing a program, which when executed by a processor of a terminal to perform, causes the terminal to perform a process. The process includes displaying, on a display unit of the terminal, a chat room including a user of the terminal and a first user of a first terminal, the first terminal being different from the terminal, and displaying, in the chat room, call information pertaining to a call between at least the user and the first user, wherein the call information includes sound information pertaining to sound.

According to an example embodiment, an information processing method of a terminal includes displaying, on a display of the terminal, a chat room including a user of the terminal and a first user of a first terminal, the first terminal being different from the terminal, and displaying, in the chat room, call information pertaining to a call between at least the user and the first user, wherein the call information includes sound information pertaining to sound.

According to an example embodiment, a terminal includes a display unit configured to display a chat room including a user of the terminal and a first user of a first terminal, the first terminal being different from the terminal, and display, in the chat room, call information pertaining to a call between at least the user and the first user, wherein the call information includes sound information pertaining to sound.

BRIEF DESCRIPTION OF THE DRAWING

FIG. 1-2: A figure showing an example of functions realized by a control unit of a server included in the communication system of FIG. 1-1.

FIG. 1-3: A figure showing an example of information and the like stored in a storage unit of the server included in the communication system of FIG. 1-1.

FIG. 1-4: A figure showing an example of account registration data stored in the storage unit of the server illustrated in FIG. 1-3.

FIG. 1-5: A figure showing an example of call notification sound registration data stored in the storage unit of the server illustrated in FIG. 1-3.

FIG. 1-6: A figure showing an example of account management database stored in the storage unit of the server illustrated in FIG. 1-3.

FIG. 1-7: A figure showing an example of functions realized by a control unit of a terminal included in the communication system of FIG. 1-1.

FIG. 1-8: A figure showing an example of information and the like stored in the storage unit of the terminal included in the communication system of FIG. 1-1.

FIG. 1-9: A figure showing an example of a screen displayed on a display unit of the terminal according to a first example embodiment.

FIG. 1-10: A figure showing an example of a screen displayed on the display unit of the terminal according to the first example embodiment.

FIG. 1-11: A flowchart showing an example of a flow of processing performed by each device according to the first example embodiment.

FIG. 1-12: A figure showing an example of a screen displayed on the display unit of a terminal according to a variant of the first example embodiment.

FIG. 1-13: A figure showing an example of a screen displayed on the display unit of the terminal according to a variant of the first example embodiment.

FIG. 1-14: A figure showing an example of a screen displayed on the display unit of the terminal according to a variant of the first example embodiment.

FIG. 1-15: A flowchart showing an example of the flow of processes performed by each device according to a variant of the example embodiment.

FIG. 2-1: A figure showing an example of a screen displayed on the display unit of the terminal according to a second example embodiment.

FIG. 2-2: A flowchart showing an example of the processing performed by each device according to the second example embodiment.

FIG. 2-3: A figure showing an example of a screen displayed on the display unit of the terminal according to a variant of the second example embodiment.

FIG. 2-4: A figure showing an example of account management database according to a variant of the second example embodiment.

FIG. 2-5: A figure showing an example of a screen displayed on the display unit of the terminal according to a variant of the second example embodiment.

FIG. 2-6: A figure showing an example of a screen displayed on the display unit of the terminal according to a variant of the second example embodiment.

FIG. 2-7: A figure showing an example of a screen displayed on the display unit of the terminal according to a variant of the second example embodiment.

FIG. 2-8: A figure showing an example of a screen displayed on the display unit of the terminal according to a variant of the second example embodiment.

FIG. 3-1: A figure showing an example of information and the like stored in the storage unit of the server according to a third example embodiment.

FIG. 3-2: A figure showing an example of music piece management database according to the third example embodiment.

FIG. 3-3: A figure showing an example of account management database according to the third example embodiment.

FIG. 3-4: A figure showing an example of a screen displayed on the display unit of the terminal according to the third example embodiment.

FIG. 3-5: A figure showing an example of a screen displayed on the display unit of the terminal according to the third example embodiment.

FIG. 3-6: A flowchart showing an example of the flow of processing performed by each device according to the third example embodiment.

FIG. 3-7: A figure showing an example of a screen displayed on the display unit of the terminal according to a variant of the third example embodiment.

FIG. 3-8: A figure showing an example of a screen displayed on the display unit of the terminal according to a variant of the third example embodiment.

FIG. 3-9: A flowchart showing an example of the flow of processing performed by each device according to the variant illustrated in FIG. 3-8.

FIG. 4-1: A figure showing an example of a screen displayed on the display unit of the terminal according to a fourth example embodiment.

FIG. 4-2: A figure showing an example of a combination of call notification sound information sent to the terminal according to the fourth example embodiment.

FIG. 4-3: A figure showing an example of a screen displayed on the display unit of the terminal for a variant of the fourth example embodiment.

FIG. 4-4: A flowchart showing an example of the flow of processing performed by each device according to the variant of the fourth example embodiment illustrated in FIG. 4-3.

FIG. 5-1: A figure showing an example of a screen displayed on the display unit of the terminal according to a fifth example embodiment.

FIG. 5-2: A flowchart showing an example of the flow of processing performed by each device according to the fifth example embodiment.

FIG. 5-3: A figure showing an example of a screen displayed on the display unit of the terminal according to a variant of the fifth example embodiment.

FIG. 5-4: A figure showing an example of a screen displayed on the display unit of the terminal according to a variant of the fifth example embodiment.

FIG. 5-5: A figure showing an example of a screen displayed on the display unit of the terminal according to a variant of the fifth example embodiment.

FIG. 6-1: A figure showing an example of a screen displayed on the display unit of the terminal according to a sixth example embodiment.

FIG. 6-2: A figure showing an example of a screen displayed on the display unit of the terminal according to a variant of the sixth example embodiment.

DETAILED DESCRIPTION

<Compliance with Legal Matters>

Figure 1:
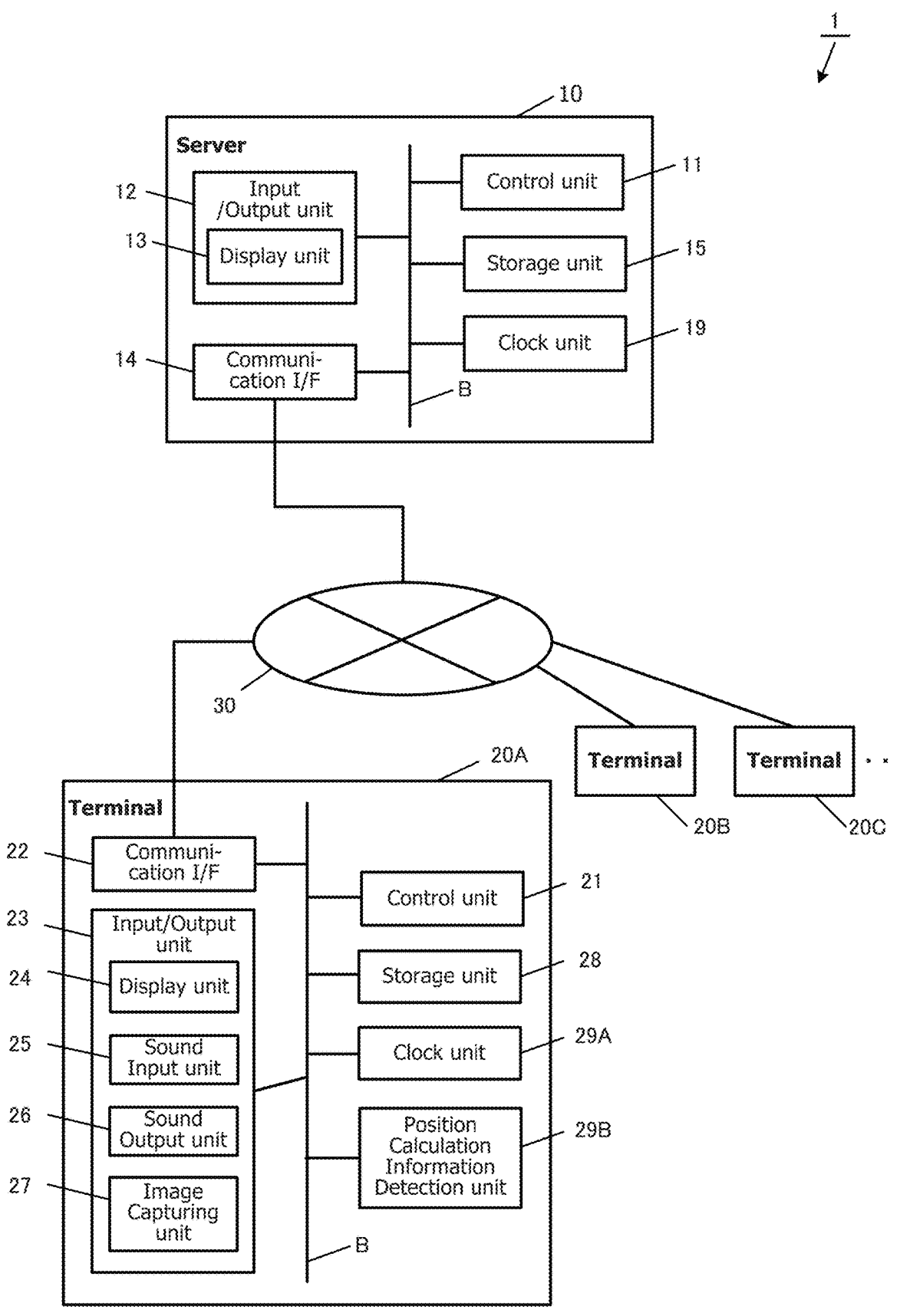
FIG. 1-1: A figure showing an example of the system configuration of a communication system according to an example embodiment.

It should be noted that the disclosures contained herein are subject to compliance with the legal matters of the implementing country desired (or necessary) for the implementation of the disclosures, including the confidentiality of communications.

Embodiments

Note that although "as an example, not a limitation" is used in some parts of the description for clarification, not just the relevant parts but in the entirety of the example embodiments described below, it is not meant to limit the inventive concepts to the content of the description.

Some example embodiments for implementing programs and the like related to this disclosure will be described with reference to the drawings.

A system can be, as an example, not a limitation, defined as one that includes multiple devices.

The multiple devices may be a combination of the same type of devices, a combination of different types of devices, or a combination of the same type of devices and different types of devices.

A system can be, as an example, not a limitation, thought of as multiple devices working together to perform some kinds of processing.

In addition, a system pertaining to a client (client device) and a server can be considered as at least one of the following, as an example, not a limitation.

(1) terminal(s) & server(s)

(2) server(s)

(3) terminal(s)

(1) terminal(s) & server(s) is, as an example, not a limitation, a system that includes at least one terminal and at least one server. One example of this is a client-server system.

The server includes, as an example, not a limitation, the following device(s) or it may be a single device or a combination of multiple devices.

For example, the server may include at least one processor (as an example, not a limitation, CPU: Central Processing Unit, GPU: Graphics Processing Unit, APU: Accelerated Processing Unit, or DSP: Digital Signal Processor), ASIC: Application Specific Integrated Circuit, FPGA: Field Programmable Gate Array, computer equipment (processor+memory), a control device, an arithmetic device, a processing device, etc., and may be configured with multiple of the same kind of any device (as an example, not a limitation, CPU+CPU, homogeneous multi-core processor, etc.) or multiple of different kinds of any devices (as an example, not a limitation, CPU+DSP, heterogeneous multi-core processor, etc.), or a combination of multiple devices (as an example, not a limitation, processor+computer device, processor+computing device, heterogeneous multiple devices, etc.).The processor may also be a virtual processor.

Upon performing a certain processing by the server, if the server is configured with a single device, the processing described in this disclosure is performed by the single device. If the server is configured with multiple devices, it may be configured so that some of the processing is performed by one device and other processing is performed by the other device(s). As an example, not a limitation, if the system includes a processor and an arithmetic device, the processor may be configured to execute a first processing and the arithmetic device is configured to execute a second processing.

If the server is configured with multiple devices, it may be configured so that the devices are physically separated from each other.

The server functionality may also be provided in the form of platform as a service (PaaS), infrastructure as a service (IaaS), or software as a service (SaaS) in cloud computing, as an example, not a limitation.

The control unit of the system can be at least one of the control unit of the terminal and the control unit of the server. In other words, as an example, not a limitation, the control unit of the system can be either (1A) only the control unit of the terminal, (1B) only the control unit of the server, or (1C) both the control unit of the terminal and the control unit of the server.

In addition, the control and processing (hereinafter comprehensively referred to as "control and the like") performed by the control unit of the system may be performed (1A) only by the control unit of the terminal, (1B) only by the control unit of the server, or (1C) by both the control unit of the terminal and the control unit of the server.

In (1C), as an example, not a limitation, some of the control and the like performed by the control unit of the system may be performed by the control unit of the terminal, and the remaining control and the like may be performed by the control unit of the server. In this case, the allocation (assignment) of control and the like may be equally divided, or it may be allocated in different proportions instead of being equally divided.

Also, if the server includes a single device, the communication unit of the server may refer to the communication unit itself provided by the single device. If the server includes multiple devices, the communication unit of the server may refer to the communication unit of each of the devices.

As an example, not a limitation, if the server includes a first device and a second device, the first device has a first communication unit and the second device has a second communication unit. Thus, the communication unit of the server may include the first and second communication units, as a concept.

(2) Server(s) may be, as an example, not a limitation, of a system including multiple servers (hereinafter referred to as a "server system"). In this case, the configuration of each server can be similarly applied to the configuration described above.

The control and the like performed by the server system may be performed by, among the multiple servers, (2A) only one server (2B) only the other server(s), or (2C) one server and the other server(s).

In (2C), as an example, not a limitation, some of the control and the like performed by the server system may be performed by one server, and the remaining control and the like may be performed by the other server(s). In this case, the allocation (assignment) of control and the like may be equally divided, or it may be allocated in different proportions instead of equally divided.

(3) terminal(s) can be a system including multiple terminals, as an example, not a limitation.

This system can be as an example, not a limitation, one of the followings:

a system that allows terminals to have the functionality of the server (distributed system). This can be realized using blockchain technology, as an example, not a limitation.

a system in which terminals communicate wirelessly with each other. This can be realized by using short-range wireless communication technology such as Bluetooth (registered trademark), as an example, not a limitation, and communicating in a P2P (peer-to-peer) method, etc.

The above is not limited to the control unit, but also applies to each functional unit such as the input/output unit, communication unit, storage unit, clock unit, etc., which can be components of the system.

The following example embodiments are an example, not a limitation, of a system that includes a terminal and a server (a client-server system as an example, not a limitation). The server system of (2) above can be applied as a server.

Instead of a system that includes a terminal and a server, it is also possible to apply the system described in (3) above, as an example, not a limitation, of a system that does not include a server.

Some example embodiments of the present disclosure can be configured based on the aforementioned blockchain technology, etc. As an example, not a limitation, the data stored and managed on the server described in some example embodiments is stored (stored) on the blockchain. The terminal can then generate a transaction to the blockchain, and when the transaction is approved on the blockchain, the data stored on the blockchain can be updated.

Even when the term "terminal" is used, this is not limited to the meaning of a terminal as a client device in client-server. In other words, terminal may include the concept of a device that is not in client-server.

In this description, the expression "by means of communication I/F" is used as appropriate. This may, as an example, not a limitation, indicate that the device sends and receives various types of information and data via the communication I/F (through the communication unit) based on control by the control unit (processor, etc.).

Pertaining to the terms "relate" or "associate", when "B related to A" or "B associated with A" are used herein, they may mean "B" that has some relationship to "A", as an example, not a limitation. Specific examples will be described below.

In this description, when a device performs processing for two or more objects, such as "sending A and B" and "receiving A and B," the two types of processing may include: one in which "A" and "B" shall be timed together (hereinafter referred to as "simultaneous") and "A" and "B" shall be timed apart (hereinafter referred to as "non-simultaneous").

As an example, not a limitation, the concept of sending the first and second information may include both timing-aligned transmission of the first and second information and timing-shifted transmission of the first and second information. In consideration of lag (time lag), "simultaneous" may include "almost simultaneous".

Even though processing for "A" and "B" are performed at different timings, this needs only to be done for "A" and "B," and the purpose of the processing does not necessarily have to be the same.

As an example, not a limitation, upon sending the first and second information as described above, it may be desired to send the first and second information, and may include a case where the first and second information are sent for the same purpose as well as a case where the first and second information are sent for different purposes.

In the following example embodiments, as one example of a service for users to chat (hereinafter referred to as "chat service"), a messaging service is illustrated. The application for realizing the chat service is referred to as "chat application" and the application for realizing the messaging service is referred to as "messaging application".

The chat application can allow users to chat in a chat room, as an example, not a limitation. The chat application can also allow users to make calls (voice calls, video calls, etc.) to each other, as an example, not a limitation.

The messaging service: MS (including instant messaging service: IMS) can also be considered as one form (a form) of social networking service: SNS. Therefore, a distinction may or may not be made between the messaging service and the social networking service. In other words, the messaging service may be included in social networking service.

In the following example embodiments, as an example of the messaging service, an instant messaging service: IMS (Instant Messaging Service), which sends and receives a content in the form of simple message between multiple devices (terminals as an example, not a limitation) via a server, is illustrated.

The instant messaging application can allow users to talk in a talk room, as an example, not a limitation. The instant messaging application can also allow users to make calls (e.g., voice calls, video calls, etc.) between users, as an example, not a limitation.

A chat room (a talk room, as an example, not a limitation) can be a UI (User Interface) or a GUI (Graphical User Interface) that allows each user to view a content sent and received between multiple user terminals.

The talk room can include a one-to-one user talk room (hereinafter referred to as "one-to-one talk room"), a group talk room for a group that includes multiple users (hereinafter referred to as "group talk room"), a talk room to a user corresponding to an official account (hereinafter referred to as "OA talk room"), and the like.

The one-to-one talk room may be managed as a talk room for one-to-one users or one-to-one accounts for data management purposes, or as a talk room for a group consisting of two users or two accounts.

The official account is an account of not a general user but a business user (an account of a user of a business), and the user of this official account can also send and receive contents (messages) to and from other devices via the server using a terminal similar to a general user terminal, as an example, not a limitation.

In this description, the content may be information sent from a source to a destination. The content may also be one or more pieces of content(s).

The content may include, as an example not limitation, a text content in the form of text, an image content in the form of image (e.g., still image and moving image), a sound content in the form of sound (e.g., voice) and the like.

In addition to the above, the content may include an operational content such as a button and an icon for user operation, link information (including, as an example, not a limitation, URI (Uniform Resource Identifier), etc.), and other link content.

The text may include, as an example, not a limitation, at least one of the following: national characters represented by character codes, extended characters, machine dependent characters, numbers, symbols, figures or signs.

The text may not include at least one of the above characters, extended characters, machine dependent characters, numbers, symbols, figures and signs, or may include other text.

The image may include at least one of various types of image information, such as an icon, a button, a stamp, a pictogram, a banner image or the like, as an example not a limitation.

In the following example embodiments, a music piece distribution service (Music Streaming Service) is illustrated as an example of a service for users to listen to music pieces.

The application for realizing the music piece distribution service is referred to as "music application".

The music application allows the user to listen to any music piece, as an example, not a limitation.

The music application may allow music pieces to be downloaded to the terminal and played offline on the terminal, or the music pieces may be streamed over a network. The music piece may be audio data or video data.

As a form for realizing the music piece distribution service (the music application), any of the following forms can be applied, as an example, not a limitation.

(A) A form that provides the music piece distribution service function as one function of the messaging application (B) A form that constitutes an application (integrated application) with functions of the music piece distribution service and the messaging service I A form in which the messaging application is configured as a separate application from the music application In the forms (A) and (B), as an example, not a limitation, the music piece distribution service provider can be the same as the messaging service provider.

One way to do this is to make the user account in the messaging application and the user account in the music application common accounts.

In this case, another way to do this is to automatically associate (link) the user account in the messaging application with the user account in the music application.

In the form (C), as an example, not a limitation, the music piece distribution service provider can be different from the messaging service provider.

In the form (C), the process of associating (linking) the user account in the messaging application with the user account in the music application can be performed.

Unlike the above, it is also possible to make the messaging service function as one of the functions of the music application.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination thereof. Likewise, A and/or B means A, B, or A and B.

First Example Embodiment

The first example embodiment is, as an example, not a limitation, is an example embodiment in which, by a user of one terminal 20 (hereinafter referred to as "terminal", as appropriate) and a user (hereinafter referred to as "first user", as appropriate) of another terminal 20 (hereinafter referred to as "first terminal", as appropriate), information pertaining to a calling tone or a ringtone of the call is displayed on the terminal based on the fact that a call has been made between the terminal and the first terminal.

"The "calling tone" can be a sound heard by a user at a call origin (a person placing the call) during the ringing of the call. The calling tone can be, as an example, not a limitation, a sound set by a user at the call destination.

The "ringtone" can be a sound heard by a user at a call destination (a person receiving the call) (the call destination party) during the ringing of the call. The ringtone can be, as an example, not a limitation, a sound set by a user at the destination.

As an example, not a limitation, if, in a messaging application, the call destination user has set "calling tone X"

as the calling tone, when the call origin user makes a call to the call destination user, the call origin user will, during the ringing of the call placed, hear the set "calling tone X", as the calling tone that has been set.

As an example, not a limitation, if the call destination user has set "ringtone Y" as the ringtone in the messaging application, when the call origin user makes a call to the call destination user, the call destination user hears "ringtone Y" during the call as the ringtone that has been set.

Hereafter, as an example, not a limitation, a calling tone and a ringtone are collectively referred to as "call notification sound".

The call notification sound is not limited to a calling tone or a ringtone. Specific examples are described below.

In the following, a source user account of a call, which is the person making the call, is referred to as "call origin account", and a destination user account of a call, which is the person receiving the call, is referred to as "call destination account".

In the following, as mentioned above, a business entity that provides the messaging service through the messaging application is referred to as "messaging service provider".

The messaging service provider can be described as a business operator of the messaging application or a business operator of the server 10.

It can also be described as a business operator of the messaging service in the sense that it is a business operator providing the messaging service.

In the following, the name of the messaging application is illustrated and described as "Messaging App" as appropriate.

The messaging application can be configured to allow one-to-one talk between accounts that are registered with the server 10 as friends, as an example, not a limitation. Also, as an example, not a limitation, the message application can be configured so that a group including two or more accounts can be formed, and group talk can be performed between the accounts included in the group.

The information described in the first example embodiment is applicable to the other example embodiments and variants thereof.

The same components as those previously described are indicated with the same symbols and are omitted from the description thereafter.

<System Configuration>

FIG. 1-1 shows an example of the system configuration of the communication system 1 in an example embodiment of the present disclosure.

In the communication system 1, as an example, not a limitation, a server 10 is connected to a plurality of terminals 20 (terminals 20A, 20B, 20C, . . . ) via network 30.

The server 10 has a function of providing a desired (or alternatively, predetermined) service (as an example, not a limitation, the messaging service, the music piece distribution service, etc.) to user-owned terminals 20 via network 30. The server 10 can be described as a messaging server, a music piece distribution server, etc. as an example, not a limitation.

In this example embodiment, the messaging service provider (operator) and the music piece distribution service provider (operators) are the users of the server 10.

The number of servers 10 and terminals 20 connected to the network 30 is not limited and can be any.

The terminal 20 (terminal 20A, terminal 20B, terminal 20C, . . . ) may be any information processing terminal capable of performing the functions described in each embodiment. The terminal 20 may be, as an example, not a limitation, a smartphone, a cellular phone (feature phone), a computer (as an example not limitation, desktop, laptop, tablet, etc.), a media computer platform (as an example, not a limitation, cable, satellite set-top box, digital video recorder), a handheld computing device (as an example, not a limitation, PDA (personal digital assistants), e-mail client, etc.), a wearable device (eyeglass-type device, watch-type device, etc.), a VR (Virtual Reality) terminal, a smart speaker (voice recognition device), or other types of computers or communication platforms. The terminal 20 may also be described as an information processing terminal.

The configuration of the terminal 20A, the terminal 20B and the terminal 20C may be identical, as an example, not a limitation. If desired or necessary, a terminal used by user X may or may not be expressed as terminal 20X, and user information in a given service which is associated with the user X or the terminal 20X, may or may not be expressed as user information X.

The user information is information of a user associated with an account used by the user in a given service. The user information includes, as an example, not a limitation, information associated with a use', such as user's name, user's icon image, user's age, user's gender, user's address, user's interests, user's identifier, etc., entered by the user or assigned by the given service, and any one or a combination of these may or may not be used.

The network 30 plays a role in connecting one or more terminals 20 and one or more servers 10. In other words, the network 30 is referred to as a communication network that provides a connection path so that the various devices mentioned above can send and receive data after the connecting of the above various devices.

One or more portions of the network 30 may or may not be a wired or wireless network. The network 30 may include, as an example, not a limitation, ad hoc network, intranet, extranet, virtual private network (VPNs), local area network (LAN), wireless LAN (WLAN), wide area network (WAN), wireless WAN (WWAN), metropolitan area network (MAN), part of the Internet, part of the Public Switched Telephone Network (PSTN), cellular telephone network, integrated service digital networks (ISDN), wireless LAN, LTE (long term evolution), CDMA (CDMA) long term evolution (LTE), code division multiple access (CDMA), Bluetooth (registered trademark), satellite communication and the like, or a combination of two or more of these. The network 30 can include one or more of the networks 30.

The server 10 (as an example, not a limitation, a server, information processing device, or information management device) has functions to provide desired (or alternatively, predetermined) services to the terminal 20. The server 10 may be any information processing device that can realize the functions described in a given example embodiment. The server 10 is, as an example not limitation, server device, computer (as an example not limitation, desktop, laptop, tablet, etc.), media computer platform (as an example not limitation, cable, satellite set top box, digital video recorder), handheld computer device (as an example not limitation, PDA, e-mail client and the like), or other types of computer or communication platform. The server 10 may also be described as an information processing device. The server 10 and the terminal 20 may or may not be described as an information processing device, respectively, if there is no need to distinguish between the server 10 and the terminal 20.

[Hardware (HW) Configuration] of Each Device]

Hereinafter, descriptions of the HW configuration of each device in the communication system 1 will be made.

(1) HW Configuration of Terminal

FIG. 1-1 shows an example of the HW configuration of the terminal 20. The terminal 20 has a control unit 21 (CPU: central processing unit), a storage unit 28, a communication I/F 22 (interface), an input/output unit 23, a clock unit 29A, and a position calculation information detection unit 29B. Each HW component of the terminal 20 is interconnected via a bus B as an example, not a limitation. It is not required to include all the components as the HW configuration of the terminal 20. As an example, not a limitation, the terminal 20 may or may not be configured such that an individual component or multiple components is/are removed.

The communication I/F 22 sends and receives various types of data via the network 30. The communication may be executed by either wired or wireless means, and any communication protocol may be used as long as it can execute communication with each other. The communication I/F 22 has a function of executing communication with various devices, such as the server 10, via the network 30. The communication I/F 22 sends various data to various devices such as server 10 according to instructions from the control unit 21. The communication I/F 22 also receives various data sent from various devices such as the server 10 and sends the data to the control unit 21. The communication I/F 22 may also be simply expressed as a communication unit. If the communication I/F 22 includes a physically structured circuit, it may also be expressed as a communication circuit.

The input/output unit 23 includes a device for inputting various operations to the terminal 20 and a device for outputting the processing results processed by the terminal 20, and the like. The input/output unit 23 may or may not be an integrated unit of the input unit and the output unit, or may or may not be separated into the input unit and the output unit.

The input unit is realized by any or a combination of all types of devices being capable of accepting input from a user and sending information pertaining to the input to the control unit 21. The input unit includes, as an example, not a limitation, hardware key such as touch panel, touch display, and keyboard, pointing device such as mouse, camera (operation input via moving images), and microphone (operation input via voice).

The output unit is realized by any or a combination of all types of devices being capable of outputting the processing results processed by the control unit 21. The output unit includes, as an example not limitation, touch panel, touch display, speaker (audio output), lens (as an example, not a limitation, 3D (three dimensions) output or hologram output), printer, etc.

As an example, not a limitation, the input/output unit 23 has a display unit 24, a sound input unit 25, a sound output unit 26, and an image capturing unit 27.

The display unit 24 is realized by any one or a combination of all types of devices being capable of displaying according to the display data written to the frame buffer. The display unit 24 can be a touch panel, touch display, monitor (as an example not limitation), liquid crystal display or OELD (organic electroluminescence display), head mounted display (HDM: Head Mounted Display), projection mapping, hologram, and devices capable of displaying images, text information, etc. in air (which may or may not be a vacuum). The display unit 24 may or may not be capable of displaying display data in 3D.

The sound input unit 25 is used to input sound data (including voice data. The same applies hereinafter). The sound input unit 25 includes a microphone or the like. The sound input unit 25 includes a microphone or the like.

The sound output unit 26 is used to output sound data. The sound output unit 26 includes a speaker or the like.

The image capturing unit 27 is used to capture image data (including still image data and moving image data. The same applies hereinafter). The image capturing unit 27 includes a camera or the like.

If the input/output unit 23 is a touch panel, the input/output unit 23 and the display unit 24 may be arranged opposite each other in approximately the same size and shape.

The clock unit 29A is a built-in clock of the terminal 20 and outputs time information (timekeeping information). The clock unit 29A includes a clock using a crystal oscillator, etc., as an example, not a limitation. The clock unit 29A can also be described as a timekeeping unit or a time information detection unit, as an example, not a limitation.

The clock unit 29A may or may not have a clock that applies the NITZ (Network Identity and Time Zone) standard or other standards.

The position calculation information detection unit 29B detects (measures) information desired or necessary for the control unit 21 to calculate (measure) the position of the terminal 20 itself (hereinafter referred to as "position calculation information"). The position calculation information detection unit 29B can be expressed as a position calculation sensor unit, as an example, not a limitation.

The position calculation information detection unit 29B includes, as an example, not a limitation, a satellite positioning sensor (satellite positioning unit), which is a sensor or unit to calculate the position of the terminal 20 using a satellite positioning system such as GPS (Global Positioning System), an inertial measurement sensor (inertial measurement unit (IMU)), which is a sensor or unit to calculate the position of the terminal 20 using an inertial navigation system, an ultra wide band (UWB) radio (Ultra Wide Band), and a satellite positioning sensor (satellite positioning unit), and the like.

The satellite positioning unit has, as an example, not a limitation, an RF receiver circuit that converts RF (Radio Frequency) signals including positioning satellite signals sent from a positioning satellite that are received by an antenna, which not shown in the figures, into digital signals, a baseband processing circuit that performs correlation processing, etc. on the digital signals output from the RF receiver circuit to acquire positioning satellite signals, and outputs satellite orbit data, time data, and other information extracted from the positioning satellite signals as position calculation information, and the like.

The inertial measurement unit has an inertial sensor, which is a sensor that detects information desired or necessary to calculate the position of the terminal 20 by inertial navigation calculation. The inertial sensor includes, as an example, not a limitation, a 3-axis acceleration sensor and a 3-axis gyro sensor, and output the acceleration detected by the acceleration sensor and the angular velocity detected by the gyro sensor as position calculation information.

The UWB positioning unit has, as an example, not a limitation, an ultra-wideband RF receiver circuit that converts an ultra-wideband RF (Radio Frequency) signal including an ultra-wideband pulse signal for positioning that is sent from a positioning beacon that is received by an antenna, which is not shown in the figures, into a digital signal, an ultra-wideband RF receiver circuit that calculates the relative position of the terminal 20 and the positioning beacon based on the digital signal output from the ultrawideband RF receiver circuit, and the like.

As an example, not a limitation, the UWB positioning unit may or may not make the terminal 20 function as a beacon for positioning by sending an ultra-wideband RF signal, including an ultra-wideband pulse signal for positioning, from an antenna, which is not shown in the figures.

As an example, not a limitation, the control unit 21 calculates the position of the terminal 20 itself at regular or specific timing based on the position calculation information detected by the position calculation information detection unit 29B. The position of the terminal is referred to as the "terminal position" and the calculated terminal position is referred to as the "calculated terminal position". The control unit 21 may or may not store the calculated terminal position in the storage unit 28 as calculated terminal position history data by associating the calculated terminal position with the date and time at which the calculated terminal position is calculated.

The control unit 21 has a physically structured circuit to perform the functions to be realized by the code or instructions contained in the program and is realized by a data processing unit built into the hardware, as an example, not a limitation. Therefore, the control unit 21 may or may not be described as a control circuit.

The control unit 21 includes, as an example, not a limitation, central processing unit (CPU), microprocessor, processor core, multiprocessor, ASIC (application-specific integrated circuit (ASIC), and field programmable gate array (FPGA).

The storage unit 28 has a function of storing various programs and various data required for the terminal 20 to operate. The storage unit 28 includes various storage media such as HDD (hard disk drive), SSD (solid state drive), flash memory, RAM (random access memory), ROM (read only memory), etc., as an example, not a limitation. The storage unit 28 may or may not be described as a memory.

The terminal 20 stores a program P in the storage unit 28, and by executing the program P, the control unit 21 implements processing as each unit included in the control unit 21. In other words, the program P stored in the storage unit 28 causes the terminal 20 to realize each function performed by the control unit 21. The program P may or may not be expressed as a program module.

(2) HW Configuration of the Server

FIG. 1-1 shows an example of the HW configuration of the server 10.

The server 10 has a control unit 11 (CPU), a storage unit 15, a communication I/F 14 (interface), an input/output unit 12, and a clock unit 19. Each component of the HW of the server 10 is interconnected via a bus B, as an example, not a limitation. The HW of the server 10 may not include all the components as a configuration of the HW of the server 10. As an example, not a limitation, the HW of the server 10 may or may not be configured such that an individual component or multiple components is/are removed.

The control unit 11 has a physically structured circuitry to perform the functions realized by the code or instructions contained in the program, and is realized by, as an example, not a limitation, data processing unit built into the hardware.

The control unit 11 is typically a central processing unit (CPU), and may or may not be a microprocessor, processor core, multiprocessor, ASIC, or FPGA, among others. In this disclosure, the control unit 11 is not limited to these.

The storage unit 15 has a function of storing various programs and data desired or necessary for the server 10 to operate. The storage unit 15 is realized by various storage media such as HDD, SSD, flash memory, and the like. However, in this disclosure, the storage unit 15 is not limited to these. The storage unit 15 may or may not be described as a memory.

The communication I/F 14 sends and receives various types of data via the network 30. The communication may be executed by either wired or wireless means, and any communication protocol may be used as long as it can execute communication with each other. The communication I/F 14 has the function of executing the communication with various devices, such as the terminal 20, via the network 30. The communication I/F 14 sends various data to various devices such as the terminal 20 according to instructions from the control unit 11. The communication I/F 14 also receives various data sent from various devices such as the terminal 20 and sends the data to the control unit 11. The communication I/F 14 may be expressed simply as a communication unit. If the communication I/F 14 includes a physically structured circuit, it may also be expressed as a communication circuit.

The input/output unit 12 includes a device for inputting various operations to the server 10 and a device for outputting the results of processes processed by the server 10. The input/output unit 12 may or may not be an integrated unit of the input unit and the output unit, or may or may not be separated into the input unit and the output unit.

The input unit is realized by any or a combination of all types of devices being capable of accepting input from a user and sending information pertaining to the input to the control unit 11. The input unit is typically realized by hardware key represented by keyboard, etc., or pointing device such as mouse. The input unit may or may not include touch panel, camera (operation input via moving images), or microphone (voice operation input) as an example, not a limitation.

The output unit is realized by any or a combination of all types of devices being capable of outputting the processing results processed by the control unit 11. The output unit include, as an example, not a limitation, touch panel, touch display, speaker (sound output), lens (as an example, not a limitation, 3D (three dimensions) output and hologram output), printer, etc.

As an example, not a limitation, the input/output unit 12 has a display unit 13.

The display unit 13 is realized by a display or the like. The display is typically realized as monitor (as an example, not a limitation, liquid crystal display or OELD (organic electroluminescence display)). The display may or may not be a head-mounted display (HDM) or the like. The display may or may not be capable of displaying display data in 3D. In this disclosure, the display is not limited to these.

The clock unit 19 is a built-in clock for the server 10 and outputs time information (timekeeping information). The clock unit 19 includes an RTC (Real Time Clock) as a hardware clock, a system clock, etc., as an example, not a limitation. The clock unit 19 can be described as a timekeeping unit or a time information detection unit, as an example, not a limitation.

(3) Others

The server 10 stores the program P in the storage unit 15, and by executing this program P, the control unit 11 implements processing as each unit included in the control unit 11. In other words, the program P stored in the storage unit 15 causes the server 10 to realize each function performed by the control unit 11. The program P may or may not be expressed as a program module.

The same is true for other devices.

Each example embodiment of the present disclosure is described as being realized by the CPU of the terminal 20 and/or server 10 executing program P.

The control unit 21 of the terminal 20 and/or the control unit 11 of the server 10 may or may not be implemented not only by a CPU with control circuits, but also by logic circuits (hardware) formed in integrated circuits (Integrated Circuit (IC) chips, Large Scale Integration (LSI)), etc. or each processing may or may not be realized by dedicated circuits. These circuits may be realized by one or more integrated circuits, and the multiple processes shown in each embodiment may or may not be realized by a single integrated circuit. LSIs may also be referred to as VLSI, Super LSI, Ultra LSI, etc., depending on the degree of integration. Therefore, the control unit 21 may or may not be described as a control circuit.

The program P (as an example not limitation, a software program, computer program, or program module) of each example embodiment of the present disclosure may or may not be provided as stored in a computer-readable storage medium. The storage medium is capable of storing the program P in a "non-transitory tangible medium". The program P may or may not be used to realize some of the functions of each example embodiment of the disclosure. Furthermore, the program P may or may not be a so-called difference file (difference program), which can realize the functions of each example embodiment of the present disclosure in combination with the program P already recorded in the storage medium.

When we refer to the program of the system (the program executed by the system), the system is as described above. The aforementioned program of the system is a program that can be executed by the system as a whole, and this program may comprise individual programs for each device constituting the system, as an example, not a limitation, and the programs stored in the individual devices constituting the system may be different from each other.

As an example, not a limitation, if the system comprises the terminal and the server, and the program of the system is referred to as program P1, the program P1 of the system comprises a program P2 stored in the terminal and a program P3 stored in the server, and the program P2 and the program P3 are for executing the program of the system and may be different from each other. As an example, not a limitation, the program P2 stored in the terminal is a program that executes first processing and sends the result of the first processing to the server, and the program P3 stored in the server is a program that executes second processing on the received result of the first processing and sends the result of the second processing to the terminal.

The storage medium may be one or more semiconductor-based or other integrated circuit (IC) (as an examples not limitation, field programmable gate array (FPGA) or application-specific IC (ASIC) and the like), hard disk drive (HDD), hybrid hard drive (HHD), optical disk, optical disk drive (ODD), optical disk, magneto-optical drive, floppy disk, floppy disk drive (FDD), magnetic tape, solid-state drive (SSD), RAM drive, secure digital card, or drive, any other suitable storage medium, or a suitable combination of two or more of these. The storage medium may be volatile, nonvolatile, or a combination of volatile and nonvolatile, where appropriate. The storage medium is not limited to these examples and can be any device or medium capable of storing the program P. The storage medium may or may not be described as memory.

The server 10 and/or the terminal 20 can read out the program P stored in the storage medium and execute the read program P to realize the functions of the multiple functional units shown in each example embodiment of the present disclosure.

The program P of the present disclosure may or may not be provided to the server 10 and/or the terminal 20 via any transmission medium capable of sending programs (communication network, broadcast wave, etc.). The server 10 and/or the terminal 20, as an example, not a limitation, realizes the functions of the plurality of functional units shown in each example embodiment of the present disclosure by executing the program P downloaded via Internet, etc.

Each example embodiment of the present disclosure can also be realized in the form of a data signal in which the program P is embodied by electronic transmission.

At least part of the processing in the server 10 and/or the terminal 20 may or may not be realized by cloud computing consisting of one or more computers.

At least some or all of the processing at the terminal 20 may or may not be configured to be performed by the server 10. In this case, at least some or all of the processing of each functional part of the control unit 21 of the terminal 20 may or may not be configured to be performed by the server 10.

At least some or all of the processing in the server 10 may or may not be configured to be performed by the terminal 20. In this case, at least some or all of the processing of each functional part of the control unit 11 of the server 10 may or may not be configured to be performed by the terminal 20.

Unless explicitly mentioned, the composition of the determination in the embodiment of this disclosure is not mandatory, and desired (or alternatively, predetermined) processing may or may not be performed when the determination condition(s) is(are) met, or when the determination condition(s) is(are) not met.

The programs in this disclosure are implemented using a scripting language such as ActionScript and JavaScript (registered trademark), a compiler language such as Objective-C and Java (registered trademark), a markup language such as HTML Living Standard, etc., as an example, not a limitation.

<Functional Configuration>

(1) Functional Configuration of the Server

Figures 1, 2:
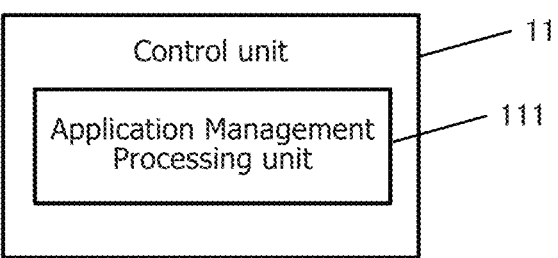

FIG. 1-2 shows an example of the functions realized by the control unit 11 of the server 10 included in the communication system 1 of FIG. 1-1.

As an example, not a limitation, the control unit 11 includes as a functional part, an application management processing unit 111 for executing application management processing according to the application management processing program 151 stored in the storage unit 15.

Figures 1, 2, 3:
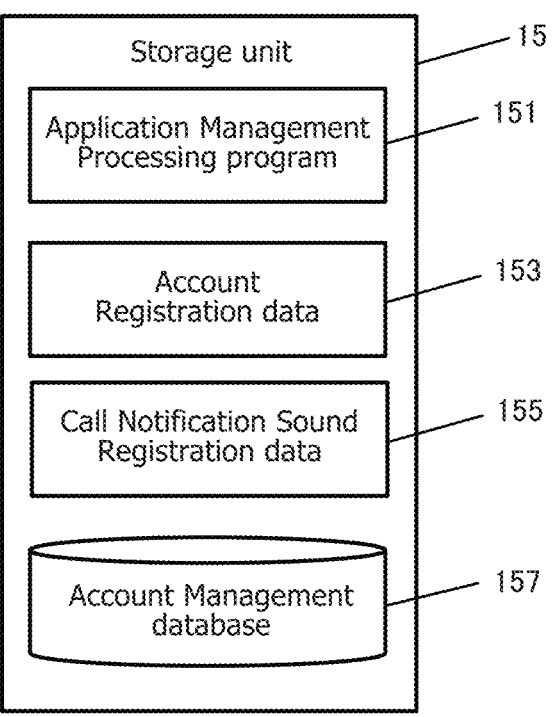

FIG. 1-3 shows an example of the information stored in a storage unit 15 of the server 10 included in the communication system 1 of FIG. 1-1.

The storage unit 15 stores the application management processing program 151, which is executed as application management processing, account registration data 153, the call notification sound registration data 155, and the account management database 157, as an example, not a limitation.

The account registration data 153 is registration data pertaining to accounts for an application (in this embodiment, the messaging application), and an example of its data structure is shown in FIG. 1-4.

The account registration data 153 is stored in association with user names, application IDs, and other registration information as an example, not a limitation.

The user name is the name of the account of the terminal 20 that uses this application, and as an example, not a limitation, the name that the user of the terminal 20 registers when the user uses the application is stored.

The application ID is information used to identify an application account or the account itself.

This application ID may be unique for each account, and as an example, not a limitation, a unique value (exclusive value) may be set and stored for each account by the server 10.

The application ID is information associated with the terminal 20 or the user of the terminal 20, and is an example of information pertaining to the terminal or the user of the terminal.

Other registration information can include, as an example, not a limitation, identification information to identify the terminal 20, telephone number of the terminal 20 (terminal telephone number), e-mail address (terminal e-mail address), or authentication information such as passwords (login password, authentication password, etc.) used for various types of authentication in the application.

The identification information for identifying the terminal 20 can be a terminal ID (International Mobile Equipment Identity (IMEI), as an example, not a limitation).

The identification information to identify the user of the terminal 20 can be an application ID for a general user or an application ID for an official user, as an example, not a limitation.

"The "user ID" may or may not be used in place of the application ID.

If the application allows only one account to be registered per terminal 20, it is possible to set as "identification information to identify the terminal 20 is equal to identification information to identify the user of the terminal 20, and is also equal to application ID", as an example, not a limitation.

As an example, not a limitation, it may or may not be possible to assign multiple terminal IDs to a single application ID. In this case, it may or may not be possible to use the single application ID as the identification (login) target and to start applications on multiple terminals 20 in parallel (parallelly).

It is also possible to apply a method of managing accounts based on information such as terminal phone numbers instead of various IDs such as application IDs. In this case, instead of storing information on IDs such as application IDs in the account registration data 153, information such as terminal phone numbers can be stored in the account registration data 153. Instead of substituting the information of IDs such as application IDs or the like with the information of the terminal telephone number or the like, information of IDs or the like can be made to correspond one-to-one with information of the terminal telephone number or other information, or it can be made not to do so.

In the following example embodiments, for the simplicity of explanation, it is assumed that one account is registered per terminal 20.

In this case, the term "user of the account" used in the following embodiments can be deemed to be substantially synonymous with "terminal of the account" because, as described above, "identification information to identify the terminal 20 is equal to identification information to identify the user of the terminal 20, and is also equal to application ID".

The call notification sound registration data 155 is registration data pertaining to call notification sounds (calling tones and ringtones) in messaging applications, and an example of its data structure is shown in FIG. 1-5.

The call notification sound registration data 155 stores a call notification sound ID, call notification sound name, and call notification sound data URI so as to associate with each other, as an example, not a limitation.

The call notification sound ID is information used to identify a call notification sound. This call notification sound ID is, for example, a unique value for each call notification sound, and as an example, not a limitation, a unique value for each call notification sound is set and stored by the server 10.

The call notification sound name is a name of the call notification sound, and as an example, not a limitation, a name that the user of the server 10 registers when the user adds a call notification sound is stored.

The call notification sound data URI is a URI (Uniform Resource Identifier) that indicates where acoustic data (as an example, not a limitation, WAV file, MP3 file, etc.) of the call notification sound is stored when the user of the server 10 adds a call notification sound to register. The URI of the video image data including the acoustic data may be specified as the call notification sound data URI.

The call notification sound may be registered by the user of the terminal 20. In this case, as an example, not a limitation, an acoustic file to be used as the call notification sound may be uploaded from the terminal 20 to the server 10, and the name registered by the user of the terminal 20 may be stored as the call notification sound name.

The account management database 157 is database for managing information pertaining to accounts registered in the account registration data 153, an example of which is shown in FIG. 1-6, which is an example of the data structure of the account management database 157A.

Account management data is stored in the account management database 157A as management data for each account.

Each account management data stores, as an example, not a limitation, an application ID and call notification sound setting data.

The application ID is information to identify the account managed by the account management data, and as an example, not a limitation, the application ID registered in the account registration data 153 is stored.

The call notification sound setting data is data for storing a setting pertaining to the call notification sound associated with the account of this application ID. As an example, not a limitation, a call notification sound type and a call notification sound ID are stored so as to associate each other.

The call notification sound type is a type for each condition to produce a call notification sound, and can be set to a calling tone and a ringtone, as an example, not a limitation.

Either one of a calling tone or a ringtone may or may not be set. As an example, not a limitation, the end-of-call tone, which is a call notification sound produced at the end of a call (when the call is disconnected), or the like may be set as the call notification sound type.

The call notification sound ID stores identification information (call notification sound ID) of the call notification sound registered in the call notification sound registration data 155, which is set for each call notification sound type. As an example, not a limitation, in the example shown in FIG. 1-6, in the call notification sound setting for the user name "B.B" with the application ID "U0002", "System Sound 02" of the call notification sound ID "SND002" is set as the calling tone, and "System Sound 01" of the call notification sound ID "SND001" is set as the ringtone.

The call notification sound setting data for each account can be changed based on user input, such as user operation on the terminal 20, as an example, not a limitation.

As an example, not a limitation, an initial (default) value of the call notification sound setting data can be set so that the call notification sound ID set by the user of the server 10 is preset for the calling tone and the ringtone.

(2) Functional Configuration of Terminal

FIG. 1-7 shows an example of the functions realized by the control unit 21 of the terminal 20 included in the communication system of FIG. 1-1.

As an example, not a limitation, the control unit 21 includes as a functional part, the application processing unit 211 for executing application processing according to the application processing program 281 stored in the storage unit 28.

FIG. 1-8 shows an example of data and other data stored in the storage unit 28 of the terminal 20 according to an example embodiment.

As an example, not a limitation, the storage unit 28 stores the application processing program 281 to be executed as application processing and the application ID 283 corresponding to the account of the terminal 20 or the user of the terminal 20.

It may be possible to have the storage unit 28 of the terminal 20 store the call notification sound ID registered in the call notification sound registration data 155 in association with the data file specified by the call notification sound data URI.

In this case, as an example, not a limitation, the control unit 21 of the terminal 20 receives the call notification sound registration data 155 from the server 10 at each desired (or alternatively, predetermined) period and determines whether the call notification sound registration data 155 has been updated. If it is determined that the call notification sound registration data 155 has been updated, the control unit 21 of the terminal 20 can refer to the call notification sound data URI for the updated data, download the referenced data file to the storage unit 28, and store the downloaded data in association with the call notification sound ID.

<Display Screen>

As an example, not a limitation, the following illustrates a case where the terminal 20 is a smartphone having a vertical display unit 24.

As an example, not a limitation, a smartphone has a touch panel that functions as an input portion and is positioned facing the display, thereby constituting a touch screen. When an element such as an icon, button, item, or input area is displayed on the display, and an area of the touch panel that is opposite the area in which the element is displayed is operated by the user, a program associated with that element or a subroutine associated with the element is executed.

In the following, description is made where the operation by the user is described as tap (tap operation), as an example, not a limitation.

Tap (tap operation) is, as an example, not a limitation, an action by the user to touch the display 24 (touch screen) integrally configured with a touch panel, such as lightly tapping the display with a finger or pen tip, or to release it after touching it.

The display screen transitions described below are only an example of display screen transitions to realize the method of this disclosure. For the display screen transitions illustrated below, some of the display screens may be omitted or other display screens may be added.

FIGS. 1-9 to 1-10 show an example of the screen transitions displayed on the display 24 of the terminal 20 in a first example embodiment.

The left side of FIG. 1-9 is a screen of a talk room (an example of a chat room, not a limitation) of a messaging application (an example of a chat application, not a limitation), and at the top center of the screen, as the name of the messaging application, letters of "Messaging App" are displayed. In addition, the icon image and the user name (in this example, user A.A) in the messaging application of the user of this terminal 20A are displayed at the topmost right of the screen.

In addition, below it is an area that indicates a current location, page, etc. in the messaging application (hereinafter comprehensively referred to as "in-app location display area"). In this example, based on the fact that this is a talk room screen, the text "B.B" indicating that the talk room name is a one-to-one talk room with the use " " .B, and the "<" button to return to the previous screen are displayed.

Below that, the talk area TR11 is configured. In the talk area TR11, as an example, a content that the user him/herself is the sender is displayed on the right side of the screen, and a content that the other party is the sender is displayed on the left side of the screen, in chronological order from oldest to most recent. As an example, a content that is sent by the user him/herself is displayed in a bubble from the right end of the talk area TR11, and a content that is sent by the other party is displayed in a bubble associated with the icon image and the user name of the other party at the left end of the talk area TR11. The content from which the other party is the sender is configured so that the icon image in the messaging application of the sending user of the terminal 20 (in this case, user "B.B") is displayed at the upper left edge of the bubble of the other party as the sender.

In the talk area TR11, the date and time when the content was sent (posted) are displayed to the right of the bubble corresponding to the other party as the sender, or to the left of the bubble corresponding to the user him/herself as the sender. As an example, not a limitation, if equal to or more than a set time (24 hours, as an example, not a limitation) has passed since the content was sent, only the date of transmission may be displayed next to the bubble. As an example, not a limitation, if equal to or less than a set amount of time has passed since the content was sent, only the time at which the content was sent may be displayed next to the bubble.

In this example, the text content TC11 is displayed on the left side of the talk area TR11, which is from the user B.B and describes that the user B.B informs the user A.A that the user B.B has arrived at the station. On the right side of the talk area TR11, the text content TC12 is displayed, which is from the user A.A, stating that the user A.A is going to call the user B.B because the user A.A cannot find the user B.B that should be nearby.

As an example, not a limitation, the screen on the right side of FIG. 1-9 is displayed when the icon image in the upper left corner of the text content TC11 is tapped.

In this screen, the outgoing call display area MCR11 is superimposed on the talk area TR11 in the talk room screen on the left side of FIG. 1-9 to make a call to the user specified in the talk room (user B.B in this example).

The outgoing call display area MCR11 may be displayed when an outgoing call button, which is not shown in the figures, in the talk room screen is tapped.

The outgoing call display area MCR11 shows "B.B", which is the user name of the call destination account, and an icon of the call destination account. Below that, the outgoing voice call button MCB1 for making a voice-only call to the specified user and the outgoing video call button MCB2 for making a video call to the specified user are displayed side by side.

As an example, not a limitation, when the outgoing voice call button MCB1 or the outgoing video call button MCB2 is tapped, a call is initiated with the user designated as the call destination account.

The left side of FIG. 1-10 shows an example of the talk room screen after the call is ended at the terminal 20A of the call origin account.

In this example, in addition to the text content TC11 and the text content TC12, the call processing result information CRR11 is displayed in the talk area TR11, based on the call that has been made to the user B.B.

The call processing result information CRR11 shows a handset symbol indicating that the call has been made. Below that, the call status information CSR11 for the call that has been made is displayed.

The call status information CSR11 indicates the call status of an outgoing or incoming call. As an example, not a limitation, this call processing result information CRR11 displays call duration information ("2 minutes 14 seconds" in this example) based on the fact that the call has been connected and ended successfully. As an example, not a limitation, if the call did not connect, the call status information displays "Cancelled" at the call origin account based on the fact that the call origin account cancelled the call. Also, as an example, not a limitation, if the call did not connect, the call status information displays "Missed Call" at the call destination account based on the fact that the call destination account has not responded to the call.

If the call is connected and ended normally, the call status information may not display the call duration information. In this case, the call status information displays "Call Ended", as an example, not a limitation.

Below the call status information CSR11, the call notification sound information NSR11, which is information pertaining to the call notification sound of the outgoing call, is displayed.

The call notification sound information NSR11 shows, as an example, not a limitation, that a ringtone for the user B.B, which is the call destination, is set to "System Sound 02".

The right side of FIG. 1-10 shows an example of the talk room screen after the call is ended at the terminal 20B of the call destination account.

In this example, the talk area TR12 displays the text content TC13 corresponding to the text content TC11, the text content TC14 corresponding to the text content TC12, and the call processing result information CRR12.

The call processing result information CRR12 shows a handset symbol indicating that a call has been answered. Below that, the call status information CSR12 for the incoming call and the call notification sound information NSR12 are displayed. As an example, not a limitation, the call notification sound information NSR12 displays the same information as the call notification sound information NSR11.

<Processing>

FIG. 1-11 is a flowchart showing an example of a flow of processing performed by each device according to the first example embodiment.

This figure shows, from left to right, an example of processing executed by the control unit 21 of the terminal 20A, processing executed by the control unit 21 of the terminal 20B, and processing executed by the control unit 11 of the server 10.

The processing described below is only an example processing to realize a method of this disclosure and is not limited to this processing.

Other step(s) may be added to the process described below, or some step(s) may be omitted (deleted) from the processing described below.

Here, as well as the display screen, the processing where:
- call origin account is user A.A (not a limitation, but an example of a terminal user)
- call destination account is user B.B (not a limitation, but an example of a user of the first terminal) is illustrated.

First, the control unit 21 of the terminal 20A provides, as an example, not a limitation, a user input (e.g., operation input, sound input, etc. by the user) based on input to the input/output unit 23 of the terminal 20A. The same applies to the other terminals 20 hereinafter. Talk room selection information for selecting a talk room with the account of the user B.B is sent to the server 10 by means of the communication I/F 22 (A110).

Upon receiving the talk room selection information by means of the communication I/F 14, the control unit 11 of the server 10 sends talk room information, which is information pertaining to the contents of the talk room specified by the received talk room selection information, to the terminal 20A by means of the communication I/F 14 (S110).

In response to receiving the talk room information from the server 10 by means of the communication I/F 22, the control unit 21 of the terminal 20A displays the received talk room information on the display unit 24 (A120).

As an example, not a limitation, if to call a talk partner of the displayed talk room information is selected based on the input to the input/output unit 23 of the terminal 20A, the control unit 21 of the terminal 20A sends to the server 10 by means of the communication I/F 22, call request information including, as an example, not a limitation, information of the call destination account (as an example, not a limitation, an application ID) (A130).

In response to receiving the call request information from the terminal 20A by means of the communication I/F 14, the control unit 11 of the server 10 starts call processing (S120).

In the call processing, as an example, not a limitation, the control unit 11 of the server 10 refers to the account management database 157A and reads out the call notification sound setting data for the call destination account. Then, the control unit 11 of the server 10 reads out the call notification sound ID specified by the call notification sound type "ringtone". Then, the control unit 11 of the server 10 refers to the call notification sound registration data 155, reads out the acoustic file data from the call notification sound data URI designated by the call notification sound ID, and sends it to the terminal 20B of the call destination account.

The control unit 11 of the server 10 also reads out the call notification sound ID specified by the call notification sound type "calling tone". Then, the control unit 11 of the server 10 refers to the call notification sound registration data 155, reads out the acoustic file data from the call notification sound data URI specified by the call notification sound ID, and sends it to the terminal 20A of the call origin account.

When the control unit 21 of the terminal 20B receives the acoustic data that is set as the ringtone, the control unit 21 causes the ringtone to be produced from the sound output unit 26. Then, the user B.B will hear the ringtone and will be notified that a call is being requested (B110).

When the control unit 21 of the terminal 20A receives the acoustic data that is set as the calling tone, the control unit 21 causes the calling tone to be produced from the sound output unit 26. Then, the user A.A will hear the calling tone and will be notified that the user is requesting the call (A140).

As an example, not a limitation, the control unit 21 of the terminal 20A and the control unit 21 of the terminal 20B perform VoIP processing in a user-to-user call via the server 10 when the call is accepted based on an input to the input/output unit 23 of the terminal 20B. When the call is accepted, the control unit 21 of the terminal 20A and the control unit 21 of the terminal 20B may perform peer-to-peer communication, thereby performing a VoIP processing in the call.

The control unit 11 of the server 10 may send the call notification sound data URI to the terminal 20 of the call origin account and the call destination account, instead of the acoustic file data. In this case, the control unit 21 of each terminal 20 reads out the acoustic file data based on the call notification sound data URI and causes the ringtone or the calling tone to be produced.

As an example, not a limitation, when the call is ended and disconnected based on an input to the input/output unit 23 of the terminal 20A or the terminal 20B, the control unit 11 of the server 10 sends the call processing result information to the terminals 20A and 20B by means of the communication I/F 14, as an example, not a limitation. Then the control unit 11 of the server 10 ends the processing.

The call processing result information can include, as an example but not a limitation, call status information and call notification sound information at the call processing.

The call status information may or may not include call duration information.

In addition, the call notification sound information can include at least one of the following, as an example, not a limitation:

information pertaining to a ringtone of call destination account information pertaining to a calling tone of call destination account information pertaining to a calling tone of call origin account information pertaining to a ringtone of call origin account The information pertaining to a ringtone (calling tone) can include, as an example but not a limitation, information such as call notification sound name, length of the call notification sound, etc.

The call notification sound information which is to be sent to the terminal 20A of the call origin account and the call notification sound information which is to be sent to the terminal 20B of the call destination account can be the same information, as an example, not a limitation.

In response to receiving the call processing result information from the server 10 by means of the communication I/F 22, the control unit 21 of the terminal 20A displays the received call processing result information on the display unit 24 (A150). Then the control unit 21 of the terminal 20A ends the processing.

In response to receiving the call processing result information from the server 10 by means of the communication I/F 22, the control unit 21 of the terminal 20B displays the received call processing result information on the display unit 24 (B120). Then the control unit 21 of the terminal 20B ends the processing.

<Sound Information Pertaining to Sound>

In this embodiment, call notification sound information, which is a type of sound information pertaining to a call, is shown as an example of sound information pertaining to sound. This call notification sound information may be regarded as, as an example, not a limitation, sound information pertaining to sound.

However, the sound information in this disclosure does not necessarily have to be sound information pertaining to a call, but can be sound information not pertaining to a call. As an example, not a limitation, information such as information pertaining to a music piece included in the playlist described below that is not set as call notification sound can be used as its example.

The sound information may be a concept including, as an example, not a limitation, an identification ID to identify the call notification sound (call notification sound ID), a call notification sound name, length of the call notification sound, and so on. The sound information may or may not include the sound data itself as specified in the call notification sound data URI, as an example, not a limitation.

When the call notification sound is a music piece, as described below, the sound information can be a concept that further includes the name of the music piece, the name of the album including the music piece, the name of the artist of the music piece, etc.

<Effect of First Example Embodiment Illustrated in FIGS. 1-10 and 1-11>

This example embodiment shows a configuration including displaying on a display unit of the terminal, a chat room including a user of the terminal and a first user of a first terminal being different from the terminal, and displaying in the chat room, call processing result information (as an example, not a limitation, of call information) pertaining to a call between at least the user and the first user, wherein the call information includes call notification sound information (as an example, not a limitation, of sound information) pertaining to sound.

As an example of the effect of this example embodiment obtained by such a configuration, call information pertaining to a call by at least the user of the terminal and the first user of the first terminal can be notified to the user of the terminal by displaying the call information in a chat room including the user of the terminal and the first user. In this case, the user of the terminal can also be notified of sound information pertaining to the sound by making the call information include sound information pertaining to the sound.

This example embodiment also shows a configuration in which the sound information includes information pertaining to a ringtone or a calling tone.

As an example of the effect of this example embodiment obtained by such a configuration, information pertaining to the ringtone and the calling tone as sound information pertaining to sound can be notified to a terminal user by displaying the information in the chat room.

This example embodiment also shows a configuration in which the call information includes call duration information (not a limitation, but an example of information pertaining to a duration of the call), if a call is made between at least the user of the terminal and the first user of the first terminal.

As an example of the effect of this example embodiment obtained by such a configuration, information pertaining to the duration of the call can be notified to the terminal user by displaying the information in the chat room.

<First Variant (1)>

In the above example embodiment, the call notification sound information includes the ringtone or the calling tone, but the inventive concepts are not limited thereto. As an example, not a limitation, if the call notification sound type includes sound other than the ringtone or the calling tone, the server 10 may send information pertaining to such a type of sound to the terminal 20 as the call notification sound information. As an example, not a limitation, if an end-of-call tone can be set as the call notification sound type, the call notification sound information may include information pertaining to the end-of-call tone of the call destination account or the call origin account.

<First Variant (2)>

The above example embodiment shows an example in which the server 10 manages the call notification sound setting data for each account, but the inventive concepts are not limited thereto. As an example, not a limitation, each terminal 20 may store the call notification sound setting data for the account thereof.

The processing in this case, as an example, not a limitation, can be performed as follows.

In FIG. 1-11, as an example, not a limitation, when the user selects to call the talk partner of the displayed talk room information based on an input to the input/output unit 23 of the terminal 20A, the control unit 21 of the terminal 20A reads out call notification sound setting data from the storage unit 28, and sends call request information including call notification sound information A including information pertaining to the ringtone and/or the calling tone and information pertaining to the call destination account (application ID, as an example, not a limitation) to the server 10 by means of the communication I/F 22 (A130).

The control unit 21 of the terminal 20A may send the call notification sound information A to the terminal 20B of the call destination account. The control unit 21 of the terminal 20A also may not send the call notification sound information A to the terminal 20B of the call destination account.

In response to receiving the call request information from the terminal 20A by means of the communication I/F 14, the control unit 11 of the server 10 starts the call processing (S120).

In the call processing, as an example, not a limitation, the control unit 11 of the server 10 sends the call notification sound request information to the terminal 20B of the call destination account by means of the communication I/F 14. In response to receiving the call notification sound request information from the server 10 by means of the communication I/F 22, the control unit 21 of the terminal 20B reads out the call notification sound setting data from the storage unit 28 and sends call notification sound information B including information pertaining to the ringtone and/or the calling tone to the server 10 by means of the communication I/F 22.

The control unit 11 of the server 10 then reads out the acoustic file data from the call notification sound data URI designated by the call notification sound ID designated by the call notification sound type "calling tone" based on the received call notification sound information B, and sends it to the terminal 20A of the call origin account. Based on the received call notification sound information B, the control unit 11 of the server 10 reads out the acoustic file data from the call notification sound data URI designated by the call notification sound ID designated by the call notification sound type "ringtone" and sends it to the terminal 20B of the call destination account.

If the terminal 20B of the call destination account is not capable of communication due to being out of communication range or for other reasons, the control unit 11 of the server 10 cannot obtain the call notification sound information B. In this case, the control unit 21 of the server 10 sends the acoustic data of the default calling tone (not a limitation but an example, such as a notification that the terminal 20 of the call destination account is out of communication range) to the terminal 20A of the call origin account.

When the control unit 21 of the terminal 20A receives the acoustic data set as the calling tone, the control unit 21 causes the calling tone to be produced from the sound output unit 26 (A140).

When the control unit 21 of the terminal 20B receives the acoustic data set for the ringtone, it causes the ringtone to be produced from the sound output unit 26 (B110).

The control unit 11 of the server 10 may send to the terminal 20 of the call origin account, the call notification sound data URI instead of the sound file data. In this case, the control unit 21 of each terminal 20 reads out the acoustic file data based on the call notification sound data URI and causes the ringtone or the calling tone to be produced.

The call notification sound registration data 155 may be stored in the storage unit 28 of the terminal 20. In this case, the call notification sound data URI can be referenced according to the call notification sound ID at each terminal 20. The control unit 21 of the terminal 20 synchronizes the call notification sound registration data 155 with the contents of the server 10 at each set period of time (as an example, not a limitation, "8 hours").

When the call is ended and disconnected, as an example, not a limitation, the control unit 11 of the server 10 sends call processing result information including the call notification sound information A and/or the call notification sound information B to the terminals 20A and 20B by means of the communication I/F 14 (S130). If terminal 20B is not capable of communicating due to being out of communication range or for other reasons, the call status information includes, as an example, not a limitation, information such as "out of communication range".

The call processing result information sent from the server 10 to the terminal 20 may not include the call notification sound information A and/or the call notification sound information B. In this case, as an example, not a limitation, the call notification sound information A may be sent from the terminal 20A of the call origin account to the terminal 20B of the call destination account at the time of sending the call request information. Also, as an example, not a limitation, the call notification sound information B may be sent from the terminal 20B of the call destination account to the terminal 20A of the call origin account at the time of incoming call processing. When the control unit 21 of each terminal 20 receives the call processing result information, the call notification sound information A and/or the call notification sound information B may be associated with the call processing result information and displayed on the display unit 24.

<First Variant (3)>

The above example embodiment shows an example in which the server 10 sends to the terminal 20, the call notification sound information pertaining to the call notification sound that has already been set, as call processing result information, but the inventive concepts are not limited thereto. As an example, not a limitation, it is possible to allow the user of each terminal 20 to set the call notification sound.

FIGS. 1-12, 1-13 and 1-14 show an example of screen transitions displayed on the display 24 of the terminal 20 in the aforementioned variants.

The left of FIG. 1-12 is an example of the home screen of the messaging application on the terminal 20B. In this example, the word "Home" is displayed in the in-app location display area, indicating that the current location is at the home of the messaging application.

Below the in-app location display area, a messaging application function search area is configured, which is an input area for searching for any function within the messaging application. In this example, the word "Search" that prompts a user to enter a search keyword is displayed in the messaging application function search area.

Below the messaging application function search area, the icon image and user name in the messaging application of the user of this terminal 20 are displayed. To the right of the user name, the setting button CFB1, indicated by a gear icon, is displayed for doing the settings for each messaging application account.

Below that, multiple function icons corresponding to the various functions of the messaging application are displayed. The function icons include, as an example, not a limitation, icons corresponding to each of the multiple functions, such as "Friends", "Businesses", and "Services".

"Friends" is one of the functions of the messaging application, whereby a user (one account) of one terminal 20 instructs to perform processing to add a user (another account) of another terminal 20 as a friend from his/her own terminal 20, and by performing the processing of adding and registering a friend (friend adding processing and friend registering processing) by means of the server 10, messages can be sent and received between the terminals 20 that have been registered as friends via the server 10. When it is necessary to distinguish messaging application accounts owned by individual users from business accounts, the messaging application accounts owned by individual users are referred to as "general accounts". The history of messages sent and received between the terminals 20 of users who own general accounts is displayed on the display 24 of the terminal 20 as a talk room, etc.

The term "Businesses" is, as an example, not a limitation, a type of the friend function described above, and by registering not a general account but an account of the messaging account owned by a user of a business entity (hereinafter referred to as "official account") as a friend, it is possible to receive and display messages sent from a business entity that owns an official account on the terminal 20 via the server 10.

A device or terminal of a business entity owning an official account can be enabled to send and receive messages to and from other devices via the server 10 in the same manner as the terminal 20 of an individual user owning a general account. As an example, not a limitation, a message sent from one terminal 20 to another terminal 20 as well as a message sent from a terminal 20 of a user owning a general account to a device or terminal of a business entity owning an official account is sent to the device or terminal of the business entity via the server 10. The history of the messages can then be displayed on the display (not shown in the figures) of the device or terminal of the business entity as a talk room or the like.

On the left side of FIG. 1-12, the function icon of "Services" is shown tapped among the multiple function icons. Below the display area of the function icon, an icon indicating a recommended service is shown.

As an example, not a limitation, when the setting button CFB11 is tapped by the user, the display transitions to the setting screen on the right side of FIG. 1-12.

In this screen, the word "Settings" is displayed within the in-app location display area, indicating that the current location is at the setting screen for the messaging application.

Below the in-app location display area, a setting item selection area is displayed for selecting a setting item.

As an example, not a limitation, the setting item selection area displays the profile setting button CFB12 indicated by the word "Profile" for setting the user name, etc., the account setting button CFB13 indicated by the word "Account" for setting the password, etc., and the call setting button CFB14 indicated by the word "Call" for doing the call-related settings.

As an example, not a limitation, when the call settings button CFB14 is tapped by the user, the display transitions to the settings screen on the left side of FIG. 1-13.

In this screen, the word "Call" is displayed within the in-app location display area, indicating that the current location is at a call setting screen for doing the call-related settings.

Below the in-app location display area, as details of setting items, an item indicated by the text "General Settings" for doing general settings pertaining to calls, and an item indicated by the text "Call Notification Sound Settings" for doing settings related to call notification sound.

The item indicated by the text "Call Notification Sound Setting" displays the ringtone setting button CFB15, indicated by the text "Ringtone", for setting a ringtone, and the calling tone setting button CFB16, indicated by the text "Calling Tone", for setting a calling tone.

The ringtone setting button CFB15 is configured to indicate that the call notification sound name currently set as the ringtone is "System Sound 02". The calling tone setting button CFB16 is configured to indicate that the call notification sound name currently set as the calling tone is "System Sound 01".

As an example, not a limitation, when the calling tone setting button CFB16 is tapped by the user, the display transitions to the configuration screen on the right side of FIG. 1-13.

In this screen, based on the fact that the calling tone setting button CFB16 has been tapped, the tapped calling tone setting button CFB16 is displayed in a grayed-out manner. In addition, the call notification sound selection area SMN11 is displayed at the bottom of the screen for selecting a calling tone based on the fact that the calling tone setting button CFB16 has been tapped.

In the call notification sound selection area SMN11, the call notification sound names registered in the call notification sound registration data 155 are listed and displayed, as an example, not a limitation. Among the call notification sound names, the call notification sound name selected by the user is displayed in bold type. In this example, "System Sound 03" is selected. As an example, "System Sound 03" is set as a new calling tone when the calling tone setting completion button indicated by the word "Done" in the call notification sound selection area SMN11 is tapped.

When the item marked "Add New" (not shown in the figures) is selected in the call notification sound selection area SMN11, the user may register any call notification sound name and sound file.

The talk room screen on the left side of FIG. 1-14 is, not a limitation, an example of a talk room screen after the call is ended at the terminal 20A of the call origin account corresponding to the left side of FIG. 1-10 in the case that "System Sound 03" is set as a calling tone for the user B.B in the setting screen on the right side of FIG. 1-13. In this screen, in the call processing result information CRR11, the call notification sound information NSR11 shows that the calling tone for the user B.B, which is the call destination account, is set to "System Sound 03", as an example, not a limitation.

The talk room screen on the right side of FIG. 1-14 is an example, not a limitation, of a talk room screen after a call is ended at the terminal 20B of the call destination account corresponding to the right side of FIG. 1-10, in the case that "System Sound 03" is set as a calling tone for the user B.B in the setting screen on the right side of FIG. 1-13. In this screen, in the call processing result information CRR12, the call notification sound information NSR12 indicates that the calling tone for user B.B, which is the call destination account, is set to "System Sound 03", as an example, not a limitation.

FIG. 1-15 is a flowchart showing an example of the flow of processing performed by each device according to a variant of the first example embodiment.

First, as an example, not a limitation, the control unit 21 of the terminal 20B obtains call notification sound setting information including the application ID of the terminal thereof and the call notification sound ID based on input to the input/output unit 23 of the terminal 20B, and sends the call notification sound setting information to the server 10 by means of the communication I/F 22 (B105).

The control unit 21 of the terminal 20B may receive information desired for setting the call notification sound (as an example, not a limitation, call notification sound registration data) from the server 10 prior to this step.

When a new call notification sound is registered, the call notification sound setting information may include the call notification sound name and the acoustic file (or call notification sound data URI).

The setting and transmission of the call notification sound setting information may or may not be performed at the terminal 20A (or another terminal 20).

In response to receiving the call notification sound setting information from the terminal 20B by means of the communication I/F 14, the control unit 11 of the server 10 executes call notification sound setting processing (S105). In the call notification sound setting processing, the control unit 11 of the server 10 updates the call notification sound setting data in the account management database 157A based on the received call notification sound setting information.

If the call notification sound setting information includes a call notification sound name and an acoustic file (or call notification sound data URI), the control unit 11 of the server 10 stores the acoustic file and generates a call notification sound data URI in the call notification sound setting process. Then, the control unit 11 of the server 10 issues a new call notification sound ID, associates the issued call notification sound ID with the call notification sound name and call notification sound data URI, and adds it to the call notification sound registration data 155 to be stored. Then, the control unit 11 updates the call notification sound setting data in the account management database 157A.

If the call notification sound setting data is managed at each terminal 20, the terminal 20 may or may not send the call notification sound setting information to the server 10.

This variant shows a configuration in which the sound information is set by the user of the terminal or the first user of the first terminal.

As an example of the effect of this example embodiment obtained by such a configuration, sound information pertaining to sound can be set by the user of the terminal or the first user of the first terminal, thereby improving user conveniences.

This variant also shows a configuration in which the sound information includes information pertaining to a calling tone, and the calling tone is set by the first user of the first terminal.

As an example of the effect of this example embodiment obtained by such a configuration, information pertaining to a calling tone set by the first user of the first terminal as call information can be notified to the user of the terminal by displaying it in the chat room.

<First Variant (4)>

In the above example embodiment, an example in a one-to-one talk room is illustrated, but the inventive concepts are not limited thereto. As an example, not a limitation, it may be applied to a group talk room or an OA talk room.

As an example, not a limitation, in a group talk room including the user A.A, the user B.B, and the user C.C, incoming and outgoing calls to individual users can be configured as in the above example.

As an example, not a limitation, when a user of a group (the user A.A, as an example, not a limitation) makes a group call (simultaneous call among three or more users) to multiple other users who are members of the group (the user B.B and the user C.C, as an example not a limitation), as the call notification sound information sent as call processing result information, the following examples can be given:

calling tone for call origin account ringtone for call origin account calling tone for any call destination account among group members ringtone for any call destination account among group members calling tone for the representative account of the group ringtone for the representative account of the group any sound set for the group (as an example, not a limitation, a sound set as group's theme song)

The playlist function described below may or may not be used to make multiple calling tones and/or ringtones in any combination o' group members' call destination accounts the call notification sound information.

Second Embodiment

In the first example embodiment, when the user of the terminal 20 sets the call notification sound, an example, not a limitation, of selecting the call notification sound setting item from the messaging application setting item is shown. A second example embodiment is an embodiment in which the processing transitions to the call notification sound setting item based on the call processing result information displayed on the terminal 20.

The contents described in the second example embodiment are applicable to the other example embodiments and variants thereof.

The same components as those previously described are indicated with the same symbols and are omitted from the description thereafter.

<Display Screen>

FIG. 2-1 shows an example of a screen transition displayed on the display 24 of the terminal 20 according to the second example embodiment.

The left side of FIG. 2-1 is an example of the talk room screen that is displayed after the call between the user A.A and the user B.B is ended at the terminal 20A of the call origin account. The display screen on the left side of FIG. 2-1 is another example of the talk room screen on the left side of FIG. 1-10, as an example, not a limitation.

In this screen, the call processing result information CRR21 is configured to display, as an example, not a limitation, the call status information CSR11 and the call notification sound information NSR11, which indicates that a calling tone for the user B.B, which is the call destination, is set to "System Sound 03", as well as the call notification sound change button SCB11 that is used to change the call notification sound by clicking the call notification sound change button SCB11, which is indicated by the text "Change Call Notification Sound".

As an example, not a limitation, when the call notification sound change button SCB11 is tapped by the user, the screen transitions to the call setting screen on the right side of FIG. 2-1. In this screen, the ringtone setting button CFB25 includes an indication that the call notification sound name currently set as a ringtone is "System Sound 07". The calling tone setting button CFB26 is configured to indicate that the call notification sound name currently set as a calling tone is "System Sound 06".

The user can easily make the call notification sound setting performed by selecting the call notification sound in the call notification sound selection area displayed by tapping the ringtone setting button CFB25 or the calling tone setting button CFB26.

If information pertaining to a calling tone is displayed in the call notification information NSR11, as an example, not a limitation, when the call notification sound change button SCB11 is tapped by the user, the call notification selection area displayed by tapping the calling tone setting button CFB26 may be displayed in the talk room screen to allow the user to set a calling tone. If information pertaining to a ringtone is displayed in the call notification information NSR11, as an example, not a limitation, when the user taps the call notification sound change button SCB11, the call notification selection area that is displayed by tapping the ringtone setting button CFB25 may be displayed in the talk room screen to allow the user to set a ringtone.

If the setting screens for a calling tone and a ringtone are different, as an example, not a limitation, the calling tone information may be displayed in the call notification sound information NSR11, and when the call notification sound change button SCB11 is tapped, the screen may transition to the calling tone setting screen. The same applies to the ringtone setting.

In the call setting screen on the right side of FIG. 2-1, as an example, not a limitation, when the back button located on the left end of the in-app location display area is tapped, the processing may be returned to the messaging application settings screen or to the original talk room screen, as an example, not a limitation.

When the processing transitions from the talk room screen to the call setting screen via the call notification sound change button SCB11, the call setting screen may or may not be displayed additionally with the transition button to return to the talk room screen.

In the talk room screen displayed after the call between the user A.A and the user B.B is ended at the terminal 20B of the call destination account, the call processing result information is configured in the same way as above to include, as an example, not a limitation, the call status information CSR13 and the call notification sound information NSR14, and further the call notification change button may be displayed.

<Processing>

FIG. 2-2 is a flowchart showing an example of the flow of processing performed by each device according to the second example embodiment.

After the step of A140, the control unit 21 of the terminal 20A displays the call processing result information (A150), and determines whether to change the call notification sound setting based on the displayed call processing result information.

As an example, not a limitation, when to change the call notification sound setting is selected based on input to the input/output unit 23 of the terminal 20A, the control unit 21 of the terminal 20A obtains call notification sound setting information based on the input to input/output unit 23 of the terminal 20A and sends the obtained call notification sound setting information to the server 10 by means of the communication I/F 22 (A210). The method of obtaining the call notification sound setting information can be performed in the same manner as the step B105 in FIG. 1-15, as an example, not a limitation.

When the "change the call notification sound setting information" is selected, the control unit 21 of the terminal 20A may receive information desired to set the call notification sound (as an example, not a limitation, call notification sound registration data) from the server 10.

In response to receiving the call notification sound setting information from the terminal 20A by means of the communication I/F 14, the control unit 11 of the server 10 executes call notification sound setting processing (S210). The call notification sound setting processing can be performed in the same manner as the step S105 in FIG. 1-15, as an example, not a limitation.

When to the "change the call notification sound setting information" is selected at the terminal 20A, the control unit 21 of the terminal 20A ends the processing. If the call notification sound setting information is not received from the terminal 20A, the control unit 11 of the server 10 ends the processing.

<Effect of Second Example Embodiment>

This second example embodiment shows a configuration including displaying, on the display unit, a call setting screen (as an example, not a limitation, of setting information) pertaining to setting of the sound information based on an input by the user with respect to the call information displayed in the chat room.

As an example of the effect of the second example embodiment obtained by such a configuration, information for setting sound information can be displayed on the display of the terminal as setting information based on the input of the user of the terminal to the call information displayed in the chat room including the user of the terminal and the first user of the first terminal.

This second example embodiment also shows a configuration in which the sound information includes information pertaining to the ringtone or the calling tone and is set as the ringtone or the calling tone for the terminal user based on the terminal user's input with respect to the setting information.

As an example of the effect of the second example embodiment obtained by such a configuration, sound information can be set as the ringtone or the calling tone for the user of the terminal based on the input of the user of the terminal to the above setting information.

<Second Variant (1)>

In the second example embodiment above, when the call notification sound setting is to be changed, the user manually selects and sets the call notification sound after the call notification sound change button SCB11 is tapped, but the inventive concepts are not limited thereto. As an example, not a limitation, the call notification sound may be set automatically based on the call notification sound information NSR11.

FIG. 2-3 shows an example of a screen transition displayed on the display 24 of the terminal 20 according to a variant of the second example embodiment.

The left side of FIG. 2-3 is an example of the talk room screen displayed at the terminal 20A of the call origin account after the call between the user A.A and the user B.B is ended, similar to the display screen on the left side of FIG. 2-1.

As an example, not a limitation, when the call notification sound change button SCB12 is tapped by the user, the screen transitions to the call setting screen in the center of FIG. 2-3. This screen is configured to pop up the call notification sound suggestion display area SCR21 in the center of the screen, as an example, not a limitation.

The call notification sound suggestion display area SCR21 is configured, based on the information in the call notification sound information NSR11 indicating that a calling tone of the call destination account is set to "System Sound 03", to display a confirmation display to confirm whether or not to change to the same setting as the call destination account (in this embodiment, a setting using "System Sound 03" for a calling tone).

Below that, the call notification sound change button SBT1, indicated by the word "Change", to change the call notification sound setting based on the proposed content, and the cancel button SBT2, indicated by the word "Cancel", to keep unchanged the call notification sound setting, are configured to be displayed.

As an example, not a limitation, when the call notification sound change button SBT1 is tapped, the screen transitions to the call setting screen on the right side of FIG. 2-3. In this screen, the calling tone setting button CFB26 includes an indication that the call notification sound name (e.g., a calling tone) has been changed to "System Sound 03" by the tap of the call notification sound change button SBT1 in the call notification sound suggestion display area SCR21.

When the call notification sound change button SCB12 is tapped on the screen on the left side of FIG. 2-3, the call notification sound suggestion display area SCR21 may be displayed so as to be superimposed on the talk room screen. When the call notification sound change button SBT1 is tapped, the screen may transition to the original talk room screen instead of transitioning to the call settings screen after the setting change.

When the call notification sound change button SCB12 is tapped in the screen on the left side of FIG. 2-3, the call notification sound may be automatically changed based on the call notification sound information NSR11 without confirming with the user in the call notification sound suggestion display area SCR21.

This variant shows a configuration in which the sound information includes information pertaining to a ringtone or a calling tone, and the ringtone or the calling tone is set as a ringtone or a calling tone for the user based on the input by the user with respect to the setting information.

As an example of the effect of this variant obtained by such a configuration, based on the terminal user's input to the above setting information, the information of a calling tone set by the first user of the first terminal can be displayed to notify the user of the terminal. Also, based on the input of the user of the terminal to the displayed information of the calling tone, the calling tone set by the first user of the first terminal can be set as a calling tone for the user of the terminal. In other words, it is possible to set a calling tone set by the other end of the call as one's own calling tone.

<Second Variant (2)>

In the above example embodiment, when the call notification sound is changed at the terminal 20 of the call origin account, the same ringtone is produced at the terminal 20 of the call destination account for incoming calls from all users, and the same calling tone is produced at the terminal 20 of the call origin account, but the inventive concepts are not limited thereto. As an example, it is possible to set a ringtone and a calling tone for each user.

Figures 1, 2, 3, 4:

FIG. 2-4 shows an example of the data structure of account management database 157B, which is an example of the account management database 157 in this variant of the second example embodiment.

Account management data is stored in the account management database 157B as management data for each account.

As an example, not a limitation, in each account management data, the application ID in the account management database 157A, the call notification sound setting data, and user-specific call notification sound setting data are stored.

The user-specific call notification sound setting data is data for storing call notification sound settings associated with each call origin account of calls. As an example, not a limitation, a call notification sound type, a call notification sound ID, and a call origin application ID are associated with the user-specific call notification sound setting data and stored.

The call notification sound type and the call notification sound ID are the same as in the call notification sound setting data as an example, not a limitation.

The call origin application ID stores an application ID of the call origin account to which the call notification sound is output, as defined by the call notification sound type and the call notification sound ID.

In this example, as an example, not a limitation, if an incoming call is received with the user A.A as the call origin account (the application ID is "U0001" for the user A.A), the terminal 20B with the call destination account (application ID is "U0002" for the user B.B.) uses as a ringtone, a sound identified by the call notification sound ID "SND008" is used. At the terminal 20A of the call origin account, a sound identified by the call notification sound ID "SND010" is used as a calling tone.

As an example, not a limitation, if an incoming call is received with the user C.C as the call origin account (application ID is "U0003" for the user C.C), the terminal 20B of the call origin account uses a sound identified by the call notification sound ID "SND009" as a ringtone. However, because the setting pertaining to a calling tone has not been made in the user-specific call notification sound setting data, the terminal 20C of the call origin account uses a sound identified by the call notification sound ID "SND001" set in the call notification sound setting data as a calling tone.

When an incoming call is received with another user as the call origin account, the call notification sound set in the call notification sound setting data is used for a ringtone at the terminal 20B of the call destination account and for a calling tone at the terminal 20 of the call origin account.

It may be possible to set the call notification sound for any group instead of each application ID. In this case, it is possible to achieve this by storing identification information of the target group (as an example, not a limitation, a group ID) in the call origin application ID of the user-specific call notification sound setting data.

FIGS. 2-5 to 2-6 show examples of screen transitions displayed on the display 24 of the terminal 20 in variants of the second example embodiment.

The left side of FIG. 2-5 shows an example of a call setting screen similar to the right side of FIG. 1-13. In this screen, the calling tone setting button CFB16 is displayed in a grayed-out manner based on the fact that the calling tone setting button CFB16 has been tapped. At the bottom of the screen, the call notification sound selection area SMN21 is displayed for selecting the calling tone based on the fact that the calling tone setting button CFB16 has been tapped. In the call notification sound selection area SMN21, "System Sound 10" is selected, as an example, not a limitation. As an example, not a limitation, when the calling tone setting completion button indicated by the word "Done" in the call notification sound selection area SMN21 is tapped, the display transitions to the call setting screen in the center of FIG. 2-5, as an example, not a limitation.

In this figure, the display is configured to show that the "System Sound 10" selected in the call notification sound selection area SMN21 is set as the calling tone as the call notification sound setting. In addition, a slide button is configured to be displayed below it to allow the user to select whether or not to set the selected call notification sound for everyone. On this screen, as an example, not a limitation, based on the fact that the slide button has been set to off and thereby selecting not to set the calling tone for everyone, the bottom is configured to display a call notification sound application selection area for selecting a user for which the call notification is set (in this case the calling tone is set as "System Sound 10").

In the call notification sound application selection area, the user's friends and/or groups to which the user belongs are displayed as a list, as an example, not a limitation. In this screen, as an example, not a limitation, a check mark is displayed to the left of the user A.A's icon to indicate that the friend "User A.A" has been tapped and selected as the setting target of the call notification sound.

Below the call notification sound application selection area, an individual call notification sound setting button SBT11 indicated by the word "Set" to perform an individual call notification sound setting for a user and/or group selected in the call notification sound application selection area, and the call notification sound setting cancel button SBT12 indicated by the word "Cancel" to cancel doing the setting of the call notification sound.

As an example, not a limitation, when the individual call notification sound setting button SBT11 is tapped, the display transitions to the call setting screen on the right side of FIG. 2-5.

In this screen, the calling tone setting button CFB16 indicates that the call notification sound name which is currently set as a calling tone for users other than the user A.A as described above is "System Sound 01". Below that, the display indicates that a call notification sound name set as an individual calling tone for the user A.A. is "System Sound 10".

Description will be made with more detail.

The calling tone "System Sound 10" at the top of the center of FIG. 2-5 indicates that a set calling tone is "System Sound 10".

To set the calling tone "System Sound 10" for everyone, it is necessary to turn on the slide button associated with the words "Set for Everyone" may be turned on or the individual call notification sound setting button SBT11 may be tapped after turning on the slide button. Then, "System Sound 01" (displayed as "System Sound 01" on the left side of FIG. 2-5), which has been set as a calling tone for everyone, is changed to "System Sound 10", and the calling tone setting button CFB16 changes its display to "System Sound 10".

To set the calling tone "System Sound 10" individually (for each user) or for each group, as described above, the friends/groups column may be placed in the center of FIG. 2-5, a check mark for a user or a group for which the calling tone "System Sound 10" is to be set, and then to the individual call notification sound setting button SBT11 may be tapped. As shown in the right side of FIG. 2-5, "System Sound 10" is displayed below the display of "System Sound 01" in the calling tone setting button CFB16, in association with information pertaining to the user (icon and user name in this embodiment) who checked the check mark. "System Sound 01" displayed on the calling tone setting button CFB16 indicates that "System Sound 01" is set for all users and groups other than those who have been set individual calling tone, which is displayed below it.

After the content on the right side of FIG. 2-5 is displayed, as an example, not a limitation, to set a calling tone for a user or a group other than the user A.A, the calling tone setting button CFB 16 on the right side of FIG. 2-5 may be tapped, and then a calling tone may be set in the same way as in the left side of FIG. 2-5 to the center of FIG. 2-5. As an example, when "System Sound 07" is to be set as a calling tone for the user C.C, it is necessary to select "System Sound 07" may be selected from among system sound candidates displayed at the bottom of the screen as in the left side of FIG. 2-5, then "the button of "System Sound 07" in the center of FIG. 2-5 may be tapped, a check mark at user C.C may be tapped and the individual call notification sound setting button SBT11 may be tapped. Then, on the right side of FIG. 2-5, the user C.C's "System Sound 07" is additionally displayed below the user A.A's "System Sound 10" below the display of "System Sound 01" on the calling tone setting button CFB16.

If multiple friends are selected in the center of FIG. 2-5, the calling tone can be set for the selected multiple friends at once. If both a friend and a group are selected, a calling tone can be set for both the selected user and the selected group at once.

The same is true for setting a ringtone.

In this case, information on a ringtone set for each user or each group can be displayed below the ringtone setting button CFB15 (Incoming Ringtone: System Sound 02) in the right side of FIG. 2-5, as an example, not a limitation.

The left side of FIG. 2-6 shows an example of a talk room screen after a call is made from the terminal 20A of the call origin account to the terminal 20B of the call destination account.

In this example, in addition to the text content TC13 and the text content TC14, the call processing result information CRR23 is displayed in the talk area TR12, based on an incoming call from the user A.A.

The call notification sound information NSR21 in this call processing result information CRR23 shows, as an example, not a limitation, that a calling tone of the call origin, which is the user ".B, is set to "System Sound 10" based on the fact that the call origin account is the user A.A.

The right side of FIG. 2-6 shows an example of a talk room screen after a call is made from the terminal 20C of the call origin account to the terminal 20B of the call destination account.

In this example, in the talk area TR21, in addition to the text content TC21 indicating that the user C.C poses a question to the user B.B and the text content TC22 indicating that user B.B states that he/she can reply with a call, the call processing result information CRR24 based on an incoming call from the user C.C is displayed.

The call notification sound information NSR22 in this call processing result information CRR24 shows, as an example, not a limitation, that a calling tone of the call origin, the user ".B, is set to "System Sound 01" based on the fact that the call origin account is the user C.C.

The call setting screen described in FIG. 2-5 is only an example and the call setting screen is not limited to this screen. Another example of the call setting screen is shown below.

FIG. 2-7 shows another example of the call setting screen, similar to FIG. 2-5, which is displayed on the terminal 20B of the user B.B.

On the left side of FIG. 2-7, in addition to the aforementioned general settings, an item for setting a ringtone and an item for setting a calling tone are displayed as the call notification sound settings.

The items for setting the ringtone include, as an example, not a limitation, the button labeled "Common Ringtone for Everyone" for setting a ringtone for everyone, and the button labeled "Ringtone for Each Friend/Group" for setting a ringtone for an individual user (user-specific) or a group.

Similarly, as an example, not a limitation, the items for setting a calling tone include a button labeled "Common Calling Tone for Everyone" for setting a calling tone to be set for everyone, a button labeled "Calling Tone for Each Friend/Group" for setting a calling tone for an individual user (user-specific) or group are displayed.

In other words, this call setting screen is configured to allow the user to select whether to do settings for everyone or by each user or each group on the screen that serves as the entry point for setting and changing the call notification sound.

As an example, not a limitation, when one of these buttons labeled "Calling Tone for Each Friend/Group" is tapped, the screen in the center of FIG. 2-7 is displayed, as an example, not a limitation.

This screen, as an example, not a limitation, includes a set list display area that indicates which calling tone has been set for which user or group. For example, the letters "Preset List" are displayed, and below it, the calling tones that have been set for the friend or group are displayed in association with the friend's icons and user names.

In this example, information that cannot be fully displayed in the set list display area can be scrolled in the set list display area by the user scrolling upward on the set list display area, and then the information that had been displayed from the top ("the user E.E" in this example) becomes invisible in turns, and the information that had not been displayed becomes visible from the bottom to be displayed.

If the user then performs a downward scrolling operation, the opposite takes place.

In this example, from top to bottom, it is shown that "System Sound 06" has already been set as a calling tone for the user E.E that is a friend, and "System Sound 08" has already been set as a calling tone for the user G.G that is a friend.

Below that, a friends/groups list display area is configured, in which a list of friends and groups is displayed. For example, the text "Friends/Groups List" is displayed, below which the users of friends are listed by icons and user names, and below that, the groups are listed by icons and group names. Next to each icon and user name is an area for checking a check mark, as in FIG. 2-5, and in this example, the user A.A is selected, and a check mark is checked. Similar to the set list display area, the Friends/Groups list display area is scroll-controlled by the terminal 20 based on the scrolling operation by the user.

Similar to the case shown in FIG. 2-5, when multiple friends are selected, a calling tone can be set for the selected multiple friends at once. When both a friend and a group are selected, a calling tone can be set for the selected user and the selected group at once.

The bottom of the screen is also configured with a call notification sound setting button SBT13 for selecting and setting the call notification sound (in this example, the calling tone) for the selected user or group, which, when tapped, is displayed as shown on the right side of FIG. 2-7, as an example, not a limitation.

In this example, as shown in the right side of FIG. 2-7 displayed, the call notification sound selection area SMN31 for selecting the call notification sound is superimposed on part of the friends/groups list display area, and is raised up from the bottom of the screen. In this example, the userA.A is the target user to be set, so the display area of the userA.A is displayed in a different manner from the display areas of other users, as an example, not a limitation.

In this example, similar to the case shown in FIG. 2-5, the call notification sound selection area SMN31 is configured to allow the user to select the call notification sound to be set from among the candidate call notification sounds displayed in a drum-roll fashion, and a state where "System Sound 10" is selected is shown here. In this state, as an example, not a limitation, when the "Done" button in the call notification sound selection area SMN31 is tapped, "System Sound 10" is set as an individual calling tone for the user A.A. As a result, information pertaining to the user A.A (in this example, the icon and the user name of the user A.A) and "System Sound 10" are added to the set list display area.

When changing the call notification sound for a user or group that is displayed as set in the set list display area, as one method, as an example, not a limitation, a user (or a group) is selected from the set list, call notification sound candidates are displayed in the vicinity of the selected user or group in a drum-roll manner or the like, or displayed as a pop-up window, and the call notification sound to be changed is selected from among them. The call notification sound displayed in the set list display area can be updated accordingly.

As another method, as an example, not a limitation, the call notification sound may be changed using the same procedure as above after the check box is checked for the user or group in the friends/groups list display area. The call notification sound displayed in the set list display area may then be updated accordingly.

It is also possible to configure the terminal 20 to perform scroll control for the set list and the friends/groups list in an integrated manner, rather than configuring the terminal 20 to perform scroll control for each area separately. In other words, after an upward scrolling operation is performed by the user on the screen and all information in the set list is displayed by the scroll control, the friends/groups list may be displayed from the bottom.

The relationship of the display position between the set list display area and the friends/groups list display area may be reversed. The above description also applies in this case.

The set list may be or may not be displayed. In some example embodiments, the set list may be displayed on a separate screen from the friends/groups.

Instead of setting the call notification sound in the same screen as shown in the center of FIG. 2-7 to the right side of FIG. 2-7, as an example, not a limitation, a screen for setting the call notification sound may be displayed from the screen shown in the center of FIG. 2-7 (e.g., transitions to another screen) based on the tap of the call notification sound setting button SBT13.

Based on the fact that a check mark is checked in association with a user or group in the friends/groups list display area, call notification sound candidates may be displayed, or they may be displayed as a pop-up in its vicinity, as an example, not a limitation. The user may then be allowed to select the call notification sound to be set.

This variant shows a configuration in which a processor of the terminal performs a process including setting sound information to the first user of the first terminal based on the input by the user of the terminal with respect to the setting information.

As an example of the effect of this variant of the second example embodiment obtained by such a configuration, sound information can be set for the first user of the first terminal based on the input of the user of the terminal to the above setting information. As an example, not a limitation, it is possible to set a calling tone and/or ringtone for the first user of the first terminal based on the input of the user of the terminal.

This variant also shows a configuration in which control of setting sound information for the group of a chat room is performed by the control unit of the terminal based on the input by the user of the terminal to the setting information.

As an example of the effect of this variant of the second example embodiment obtained by such a configuration, sound information can be set for the group of a chat room based on the input by the user of the terminal to the setting information described above. As an example, not a limitation, it is possible to set a calling tone and/or a ringtone for a group of chat rooms based on the input of the user of the terminal.

<Second Variant (3)>

The above variant of the second example embodiment shows an example in which the call processing result information is configured to display the call status information, the call notification sound information, and the call notification sound change button, but the inventive concepts are not limited thereto.

As an example, not a limitation, the call notification sound information may not be included in the call processing result information, but information for setting (changing) the call notification sound may be included in the call processing result information. In other words, the display of the call notification sound may be omitted, but the information for setting the call notification sound may be displayed, thereby allowing the user of the terminal to set the call notification sound.

FIG. 2-8 shows an example of a screen transition displayed on the display 24 of the terminal 20 according to a variant of the second example embodiment.

The left side of FIG. 2-8 is an example of the talk room screen displayed at the terminal 20A of the call origin account after the call between the user A.A and the user B.B is ended. The left side of FIG. 2-8 is another example of the display screen on the left side of FIG. 2-1.

In this example, the call processing result information CRR22 is configured to display the call status information CSR11 and the call notification sound change button SCB11, as an example, not a limitation. In other words, in this variant, information pertaining to the call notification sound is not displayed.

As an example, not a limitation, when the call notification sound change button SCB11 is tapped by the user, the screen transitions to the call setting screen on the right side of FIG.

2-8. This screen is the same call setting screen as the display screen on the right side of FIG. 2-1.

Thus, this variant shows a configuration in which the call processing result information includes information for setting the call notification sound, but does not include the call notification sound information.

As an example, not a limitation, while the variant (2) illustrated in FIG. 2-7 allows a call notification sound to be set for each user or each group, this can also be applied in combination with the variant (3) illustrated in FIG. 2-8. In this case, as an example, not a limitation, while the call notification sound can be set for each user or each group in the call setting screens shown in FIG. 2-5 and FIG. 2-7, it is possible to include the call status information and the call notification sound change button but not to include the call notification information in the call processing result information displayed in the talk room shown in FIG. 2-6. Also, the call setting screen shown in FIG. 2-5 or FIG. 2-7 can be displayed based on the tap of the call notification sound change button, as an example, not a limitation.

Third Example Embodiment

The third example embodiment is an embodiment in which a music piece can be set as the call notification sound.

In the third example embodiment, use of a music application in addition to or instead of the messaging application is illustrated.

In addition to or instead of the music application, at the terminal 20, it may or may not be possible to access a website operated by a music piece distribution service provider (hereinafter referred to as "music piece website") to play the music piece.

For the simplicity of explanation, account registration data in the music application and account registration data in the messaging application are described below as common data in this example embodiment.

Separate account registration data and/or account management database may or may not be used between the music application and the messaging application. Between the messaging service and the music piece distribution service, the servers 10 providing the services may or may not be a separate entity.

the following, the name of the music application will be illustrated and described as "Music App" as appropriate.

The information described in the third example embodiment is applicable to the other example embodiments and variants thereof.

The same components as those previously described are indicated with the same symbols and are omitted from the description thereafter.

<Functional Configuration>

FIG. 3-1 shows an example of information and the like stored in the storage unit 15 of the server 10 in a third example embodiment.

In addition to the aforementioned program and data, the storage unit 15 stores the music piece management database 159, as an example, not a limitation.

The music piece management database 159 is a management database for managing music pieces that can be played by the music application.

An example of the data structure of the music piece management database 159 is shown in FIG. 3-2.

The music piece management database 159 stores the music piece management data as management data for each music album, as an example, not a limitation.

Each piece of music piece management data stores an album ID, an album name, an artist ID, an album artist name, album art URI, other information, and track management data, as an example, not a limitation.

The album ID is information used to identify the music album (including, as an example, not a limitation, albums, singles, EPs, mini-albums, etc.).

For example, the album ID is unique for each music album, and as an example, not a limitation, a unique value (unique value) is set and stored for each music album by the server 10.

The album name is the name of this music album, and, as an example, not a limitation, the name entered by the user of the server 10 upon registering a music album is stored.

The artist ID is information used to identify the artist of this music album.

For example, this artist ID is a unique value for each artist, and as an example, not a limitation, a unique value (unique value) is set and stored for each artist by the server 10.

The album artist name is the name of the artist of this music album, and, as an example, not a limitation, the name entered by the user of the server 10 upon registering a music album is stored.

The album art URI is a URI that indicates where the artwork (jacket) photo of this music album is stored, and, as an example, not a limitation, the URI specified by the user of the server 10 upon registering a music album is stored.

Other information can include various information such as, as an example but not a limitation, the total number of tracks in this music album, the year of release, music piece genre, comments, composer information, copyright information, etc.

Track management data is data for managing individual music pieces (each music) associated with the music album of this album ID, and, as an example, not a limitation, a track number (denoted as "Track No." in the figure), a track name, an artist name, and track data URI are stored in association with the track number.

The track number is a number used to designate the order of music pieces in the music album for this music piece. As an example, not a limitation, if the track number is "01", it means that the music piece is recorded as the first music piece in the music album.

The track name is the name of this music piece (music piece title).

The artist name is the name of the artist performing (singing) this music piece.

The track data URI is a URI that indicates the music piece data storage location for this music piece.

The contents in the track management data are, as an example, not a limitation, data entered by the user of the server 10 upon registering a music piece is stored.

The artist ID, album art URI, and other information may or may not be associated and stored for each track as track management data.

By using the music piece management database 159 as above, any music piece can be designated by a combination of an album ID and a track number. As an example, not a limitation, the combination of album ID and track number (hereinafter referred to as "music piece ID") is denoted by "Album ID—Track Number".

In the example in FIG. 3-2, the music piece with the track name (music piece title) "Swing MINO" can be designated by the music piece ID "AL02451-01". It can also be seen that the artist name of the music piece with the music piece ID "AL02451-03" is registered as "DEF Band & G".

FIG. 3-3 shows an example of an account management database 157C, which is an example of the account management database 157 according to an example embodiment. Account management data is stored in the account management database 157C as management data for each account.

Each account management data stores, as an example, not a limitation, an application ID, call notification sound setting data, and playlist management data.

The information stored in the call notification sound setting data in the account management database 157C is the same as in the account management database 157A, but the information stored in the call notification sound ID is partially different. In addition to the call notification sound ID registered in the call notification sound registration data 155, any music piece ID stored in the music piece management database 159 can be stored in the call notification sound ID.

The playlist management data is data for managing the playlists for this account in the music application, and, as an example, not a limitation, the playlist management data is stored in association with a music piece ID and a music piece order number (denoted as "Music Piece Order No." in the figure).

The music piece order number is a number used to specify the order of music pieces in the playlist and is set and stored by the server 10 upon adding music pieces to the playlist, as an example, not a limitation.

The music piece ID is information to identify the music piece and is set and stored by terminal 20 upon adding the music piece to the playlist, as an example, not a limitation.

"The "playlist" is a list of music pieces that list the order in which music pieces are played. The playlist may be said to be a music piece list.

The playlist may be a list of music piece playing queues in the music application set by the user of the terminal 20, or a list of music piece playing history for each account in the music application. The playlist may be a list of recommended music piece for each user generated by the server 10, or a list of playing rankings compiled by the server 10.

In addition to the playlist management data, favorite list management data or the like may or may not be stored for retaining favorite music pieces of the user of the terminal 20.

The playlist management data may or may not be stored in the account management data.

<Display Screen>

Figures 1, 2, 3, 4, 5:

FIGS. 3-4 to 3-5 show an example of screen transitions displayed on the display 24 of the terminal 20 in the third example embodiment.

The left side of FIG. 3-4 is an example of a call setting screen at the terminal 20B of the call destination account.

As an example, not a limitation, when the calling tone setting button CFB16 is tapped by the user, the call notification sound selection area SMN12 is displayed at the bottom of the screen. In addition to the call notification sound name registered in the call notification sound registration data 155, the call notification sound selection area SMN12 is configured to display a music piece selection item indicated by the words "Music App Collaboration" for setting a music piece as the call notification sound.

In this example, "Music App Collaboration" is selected, and the music piece selection item is displayed in bold font.

As an example, not a limitation, the display transitions to the screen in the center of FIG. 3-4 when the calling tone setting completion button is tapped.

The center of FIG. 3-4 is a music piece selection screen of the music application, with the words "Music App"

displayed in the top-most center of the screen as the name of the music application. In addition, the icon image and the user name (the user B.B in this example embodiment) in the music application of the user of this terminal 20B are displayed at the top right of the screen.

Below that, an in-app location display area is configured to indicate the current position in the music application. In this example embodiment, based on the fact that this is a music piece selection screen, the words "Select Music Piece" and the "<" button to return to the previous screen are displayed.

Below that, as an example, not a limitation, is a music piece selection tab that presents a method for selecting a music piece. The tab indicated by the words "Popular Music Pieces" is for selecting from among music pieces that have frequently been set as the call notification sound. The tab indicated by the word "Playlist" is for selecting a music piece from this user's playlist. The tab indicated by the word "Favorites" is for selecting a music piece from the user's favorite music piece list.

This screen shows the state that the "Playlist" tab is tapped in the music piece selection tab, as an example, not a limitation.

Below the track selection tab, the music pieces registered in the playlist are displayed in order. In each music piece, as an example, not a limitation, artwork, a track name, and an artist name are collectively displayed. As an example, not a limitation, the first music piece in the playlist displays the artwork AR1, the track name TN1 "JKL Rock and Roll" and the artist name TA1 "ABC Punk Rocker". The same applies to the second and subsequent tracks.

As an example, not a limitation, when the artwork AR1 is tapped, a mini-player of the music application is activated, and the selected music piece is played.

As an example, not a limitation, when the area including the track name TN1 and the artist name TA1 is tapped, the selected music piece is set as the call notification sound.

In the center screen of FIG. 3-4, as an example, not a limitation, when the second music piece is tapped, the display transitions to the call setting screen on the right side of FIG. 3-4, as an example, not a limitation.

In this screen, the calling tone setting button CFB16 includes an indication that the call notification sound currently set as the calling tone is a music piece of "Music App Collaboration". Below that, the track name and the artist name of the configured music piece are displayed.

The talk room screen on the left side of FIG. 3-5 is an example, not a limitation, in the setting screen of the right side of FIG. 3-4, of the talk room screen after a call at the terminal 20A of the call origin account is ended, corresponding to the left side of FIG. 2-1 when a desired (or alternatively, predetermined) music piece (in this example, the track name "Swing MNO") is set as a calling tone for the user B.B. In this screen, the call notification sound information NSR31 is configured to be displayed as the call notification sound information in the call processing result information CRR31.

The call notification sound information NSR31 is configured to display an indication that the displayed call notification sound is the calling tone for the user B.B, which is the call destination account, as well as information pertaining to the music piece that is set as the call notification sound (hereinafter referred to as "call notification music piece information"). In addition, the artwork AR2, the track name TN2 "Swing MNO" and the artist name TA2 "DEF Band" are also displayed. In addition, the call notification sound information NSR31 is configured to display a music piece playing button PLB1 for playing the music piece that is set as the call notification sound.

As an example, not a limitation, when the track name TN2 is tapped, the screen transitions to the music album list display that includes this music piece. Also, as an example, not a limitation, when the artist name TA2 is tapped, the screen transitions to the list of music albums that include this artist name.

As an example, not a limitation, when the music piece playing button PLB1 is tapped, the display transitions to the talk room screen in the center of FIG. 3-5. On this screen, the music application mini-player MNP1 is activated and is configured to be superimposed on the talk room screen. In addition, the music piece is produced from the sound output unit 26 of the terminal 20A.

On the right side toward the user in the talk area TR11, the text content TC31 is displayed with the user A.A as the sender, stating that the user B.B likes the music piece that is set as a calling tone.

The right side of FIG. 3-5 shows an example of the talk room screen after the call is ended at the terminal 20B of the call destination account.

In this example, the talk area TR12 displays the text content TC13 corresponding to the text content TC11, the text content TC14 corresponding to the text content TC12, and the call processing result information CRR32. Below that, the text content TC31 and the corresponding text content TC32 are displayed, and the text content TC33 is displayed with the user B.B as the sender, stating that the user B.B likes the music piece that is set as a calling tone.

The display configuration of the call processing result information CRR32 can be configured in the same way as the call processing result information CRR31, as an example, not a limitation. When the music piece playing button PLB2 is tapped, the mini-player of the music application is activated and is configured to be superimposed on the talk room screen. In addition, the music piece is produced from the sound output unit 26 of the terminal 20B.

\<Processing\>

FIG. 3-6 is a flowchart showing an example of the flow of processing performed by each device in the third example embodiment.

In the step of S130, the control unit 21 of the server 10 sends call notification music piece information including a music piece ID as information pertaining to a ringtone (calling tone), as an example, not a limitation, when a music piece is set as the call notification sound. The call notification music piece information may include a track name, an artist name, album art information, etc.

When the control unit 21 of the terminal 20A displays the call processing result information (A150), it determines, based on the displayed call processing result information, whether to play the music piece of the call notification sound. As an example, not a limitation, when to play the music piece is selected based on the input to the input/output unit 23 of the terminal 20A, the control unit 21 of the terminal 20A sends the music piece request information including the music piece ID to the server 10 by means of the communication I/F 22 (A310).

When the music piece request information is received by means of the communication I/F 14, the control unit 11 of the server 10 reads out the music piece ID from the received music piece request information. Then, the control unit 11 of the server 10 searches for the track data URI specified by the music piece ID based on the music piece management database 159. The control unit 11 of the server 10 then reads out data of the music piece file based on the track data URI.

The control unit 11 of the server 10 sends the music piece information including the data of the music piece file to the terminal 20A by means of the communication I/F 14 (S310).

In response to receiving the music piece information from the server 10 by means of the communication I/F 22, the control unit 21 of the terminal 20A executes music piece playing processing (A320). In the music piece playing processing, the control unit 21 of the terminal 20A causes the sound output unit 29 to produce the music piece based on the received music piece information.

The control unit 11 of the server 10 may send the track data URI as the music piece information. In this case, in the music piece playing processing, the control unit 21 of the terminal 20A requests the data of the music piece file based on the track data URI and causes the received data to be produced as sound.

<Effect of Third Example Embodiment>

This embodiment shows a configuration in which a processor of the terminal performs a process including playing a music piece based on the sound information based on the input by the user with respect to the call information displayed in the chat room.

As an example of the effect of the example obtained by such a configuration, a sound based on the sound information can be played and heard by the user of the terminal based on the input of the user of the terminal to the call information displayed in the chat room that includes the user of the terminal and the first user of the first terminal.

<Third Variant (1)>

The third example embodiment described above shows a case where the music application is already installed on the terminal 20A, but the inventive concepts are not limited thereto. As an example, not a limitation, the inventive concepts may apply to a case where the music application is not installed on the terminal 20A.

FIG. 3-7 shows an example of a screen transition displayed on the display 24 of the terminal 20 in a variant of the third example embodiment.

A talk room screen on the left side of FIG. 3-7 is an example of the talk room screen after the call is ended at the terminal 20A of the call origin account, similar to the left side of FIG. 3-5.

As an example, not a limitation, when the music piece playing button PLB2 is tapped, the display transitions to the talk room screen on the right side of FIG. 3-7. In this screen, based on the fact that the music application is not installed on the terminal 20A, the application request notification area NTR1 is configured to move up from the bottom of the display screen.

In the application request notification area NTR1, a message stating that installation of the application is required to play the music piece and the words "Music App", which is the name of the application for which the installation is required, are displayed. Below that, a message for confirming that the application is to be installed, the install button SBT3 for installing the application, and the cancel button SBT4 for suspending the processing without installing the application are displayed.

As an example, not a limitation, when the install button SBT3 is tapped by the user, the music application is downloaded and installed on the terminal 20A.

If the music application is not installed on the terminal 20A, the control unit 21 of the terminal 20A may or may not, as an example, not a limitation, start a web browser in the background and access a music piece site to play the music piece when the music piece playing button PLB2 is tapped.

This variant shows a configuration in which, if the music application (not a limitation, but an example of a set application) has not been downloaded to the terminal, based on a user input with respect to the music piece playing button based on the call notification music piece information displayed in the chat room (not a limitation, but an example of call information), information pertaining to downloading the application which is to be performed by the terminal is displayed on the display unit.

As an example of the effect of this variant of the third example embodiment obtained by such a configuration, if a set application has not been downloaded to the terminal, based on the input of the user of the terminal to the call information displayed in the chat room that includes the user of the terminal and the first user of the first terminal, it is possible to easily have the application downloaded and whereby improves convenience.

<Third Variant (2)>

In the third example embodiment described above, the call notification music piece information displayed as the call notification sound information is shown as an example of being displayed in a talk room between the call destination account and the call origin account of the call, but the inventive concepts are not limited thereto. As an example, not a limitation, the call notification music piece information may be shared with a third party other than the parties of the call.

FIG. 3-8 shows an example of a screen transition displayed on the display 24 of the terminal 20 in a variant of the third example embodiment.

The talk room screen on the left side of FIG. 3-8 is an example of the talk room screen after the call is ended at the terminal 20A of the call origin account, similar to the left side of FIG. 3-5.

As an example, not a limitation, when the artwork AR2 of the call notification sound information NSR31 is tapped by the user, the screen transitions to the talk room screen in the center of FIG. 3-8.

This screen is configured to display the call notification music piece information display area TIR1 for displaying the call notification music piece information superimposed on the talk room screen on the left side of FIG. 3-8.

The call notification music piece information display area TIR1 is configured to display the artwork AR2 in a large image, as an example, not a limitation. Below that, the track name TN2 "Swing MNO" and the artist name TA2 "DEF Band" are displayed. As an example, not a limitation, when the track name TN2 is tapped, the screen transitions to the display of the list of music pieces in the music album that includes this music piece. Also, as an example, not a limitation, when the artist name TA2 is tapped, the screen transitions to the display of the list of music albums that include this artist name.

Below the artist name TA2, a music piece favorite registration button SBT5, indicate" by the words "Register as Favorite" to register this music piece in the favorite list of the music application, the music piece ringtone setting button SBT6, indicated by "Set as Ringtone" to set this music piece as a ringtone of the call notification sound, and the music piece calling tone setting button SBT7, indicated by the words "Set as Calling Tone" to set this music piece as a calling tone of the call notification sound.

As an example, not a limitation, the upper right side of the artwork AR2 is configured to display the music piece share button TSB1 to share information pertaining to this music piece with other users.

As an example, not a limitation, when the music piece sharing button TSB1 is tapped by a user, the display transitions to a screen for selecting a user or group to share with. When the user or group to be shared is selected, the call notification music piece information displayed in the call notification music piece information display area TIR1 is sent to the talk room with that user or group.

The talk room screen on the right side of FIG. 3-8 is an example, not a limitation, of the display screen on the terminal 20C of the user C.C when the user C.C is specified as the destination for sharing the call notification music piece information.

In this screen, below the name of the messaging application, the words "A.A" is displayed as a talk room name, indicating that it is a one-to-one talk room with the user A.A, and the "<" button is displayed to return to the previous screen. Below that, the talk area TR13 is placed.

The music piece information shared content TSC1, which is a shared call notification music piece information content with the user A.A as the sender, is displayed on the left side toward the user in the talk area TR13. The music piece information shared content TSC1 is configured to display the artwork AR2, the track name TN2 "Swing INO", the artist name TA2 "DEF Band", and the music piece playing button PLB4, as an example, not a limitation.

The actions of each element in the music piece information sharing content TSC1 can be configured similarly to the actions in the call notification sound information NSR31, as an example, not a limitation.

In this variant of the third embodiment, on the left side toward the user in the talk area TR13, the text content TC34 is displayed with the user A.A as the sender, stating that the user A.A has guessed that the music piece shared as call notification music piece information will be a hit. In addition, on the right side of the talk area TR13, the text content TC35 is displayed with the user C.C as the sender, stating that the music piece shared as call notification music piece information is the first time he/she heard the music piece, and it has touched his/her heartstrings.

FIG. 3-9 is a flowchart showing an example of the flow of processing performed by each device in the variant illustrated in FIG. 3-8.

When the control unit 21 of the terminal 20A displays the call processing result information (A150), if, as an example, not a limitation, it is determined based on the input to the input/output unit 23 of the terminal 20A that the call notification music piece information is selected among the call processing result information to be shared with another user (or group), then the music piece sharing request information including the application ID (or group ID) of the call notification music piece information to be shared and the call notification music piece information are sent to the server 10 by means of the communication I/F 22 (A330). Here, an example where the user B.B is the sharing destination is shown.

In response to receiving the music piece sharing request information from the terminal 20A by means of the communication I/F 14, the control unit 11 of the server 10 sends the music piece sharing information including the call notification music piece information to the terminal 20 of the account to be shared by means of the communication I/F 14 based on the received music piece sharing request information (S 320).

In response to receiving the music piece sharing information from the server 10 by means of the communication I/F 22, the control unit 21 of the terminal 20B displays the received music piece sharing information on the display unit 24 (B310).

This variant shows a configuration in which a processor of the terminal performs a process including sending at least the sound information based on an input by the user of the terminal to the call information.

As an example of the effect of this variant of the third example embodiment obtained by such a configuration, sound information can be sent based on an input by the user of the terminal to the call information. As a result, as an example, not a limitation, it is possible to share sound information with the destination (user of the destination).

<Third Variant (3)>

In the third example embodiment, a music piece can be set as the call notification sound.

As an example, not a limitation, this example embodiment can also be applied to various contents such as individual settings of the call notification sound according to the second variant (2).

As an example, not a limitation, the call setting screen shown in FIG. 2-5 and FIG. 2-7 can be used to set a music piece as a ringtone or a calling tone, and the same music piece can be set for all users, or a music piece can be set by each user or each group. The call setting screen shown in FIG. 2-5 or FIG. 2-7 may be combined with the call setting screen shown in FIG. 3-4.

In FIG. 3-5, FIG. 3-7, etc., the music piece playing button for playing the music piece set as the call notification sound is displayed as the call notification sound information, but this may not be displayed.

The third example embodiment and the second variant (3) may also be combined. As an example, not a limitation, the call processing result information displayed in the talk room in FIG. 3-5, FIG. 3-7, etc. may include the call status information and the call notification sound change button, but may not include the call notification sound information. The call setting screen shown in FIG. 3-4 may be displayed based on the tap of the call notification sound change button, or the call setting screen combining the call setting screen in FIG. 2-5 or FIG. 2-7 and the call setting screen in FIG. 3-4 may be displayed, as described above.

Similarly, when the third example embodiment and the second variant (3) are combined, the call notification music piece information (artwork, track name, artist name, etc. as an example, not a limitation), which is a component of the call notification sound information, may not be displayed, but the music piece playing button may be displayed. In this case, conceptually, the component of the call notification sound information may be the call notification music piece information, and this call notification sound information (equivalent to call notification music piece information) may not be included in the call processing result information. Then, as an example but not a limitation, information indicating who the call notification sound belongs to (for example, a text such as "Ringtone for User X.X" or "Calling tone for User YY"), the music piece playing button, and the call notification sound change button are included in the call processing result information, and this information is displayed in the talk room.

Fourth Example Embodiment

In the above example embodiments, the same call notification sound information is displayed at the terminal 20 of the call origin account and at the terminal 20 of the call destination account.

The fourth example embodiment is an example that allows different call notification sound information to be displayed at between the terminal 20 of the call origin account and the terminal 20 of the call destination account.

The contents described in the fourth example embodiment are applicable to the other example embodiments and variants thereof.

The same components as those previously described are indicated with the same symbols and are omitted from the description thereafter.

<Display Screen>

FIG. 4-1 shows an example of a screen transition displayed on the display 24 of the terminal 20 in the fourth example embodiment.

The talk room screen on the left side of FIG. 4-1 is an example, not a limitation, of the talk room screen after the call is ended at the terminal 20A of the call origin account corresponding to the left side of FIG. 2-1 when the music piece with the track name "Swing MINO" is set as a calling tone for the user B.B and the music piece with the track name "JKL Rock and Roll" is set as a ringtone for the user B.B. In this screen, the call notification sound information NSR41 is configured to be displayed as the call notification sound information in the call processing result information CRR41.

The call notification sound information NSR41 is configured to display an indication that the displayed call notification sound is a calling tone for the user B.B, which is the call destination account, as well as the call notification sound information, the artwork AR2, the track name TN2 "Swing MNO," the artist name TA2 "DEF Band", and the music piece playing button PLB1 to play the music piece.

Among the components of the call notification sound information NSR41 (artwork AR2, track name TN2, artist name TA2, and music piece playing button PLB1), all components may be displayed, or only some components (as an example, not a limitation, track name TN2 and music piece playing button PLB1) may be displayed.

The call notification sound information NSR41 may or may not include other components (e.g., length of the music piece, year of release, etc., as an example, not a limitation).

The same is true for other call notification sound information.

On the other hand, the talk room screen on the right side of FIG. 4-1 is an example, not a limitation, of the talk room screen after the call is ended at the terminal 20B of the call destination account when the music piece with the track name "Swing INO" is set as a calling tone for the user B.B in the setting screen on the right side of FIG. 3-4, and the music piece with the track name "JKL Rock and Roll" is set as a ringtone for the user B.B. In this screen, call notification sound information NSR42, which is different from the call notification sound information NSR41, is configured to be displayed as the call notification sound information in the call processing result information CRR42.

In the call notification sound information NSR42, in addition to an indication that the displayed call notification sound is a ringtone for the user B.B, which is the call destination account, as the call notification music piece information, the artwork AR1, the track name TN1 "JKL Rock and Roll", the artist name TA1 "ABC Punk Rocker, and the music piece playing button PLB2 for playing this music piece are configured to be displayed.

<Processing>

The processing can be achieved, as an example, not a limitation, in the step of S130 in FIG. 1-11, by making the control unit 11 of the server 10 send different call notification sound information to the terminal 20 of the call origin account and to the terminal 20 of the call destination account as the call processing result information.

As an example, not a limitation, if the types of the call notification sound information are a calling tone and a ringtone, the following four types of call notification sound information can be sent to each terminal 20.

(A) calling tone for call origin account (B) calling tone for call destination account (C) ringtone for call origin account (D) ringtone for call destination account In this case, FIG. 4-2 shows the combination of the call notification sound information sent to the terminal 20 of the call origin account and the call notification sound information sent to the terminal 20 of the call destination account.

Because there are the four types (A) through (D) of call notification sound information sent to the terminal 20 of the call origin account, and the four types (A) through (D) of call notification sound information sent to the terminal 20 of the call destination account, the call notification sound information is sent in 16 (4 times 4) different combinations. In this table, the display pattern item indicates a combination method of above (A) through (D), the terminal 20 of the call origin account item indicates a content of the call notification sound information sent to the terminal 20 of the call origin account, and the terminal 20 of the call destination account item indicates a content of the call notification sound information sent to the terminal 20 of the call destination account.

If there are "N" ("N" is a natural number) types of call notification sound information, there are "2 to the power of 2N" combinations of call notification sound information sent to the terminal 20 of the call origin account and call notification sound information sent to the terminal 20 of the call destination account.

<Effect of Fourth Example Embodiment>

This example embodiment shows a configuration in which the sound information includes information that differs between the user of the terminal and the first user of the first terminal.

As an example of the effect of the fourth example embodiment obtained by such a configuration, the sound information including different information between the user of the terminal and the first user of the first terminal can be displayed in a chat room including the user of the terminal and the first user of the first terminal to be notified to the user of the terminal.

This example embodiment also shows a configuration in which the chat room displayed at the terminal displays as sound information, information pertaining to a calling tone set by the first user, and the chat room displayed at the first terminal displays as sound information, information pertaining to a ringtone set by the first user.

As an example of the effect of the fourth example embodiment obtained by such a configuration, information pertaining to a calling tone set by the first user of the first terminal is displayed in a chat room displayed on the terminal to be notified to the user of the terminal. On the other hand, information pertaining to a ringtone set by the first user is displayed in a chat room displayed on the first terminal to be notified to the first user of the first terminal. In other words, the call origin user can acknowledge information pertaining to a calling tone set by the call destination user, while the call destination user can confirm information pertaining to a ringtone set by him/herself, whereby improving convenience for both users.

This example embodiment also shows a configuration in which the chat room displayed at the terminal displays information pertaining to a ringtone or a calling tone set by the user as sound information, and the chat room displayed at the first terminal displays information pertaining to a ringtone or a calling tone set by the first user as sound information.

As an example of the effect of the fourth example embodiment obtained by such a configuration, information pertaining to a ringtone or a calling tone set by the user of the terminal can be displayed in a chat room displayed on the terminal to be notified to the user of the terminal. On the other hand, information pertaining to a ringtone or a calling tone set by the first user can be displayed in a chat room displayed on the first terminal to be notified to the first user of the first terminal. As a result, the convenience of both users can be improved.

<Fourth Variant (1)>

In the fourth example embodiment described above, the terminal 20 displays information pertaining to a currently set ringtone or calling tone as the call notification sound information in the call processing result information, but the inventive concepts are not limited thereto. As an example, not a limitation, if a ringtone or a calling tone has not been changed from the default setting, the display may prompt the user to change the call notification sound.

FIG. 4-3 shows an example of a screen transition displayed on the display 24 of the terminal 20 in a variant of the fourth example embodiment.

The talk room screen on the left side of FIG. 4-3 is an example, not a limitation, of a talk room screen after the call is ended at the terminal 20A of the call origin account corresponding to the left side of FIG. 2-1, in the case that the call notification sound has not been changed (not set) from the default setting at the terminal 20A of the call origin account and at the terminal 20B of the call destination account. In this screen, the call notification sound information NSR43 is configured to be displayed as the call notification sound information in the call processing result information CRR43. In addition, based on the fact that the call is canceled at the terminal 20A of the call origin account during the call ringing, the word "Canceled" is displayed in the call status information CSR41.

In the call notification sound information NSR 43, it is displayed that a calling tone for the user B.B is set to "System Sound 01" which is the default setting tone as the call notification sound information. In addition, based on the fact that the call notification sound has not been changed from the default setting at the terminal 20A of the call origin account, the words "Let's change to your favorite music piece" is displayed to prompt for the call notification sound to be changed.

On the other hand, the talk room screen on the right side of FIG. 4-3 is an example of the talk room screen after the call is ended at the terminal 20B of the call origin account, corresponding to the above case. In this screen, the call notification sound information NSR44 is configured to be displayed as the call notification sound information in the call processing result information CRR44. In addition, based on the fact that the call is canceled at the terminal 20A of the call origin account during the incoming call, the call status information CSR42 displays the words "Missed Call".

The call notification sound information NSR 44 displays that a ringtone for the user B.B is set to "System Sound 02" which is the default setting sound as the call notification sound information. In addition, based on the fact that the call notification sound has not been changed from the default setting at the terminal 20B of the call destination account, the words "Let's change to your favorite music piece" is displayed to prompt for the call notification sound to be changed.

Below the call processing result information CRR44, on the right side of the talk area TR12, the text content TC41 is displayed, which describes that the user B.B is the sender and that he/she did not notice the ringtone of the call due to his/her noisy surroundings, and the text content TC42 which describes that the user A.A is asked what music piece is suitable for a ringtone is displayed.

FIG. 4-4 is a flowchart showing an example of the flow of processing performed by each device in this variant of the fourth example embodiment.

After displaying the call processing result information (A150), the control unit 21 of the terminal 20A determines whether the call notification sound setting has been changed from the default setting (A410). Here, the control unit 21 of the terminal 20A may determine whether the call notification sound setting has been changed from the call notification sound ID registered in the call notification sound registration data 155 to a music piece ID. Prior to this determination, the control unit 21 of the terminal 20A may receive the current setting status from the server 10.

If it is determined that the call notification sound setting has not been changed from the default setting (A410: NO), the control unit 21 of the terminal 20A displays call notification sound setting prompting information on the display unit 24 to prompt to change the setting of the call notification sound. By executing the step of A410 prior to the step of A150, the control unit 21 of the terminal 20A may display the call notification sound setting prompting information on the display 24 together with the call processing result information.

As an example, not a limitation, if changing the call notification sound setting is selected based on the input to input/output unit 23 of the terminal 20A, the control unit 21 of the terminal 20A obtains the call notification sound setting information based on the input to input/output unit 23 of the terminal 20A, as an example, not a limitation, and sends the call notification sound setting information to server 10 by means of the communication I/F 22 (A430).

If it is determined that the call notification sound setting has been changed from the default setting (A410: YES), the control unit 21 of the terminal 20A skips steps A420 and A430.

The control unit 21 of the terminal 20B performs steps B410 to B430 as well as steps A410 to A430.

When it is determined that call notification sound setting information is received from the terminal 20 by means of the communication I/F 14 (S410: YES), the control unit 21 of the server 10 executes call notification sound setting processing based on the received call notification sound setting information (S420). When it is determined that the call notification sound setting information is not received (S410: NO), the control unit 21 of the server 10 ends the processing.

The control unit 11 of the server 10 may perform the determination as to whether or not the call notification sound setting has been changed from the default setting (or changed from a call notification sound ID to a music piece ID). In this case, as an example, not a limitation, the control unit 11 of the server 10 sends the call notification sound setting prompting information to the terminal 20 of the account for which it is determined that the call notification sound setting has not been changed from the default setting. When the control unit 21 of the terminal 20 receives the call notification sound prompting information, the control unit 21 displays the information on display unit 24.

The terminal 20 of the call origin account may or may not display the call notification sound prompting information on the display 24 if the call notification sound setting has not been changed from the default setting at the terminal 20 of the call destination account. The terminal 20 of the call destination account may or may not display call notification sound setting prompting information on the display 24 if the call notification sound setting has not been changed from the default setting at the terminal 20 of the call origin account.

This variant shows a configuration in which if sound information is set, the call information includes the sound information, and if sound information is not set, the call information includes information pertaining to setting the sound information.

As an example of the effect of this variant of the fourth embodiment obtained by such a configuration, if sound information is set, the sound information can be displayed to be notified to the terminal user. On the other hand, if sound information is not set, information pertaining to setting sound information can be displayed to prompt the terminal user to set sound information, or to allow the terminal user to set sound information.

<Fourth Variant (2)>

In the fourth example embodiment described above, the terminal 20 displays information pertaining to a currently set ringtone or calling tone as the call notification sound information in the call processing result information, but the inventive concepts are not limited thereto. As an example, not a limitation, if a ringtone or a calling tone has not been changed from the default setting, the call notification sound information may not be displayed in the call processing result information.

In this case, the display screen can be configured so that only the call status information CSR41 is displayed in the call processing result information CRR43 in the talk room screen on the left side of FIG. 4-3, as an example, not as a limitation. The call status information CSR41 and the call notification sound change button SCB11 may be configured to be displayed in the call processing result information CRR43.

On the other hand, in the talk room screen on the right side of FIG. 4-3, the call processing result information CRR44 can be configured so that only the call status information CSR42 is displayed. The call status information CSR42 and the call notification sound change button SCB31 can be configured to be displayed in the call processing result information CRR44.

<Fourth Variant (3)>

It is also possible to apply the contents of the second variant (2) to the fourth example embodiment and the above variants of the fourth example embodiment. It is also possible to apply the contents of the second variant (3) as shown in the fourth variant (2).

Fifth Example Embodiment

In the above example embodiment, the call status information and the call notification sound information are always displayed as the call processing result information at the terminal 20.

The fifth example embodiment is an example that allows the call notification sound information not to be displayed in call processing result information based on a time interval between calls.

The contents described in the fifth example embodiment are applicable to the other example embodiments and variants thereof.

The same components as those previously described are indicated with the same symbols and are omitted from the description thereafter.

<Display Screen>

FIG. 5-1 shows an example of a screen transition displayed on the display 24 of the terminal 20 in this example embodiment.

The left side of FIG. 5-1 shows an example of the talk room screen after the call is ended at the terminal 20A of the call origin account.

In this example embodiment, in addition to the text content TC11 and the text content TC12, the call processing result information CRR51 and the call processing result information CRR52 are displayed in the talk area TR11, based on a call made to the user B.B.

The call processing result information CRR52 is configured to display the call status information CSR52, the call notification sound information NSR51, and the call notification sound change button SCB11, as an example, not a limitation.

On the other hand, the call processing result information CRR51 is configured not to display the call notification sound information NSR51 and the call notification sound change button SCB1 based on the fact that the time interval between "17:06" that is the transmission time of the call processing result information CRR51 and "17:10" that is the transmission time of the call processing result information CRR52 is shorter than a desired (or alternatively, predetermined) time interval (as an example, not a limitation, "60 minutes").

In the talk room screen before "17:10" where CRR52 is not displayed, the call processing result information CRR51 is configured to display the call status information CSR51, the call notification sound information NSR51, and the call notification sound change button SCB11, as an example, not a limitation.

The center of FIG. 5-1 shows an example of a post-call talk room screen on the terminal 20A of the call origin account after a call is made and ended to the terminal 20B of the call destination account in the talk room screen on the left side of FIG. 5-1.

In this example, in addition to the text content TC11 and the text content TC12, the call processing result information CRR51, the call processing result information CRR52, and the call processing result information CRR53 are displayed in the talk area TR11, based on calls made to the user B.B.

The call processing result information CRR53 is configured to display the call status information CSR53, the call notification sound information NSR51, and the call notification sound change button SCB11, as an example, not a limitation.

On the other hand, in the call processing result information CRR52, based on the fact that the time interval between "17:10" that is the transmission time of the call processing result information CRR52 and "17:13" that is the transmission time of the call processing result information CRR53 is shorter than a desired (or alternatively, predetermined) time interval (not a limitation but an example, "60 minutes"), call notification sound information NSR51 and a call notification sound change button SCB11 are not displayed.

The right side of FIG. 5-1 shows an example of the talk room screen when a call is made and ended at the terminal 20A of the call origin account to the terminal 20B of the call destination account after some time has elapsed from the state of the talk room screen in the center of FIG. 5-1.

In this example, the call processing result information CRR52, the call processing result information CRR53, and the call processing result information CRR54 are displayed in the talk area TR11, based on calls made to the user B.B.

The call processing result information CRR53 includes, as an example, not a limitation, the call status information CSR53, the call notification sound information NSR51, and the call notification sound change button SCB11 based on the fact that the time interval between "17:13" that is the transmission time of the call processing result information CRR53 and "19:22" that is the transmission time of the call processing result information CRR53 is longer than a desired (or alternatively, predetermined) time interval (as an example, not a limitation, "60 minutes").

The call processing result information CRR54 is configured to display the display call status information CSR54, the call notification sound information NSR51, and the call notification sound change button SCB11, as an example, not a limitation.

<Processing>

FIG. 5-2 is a flowchart showing an example of the flow of processing performed by each device in this example embodiment.

When the control unit 11 of the server 10 finishes the call processing (S120), the control unit 11 calculates a time interval between the call end time in the previous call processing and the call end time in the current call processing, as an example, not a limitation. The control unit 11 then determines (S510) whether the time interval between the calls is shorter than a desired (or alternatively, predetermined) time (as an example, not a limitation, "60 minutes"). The control unit 11 of the server 10 may or may not determine whether the time interval between the calls is within a desired (or alternatively, predetermined) time.

If it is determined that the time interval between the calls is shorter than the desired (or alternatively, predetermined) time (S510: YES), the control unit 11 of the server 10 sends simplified call processing result information which is a simplified version of the call processing result information in the previous call processing, to the terminal 20B of the call destination account and the terminal 20A of the call origin account by means of the communication I/F 14 (S520). The simplified call processing result information includes, as an example, not a limitation, call status information.

If the time interval between the calls is determined to be equal to or longer than the desired (or alternatively, predetermined) time (S510: NO), the control unit 11 of the server 10 skips the step S520.

After sending the call processing result information (S130), the control unit 11 of the server 10 determines whether to end the processing (S530). As a case of ending the processing, as an example but not a limitation, a case where ending the processing is selected in the talk room at the terminal 20 can be given. If it is determined that the processing is to be ended (S530: YES), the control unit 11 of the server 10 ends the processing. If not (S530: NO), the control unit 11 of the server 10 returns the processing to the step of S110, as an example, not a limitation.

If it is determined that the simplified call processing result information is received from the server 10 by means of the communication I/F 22 (A510: YES), the control unit 21 of the terminal 20A overwrites the call processing result information corresponding to the previous call with the received simplified call processing result information, as an example, not a limitation, and displays it on the display unit 24 (A520).

If it is determined that the simplified call processing result information is not received (A520: NO), the control unit 21 of the terminal 20A skips the step of A520.

After displaying the call processing result information (A150), the control unit 21 of the terminal 20A determines whether to end the processing (A530). Cases of ending the processing include, as an example but not a limitation, a case where the messaging application is selected to be ended based on an input to the input/output unit 23 of the terminal 20A. If it is determined that the processing is to be ended (A530: YES), the control unit 21 of the terminal 20A ends the processing. Otherwise (A530: NO), the control unit 21 of the terminal 20A returns the processing to the step of A110, as an example, not a limitation.

The same is true for the terminal 20B.

The flowchart shows an example in which the latest call processing result information always includes call notification sound information, but the inventive concepts are not limited thereto. If it is determined that the time interval between the calls is shorter than the desired (or alternatively, predetermined) time (S510: YES), the control unit 11 of the server 10 may send simplified call processing result information which is a simplified version of the call processing result information for the current call processing, to the terminal 20B of the call destination account and the terminal 20A of the call origin account by means of the communication I/F 14. In this case, the control unit 11 of the server 10 skips the step S130. The control unit 21 of the terminal 20A displays the received simplified call processing result information on the display unit 24 as the call processing result information for the current call, as an example, not a limitation.

<Effect of Fifth Example Embodiment>

This example embodiment shows a configuration in which a processor of the terminal performs a process including displaying in the chat room, first call information pertaining to a first call between at least the user and the first user, and second call information pertaining to a second call between at least the user and the first user, wherein one of the first call information and the second call information includes the sound information if a time interval based on the first call and the second call is shorter than a set interval, and the first call information and the second call information include the sound information if the time interval based on the first call and the second call is longer than the set interval.

As an example of the effect of the example embodiment obtained by such a configuration, if the time interval based on the first call and the second call is shorter than the set interval, sound information is included in one of the first call information and the second call information, and thereby it is possible to notify the user of the terminal of the sound information pertaining to one of the first call and the second call. In other words, as an example, not a limitation, if the two calls are made with a relatively short interval (e.g., an interval shorter than a reference value) between them (a case where frequent calls are made), the display of sound information pertaining to one of the calls is omitted and thereby the user of the terminal does not feel annoyed.

In contrast, if the time interval based on the first and second calls is longer than the set interval, the sound information can be included in the first and second call information, and thereby the user of the terminal is notified of the sound information related to both the first and second calls. In other words, as an example, not a limitation, the display of sound information is not omitted if the two calls are made with a relatively long interval (e.g., an interval greater than a reference value) between them, unlike the above.

<Fifth Variant (1)>

In the fifth example embodiment described above, the server 10 determines whether or not to include the call notification sound information in the call processing result information, but the inventive concepts are not limited thereto. As an example, not a limitation, the determination may be made at the terminal 20.

In this case, as an example, not a limitation, when the control unit 21 of the terminal 20A receives the call processing result information, the control unit 21 calculates a time interval between the transmission time of the call processing result information in the previous call processing and the transmission time of the call processing result information in the current call processing. The control unit 21 then determines whether the time interval between the transmission times is shorter than a set time (as an example, not a limitation, "60 minutes"). The control unit 21 of the terminal 20A may or may not determine whether the time interval between the transmission times is within the set time.

If the time interval between the transmission times is determined to be shorter than the set time, the control unit 21 of the terminal 20A does not display the call notification sound information among the call processing result information for the previous call processing. Then, the control unit 21 of the terminal 20A displays the call processing result information for the current call processing on the display unit 24, including the call notification sound information.

The same is true for the terminal 20B.

<Fifth Variant (2)>

In the fifth example embodiment described above, the call notification sound information is displayed in the call processing result information, but the inventive concepts are not limited thereto. As an example, not a limitation, the call notification sound information may be independent and displayed as a system message in the talk room.

FIG. 5-3 shows an example of a screen transition displayed on the display 24 of the terminal 20 in this variant of the fifth example embodiment.

The left side of FIG. 5-3 shows an example of the talk room screen after the call is ended at the terminal 20A of the call origin account.

In this example, in addition to the text content TC11 and the text content TC12, the call processing result information CRR51 is displayed in the talk area TR11, based on calls made to the user B.B. In addition, the talk area TR11 is configured to display a call notification sound content area SMR51 which is call notification sound information based on the call processing result information CRR51. The call notification sound content area SMR51 is configured to be displayed along the center in the talk room, indicating that this call notification sound content is a system message (a message automatically sent by the server 10).

The call processing result information CRR51 is configured to display only the call status information CSR51, as an example, not a limitation. The call notification sound content area SMR51 is configured to display the call notification sound information NSR51 and the call notification sound change button SCB11, as an example, not a limitation.

The center of FIG. 5-3 shows an example of a post-call talk room screen on the terminal 20A of the call origin account after a call is made and ended to the terminal 20B of the call destination account in the talk room screen on the left side of FIG. 5-3.

In this example, in addition to the text content TC11 and the text content TC12, the call processing result information CRR51, the call processing result information CRR52, and the call notification sound content area SMR52 are displayed in the talk area TR11, based on calls made to the user B.B.

The call processing result information CRR51 is configured to display only the call status information CSR51, as an example, not a limitation. The call processing result information CRR52 is configured to display only the call status information CSR52, as an example, not a limitation.

The call notification sound content area SMR52 is configured to display the call notification sound information NSR51 and the call notification sound change button SCB11, as an example, not a limitation.

The right side of FIG. 5-3 shows an example of a post-call talk room screen on the terminal 20A of the call origin account after a call is further made and ended to the terminal 20B of the call destination account in the talk room screen in the center of FIG. 5-3.

In this example, in addition to the text content TC11 and the text content TC12, the talk area TR11 displays the call processing result information CRR51, the call processing result information CRR52, the call processing result information CRR53, and the call notification sound content area SMR53.

The call processing result information CRR51 is configured to display only the call status information CSR51, as an example, not a limitation. The call processing result information CRR52 is configured to display only the call status information CSR52, as an example, not a limitation. The call processing result information CRR53 is configured to display only the call status information CSR53, as an example, not a limitation.

On the other hand, the call notification sound content area SMR53 is configured to display the call notification sound information NSR51 and the call notification sound change button SCB11, as an example, not a limitation.

In this variant, the displays of call notification sound information are grouped in the call notification sound content area, whereby allowing users to easily grasp the call notification sound even when calls are frequently made.

<Fifth Variant (3)>

The second variant (2) and the second variant (3) may be applied to the fifth example embodiments and the above variants thereof.

As an example, not a limitation, when the second variant (3) is applied, among the call processing result information displayed in the talk room in FIGS. 5-1, 5-3, etc., when the call notification sound information is included to be displayed, while the call status information and the call notification sound change button may be displayed, the call notification sound information may not be displayed.

<Fifth Variant (4)>

This variant is an example of displaying the call processing result information when a block function is used in the messaging application. By using the block function, it is possible to make any messages (contents) sent from that user or group not received, while the user can keep the relationship with any other user or group (without un-friending or leaving the group).

FIG. 5-4 shows an example of a screen transition displayed on the display 24 of the terminal 20 in this variant.

The left side of FIG. 5-4 shows an example of a talk room screen when the user A.A is blocked at the terminal 20D of the call destination account.

In this example, the in-app location display area shows the text "A.A" indicating that the talk room name is a one-to-one talk room with user A.A, and the "<" button to return to the previous screen. On the right side toward the user in the talk area TR51, the text content TC51 is displayed with the user D.D as the sender, stating that that he/she is going to break up with the user A.A. Below that, as an example, not a limitation, the block notification area BNR51 is displayed, which is a system message indicating that a setting to block messages from the user A.A has been executed based on an input to the input/output unit 23 of the terminal 20D.

As an example, not a limitation, after the block setting is executed, messages (contents) sent from the user A.A are not displayed in the talk area TR51. Therefore, when a call is initiated from the terminal 20A of the call origin account to the terminal 20D of the call destination account, the incoming call display is not displayed at the terminal 20D and the sound of a ringtone is not produced.

The right side of FIG. 5-4 shows an example of a talk room screen when making a call is attempted after the user A.A is blocked by the user D.D at the terminal 20A of the call origin account.

In this example, the in-app location display area shows the text "D.D" indicating that the talk room name is a one-to-one talk room with the user D.D and the "<" button to return to the previous screen. On the left side toward the user in the talk area TR52, the text content TC52 corresponding to the text content TC51 is displayed. In the talk area TR52, a block notification area BNR51 is not displayed to prevent the user A.A from recognizing that the user A.A has been blocked.

On the right side toward the user A.A in the talk area TR51, the text content TC53 with the user A.A as the sender stating an apology to the user D.D, and the text content TC54 stating a plea to be reunited with the user D.D are displayed.

Below that, the call processing result information CRR55 is displayed based on a call made to the user D.D. The call processing result information CRR55 is configured to display the call status information CSR55, the call notification sound information NSR52, and the call notification sound change button SCB11, as an example, not a limitation.

In the call notification sound information NSR52, in addition to an indication that the displayed call notification sound is a calling tone for the user D.D, which is the call destination account, as the call notification music piece information, the artwork AR4, the track name TN4 "Requiem for XYZ" and the artist name TA4 "Group UVW" are displayed. In addition, the call notification music piece information NSR52 is configured to display the music piece playing button PLB1 for playing the music piece that is set as the call notification sound.

The displayed content of the call processing result information CRR55 is the same as before the block setting is made, and the user A.A cannot recognize that the user A.A is blocked by the user D.D.

<Fifth Variant (5)> Unlike the above example, the display of the call processing result information may be changed after the block setting is made.

FIG. 5-5 shows an example of a screen transition displayed on the display 24 of the terminal 20 in this case.

The left side of FIG. 5-5 shows an example of a talk room screen when the user A.A is blocked at the terminal 20D of the call destination account, similar to the left side of FIG. 5-4.

The right side of FIG. 5-5 shows an example of a talk room screen when making a call is attempted after the user A.A is blocked by the user D.D at the terminal 20A of the call origin account, similar to the right side of FIG. 5-4.

In this screen, the call processing result information CRR56 is displayed based on a call made to the user D.D. The call processing result information CRR56 is configured to display the call status information CSR55 and the call notification sound change button SCB11, as an example, not a limitation. Because the call notification sound information NSR52 for the user D.D is not displayed in the call processing result information CRR56, information pertaining to the setting status of the user D.D can be prevented from being leaked to the party who has made the block setting.

This variant shows a configuration in which the call information includes sound information even if the user of the terminal is blocked by the user D.D (as an example, not a limitation, of the first user of the first terminal).

As an example of the effect of this variant of the fifth example embodiment obtained by such a configuration, sound information can be displayed even if the user of the terminal is blocked by the first user of the first terminal. As a result, as an example, not a limitation, it is possible to prevent the user of the terminal from recognizing that the user is blocked by the first user of the first terminal.

This variant also shows a configuration in which the call information does not include sound information if the user of the terminal is blocked by the first user of the first terminal.

As an example of the effect of this variant of the fifth example embodiment obtained by such a configuration, sound information can be prevented from being displayed if the user of the terminal is blocked by the first user of the first terminal. As a result, as an example, not a limitation, it is possible to prevent the sound information set by the first user of the first terminal from being known to the user of the terminal.

Sixth Embodiment

The above example embodiments describe cases in which the call notification sound is a single call notification sound or music piece.

The sixth example embodiment is a case where in which the call notification sound is a combination of two or more call notification sounds and/or music pieces.

The sixth example embodiment describes a case in which a playlist in the music application described in the third example embodiment is used, as an example, not a limitation, as a method of combining call notification sounds and/or music pieces.

The contents described in the sixth example embodiment are applicable to the other example embodiments and variants thereof.

The same components as those previously described are indicated with the same symbols and are omitted from the description thereafter.

<Display Screen>

Figures 1, 2, 3, 4, 5, 6:
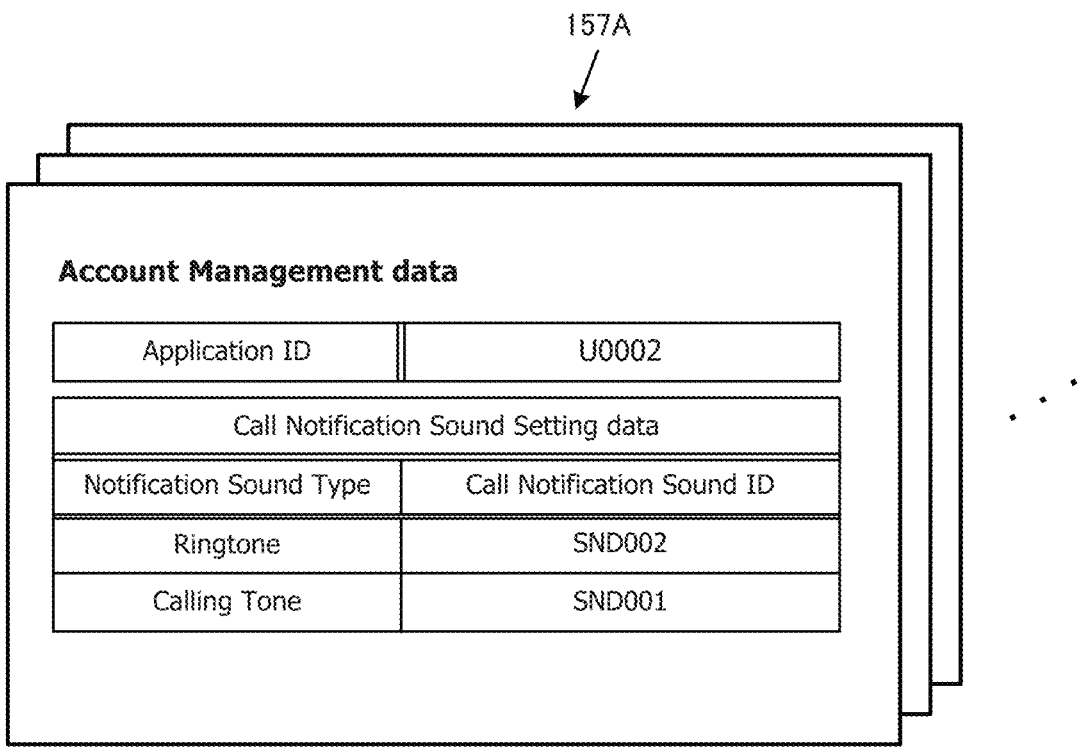
Figures 1, 2, 3, 4, 5, 6, 7:
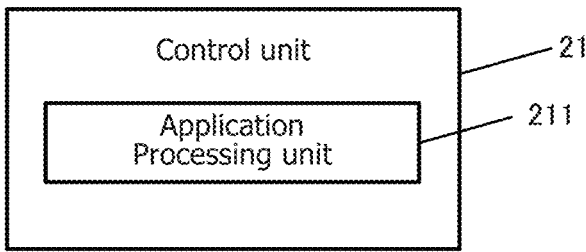
Figures 1, 2, 3, 4, 5, 6, 7, 8:
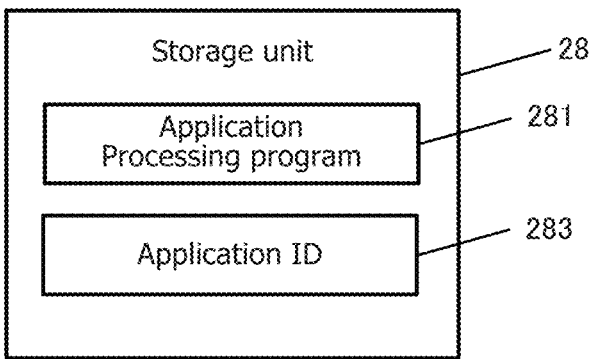
Figures 1, 2, 3, 4, 5, 6, 7, 8, 9:
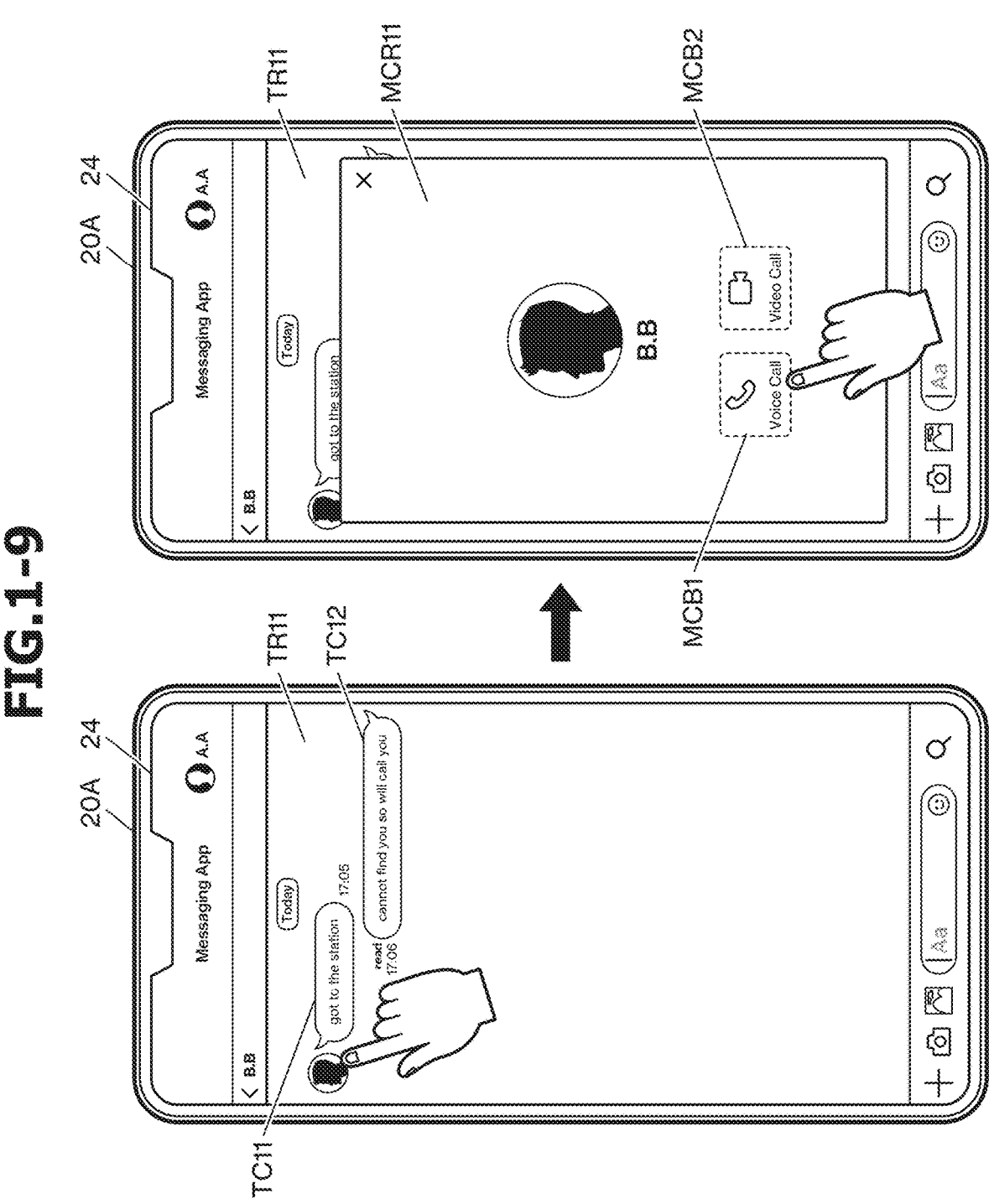
Figures 1, 2, 3, 4, 5, 6, 7, 8, 9, 10:
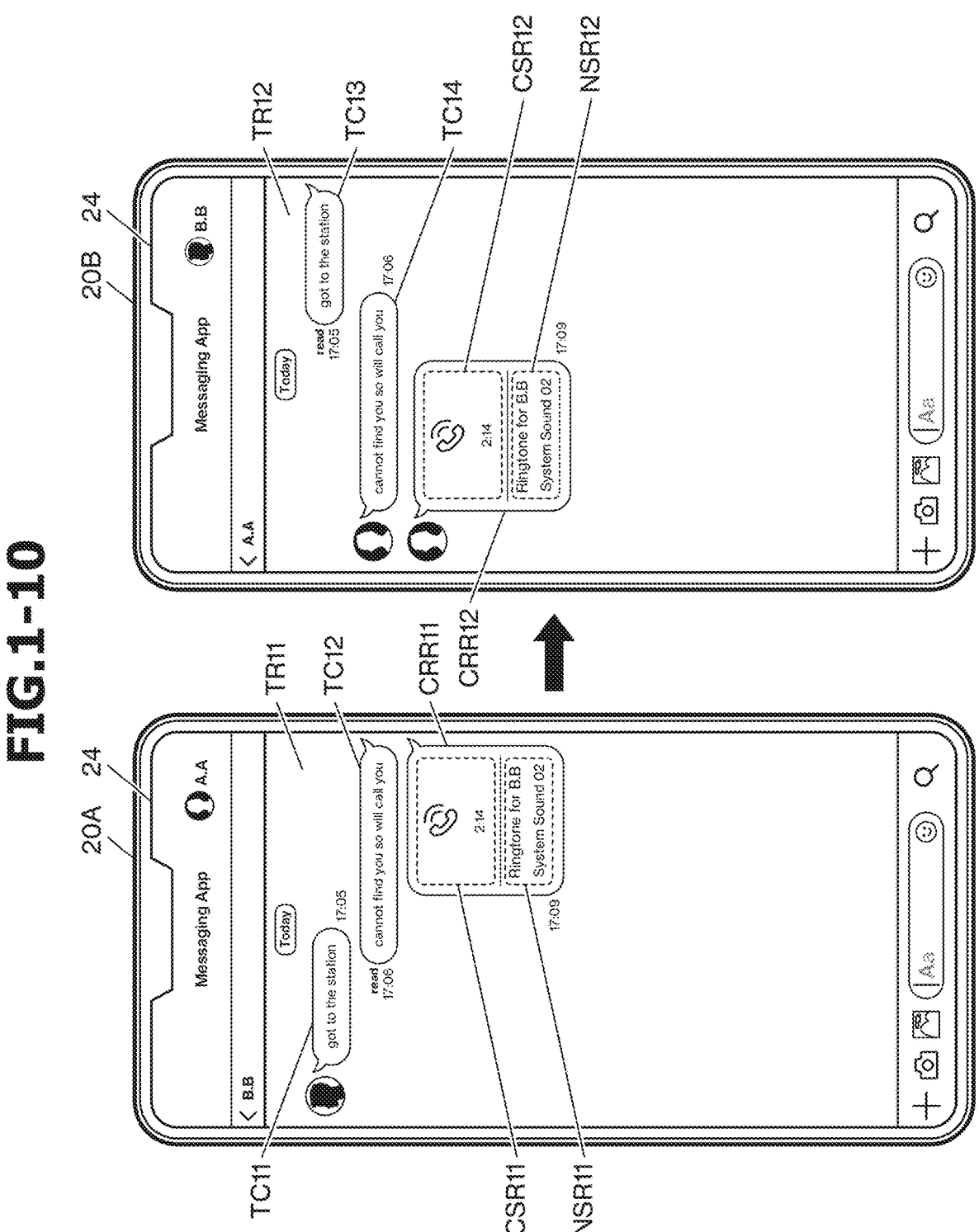
Figures 1, 2, 3, 4, 5, 6, 7, 8, 9, 10, 11:
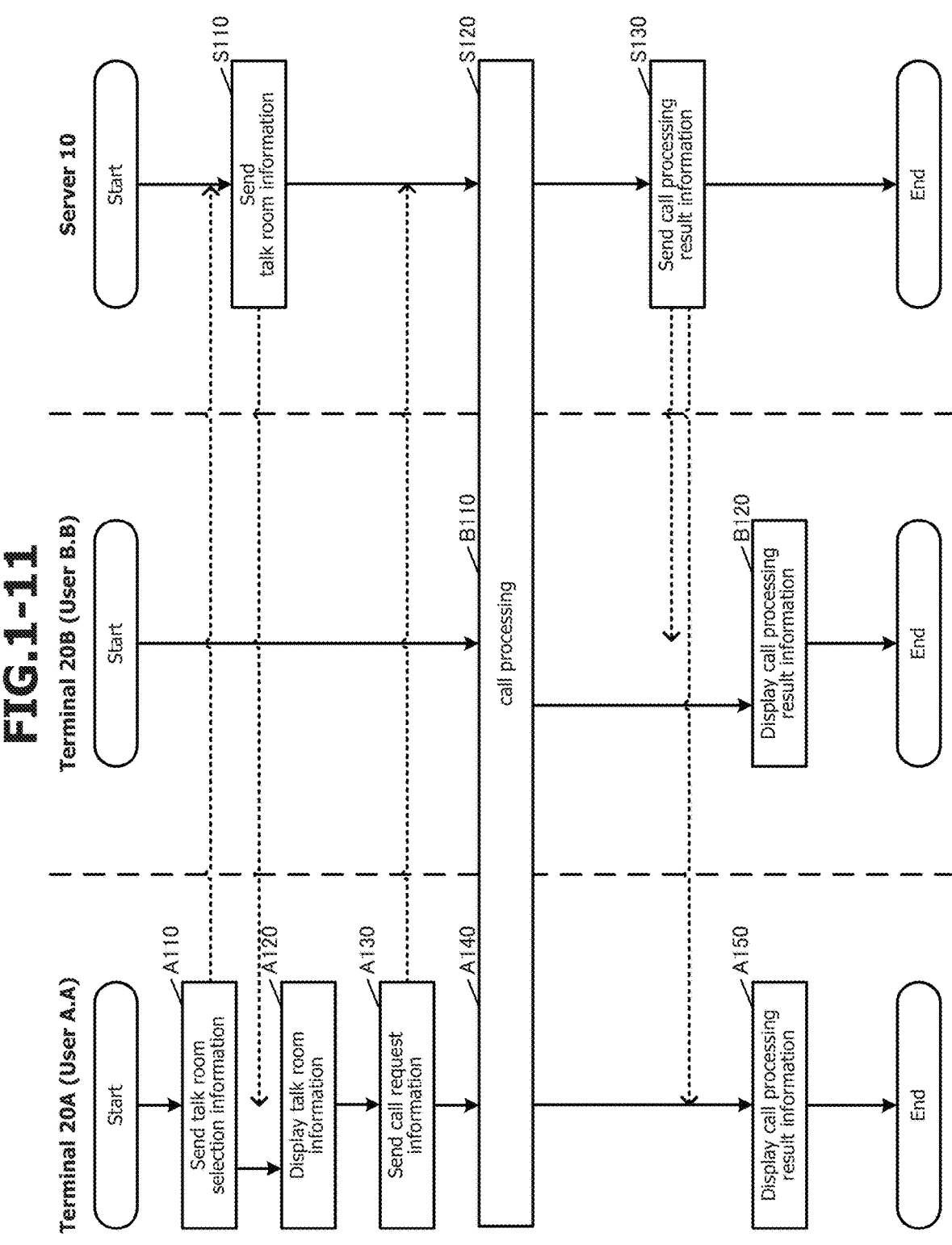
Figures 1, 2, 3, 4, 5, 6, 7, 8, 9, 10, 11, 12:
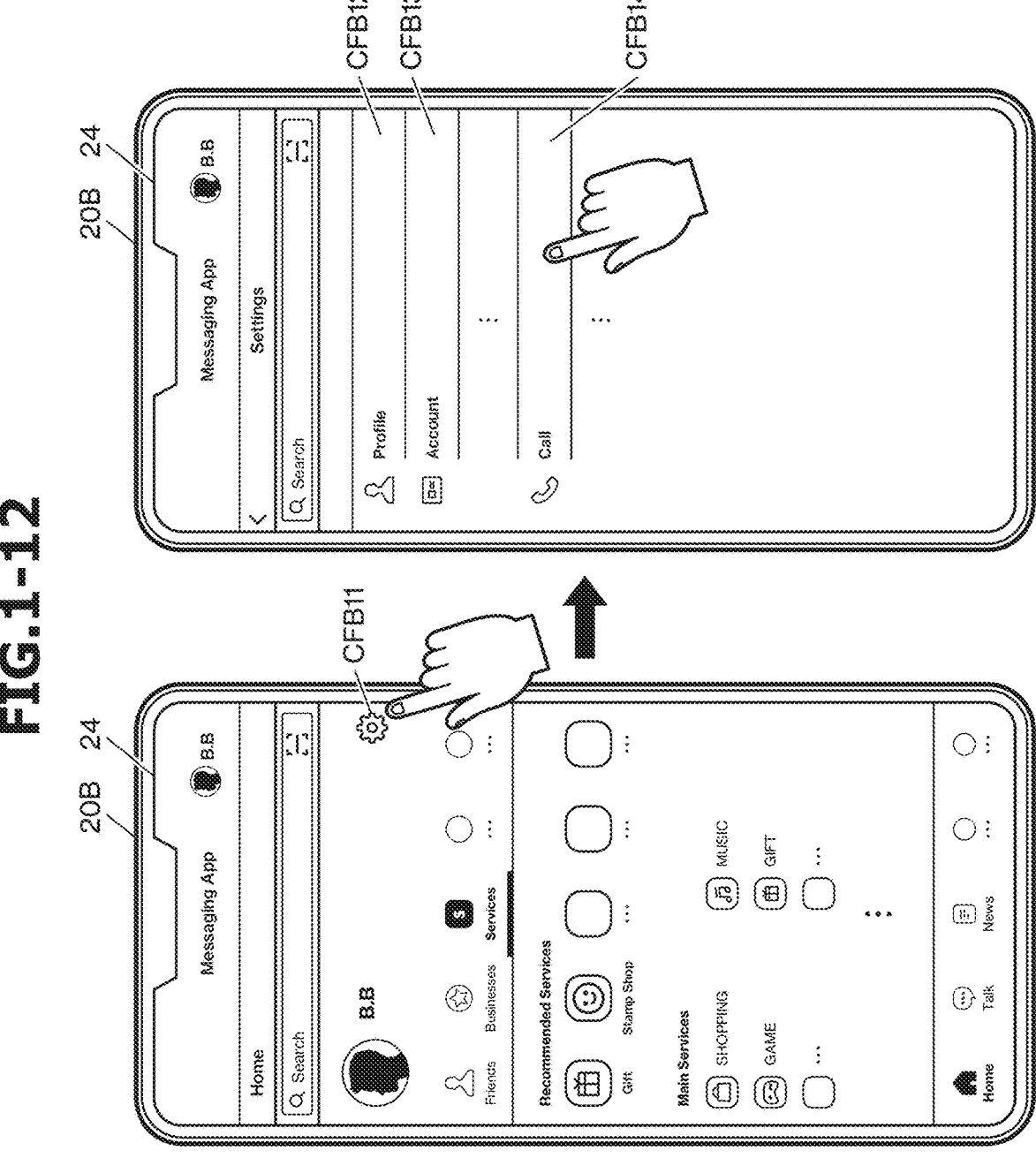
Figures 1, 2, 3, 4, 5, 6, 7, 8, 9, 10, 11, 12, 13:
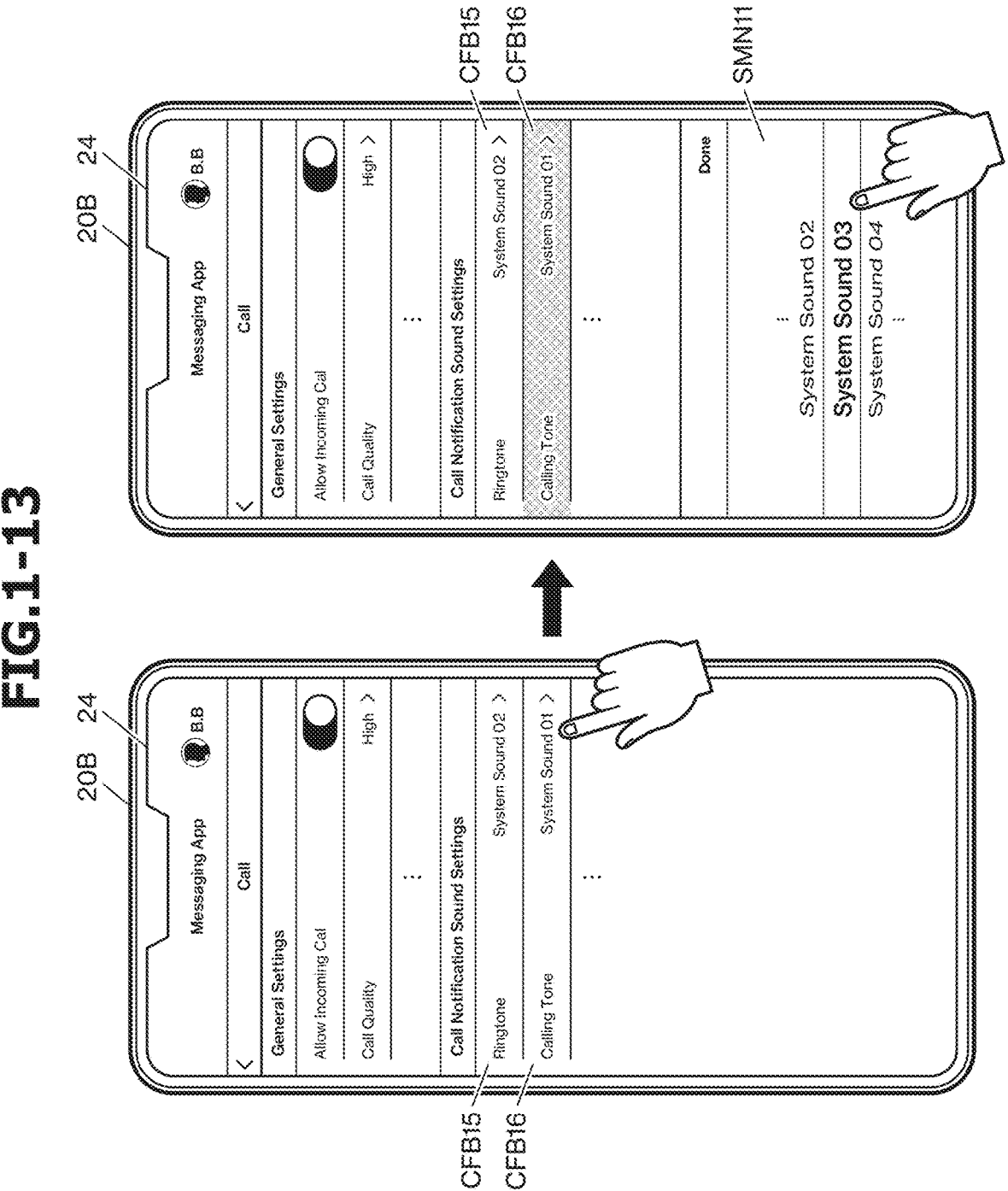
Figures 1, 2, 3, 4, 5, 6, 7, 8, 9, 10, 11, 12, 13, 14:
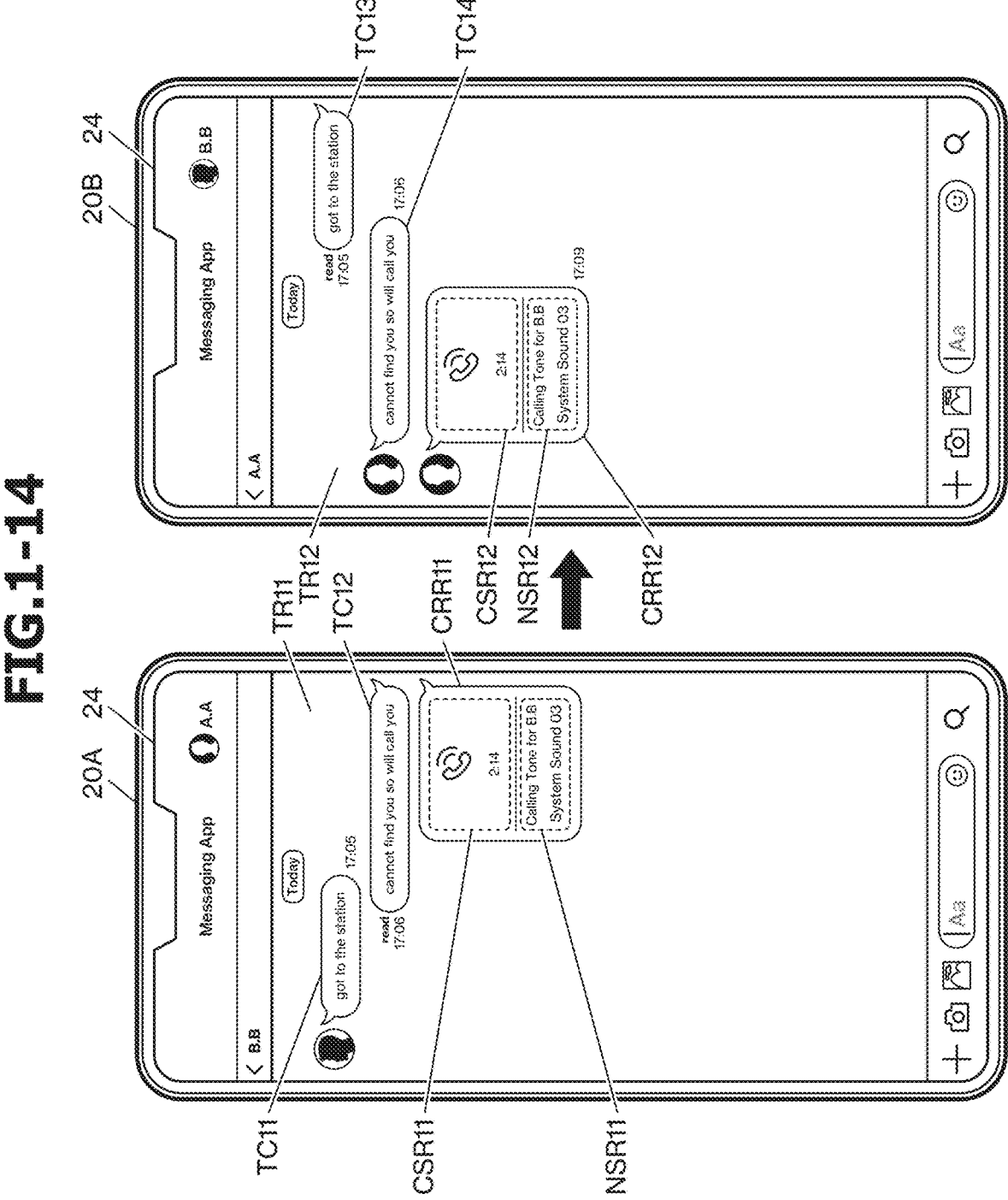
Figures 1, 2, 3, 4, 5, 6, 7, 8, 9, 10, 11, 12, 13, 14, 15:
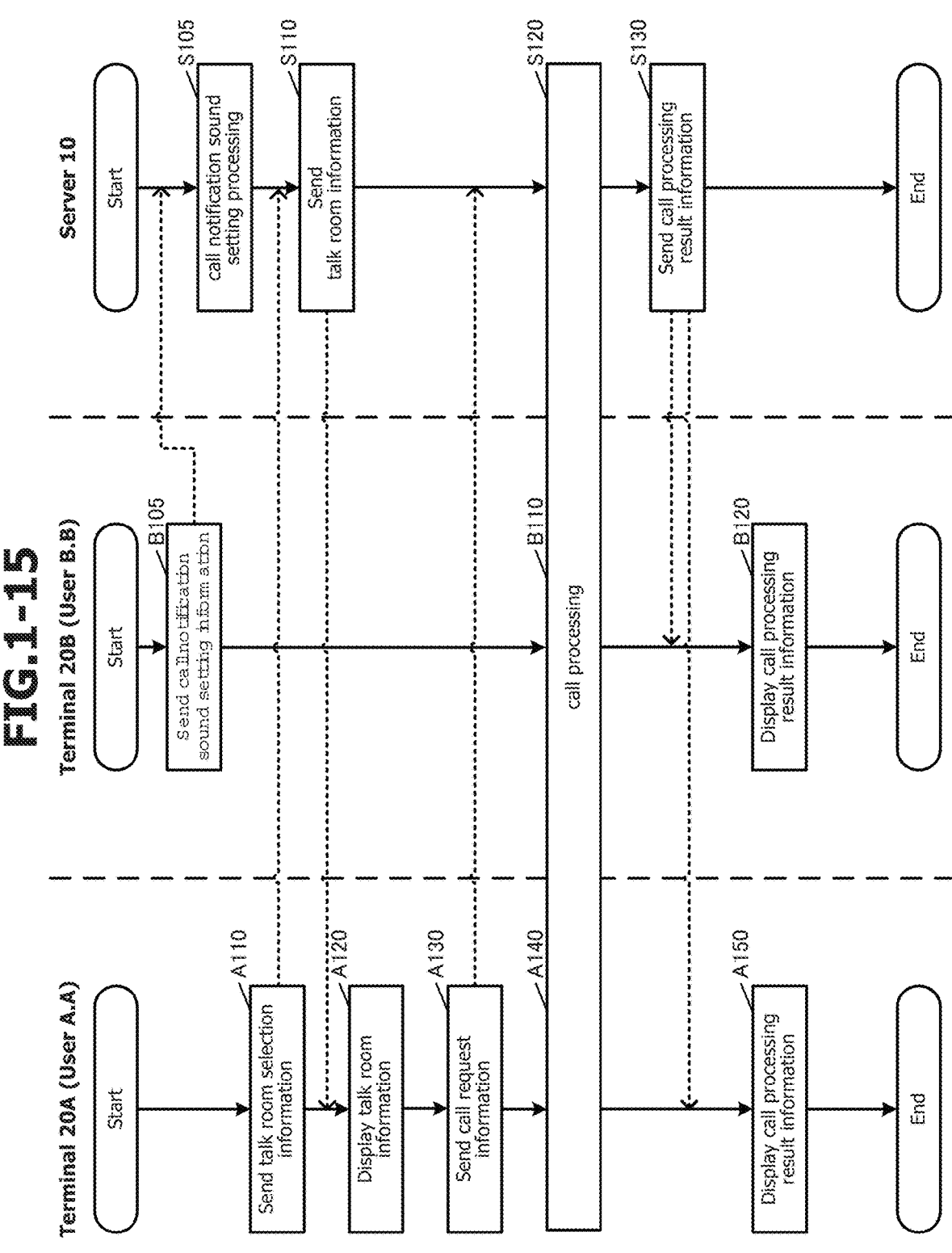
Figure 2:
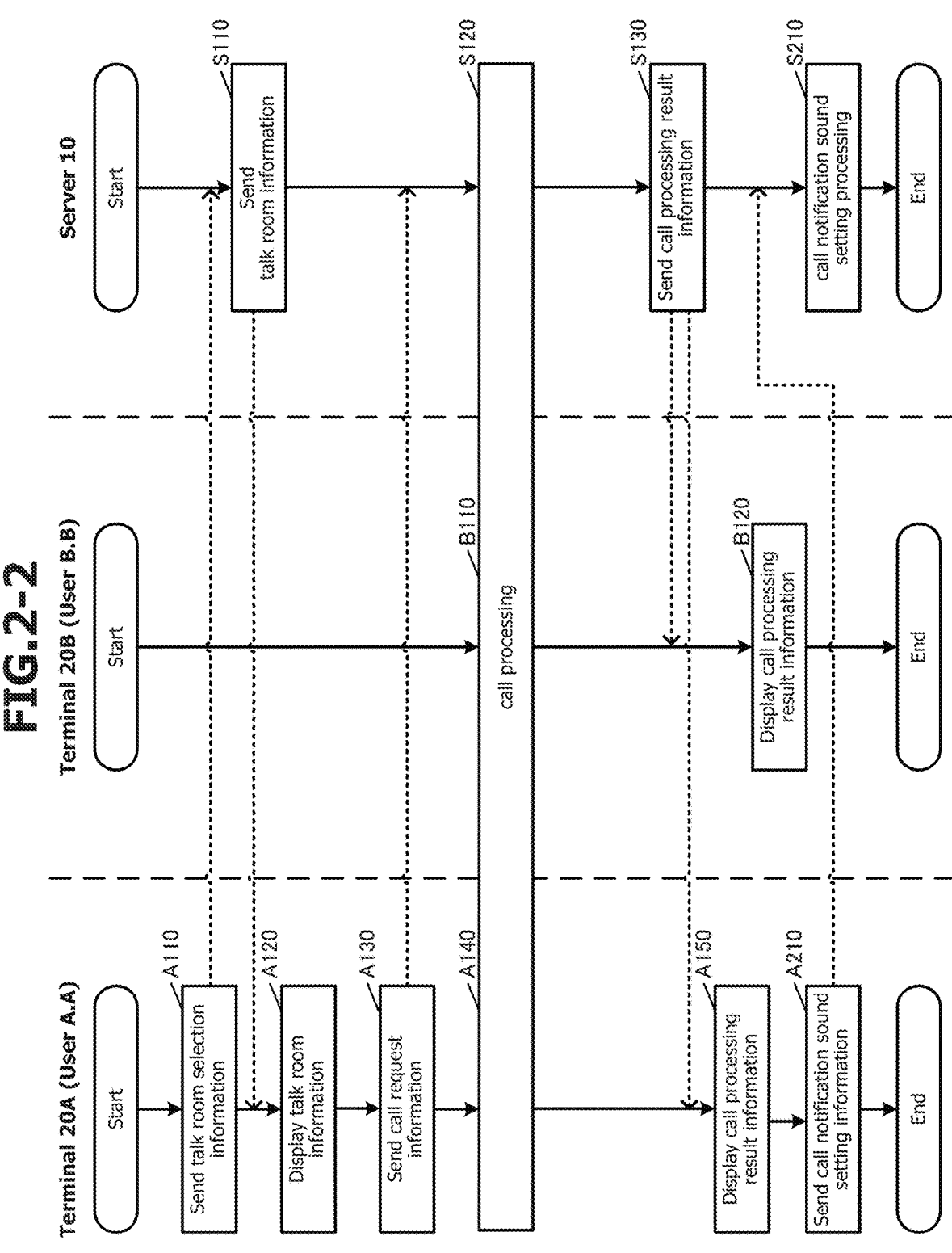
Figures 2, 3:
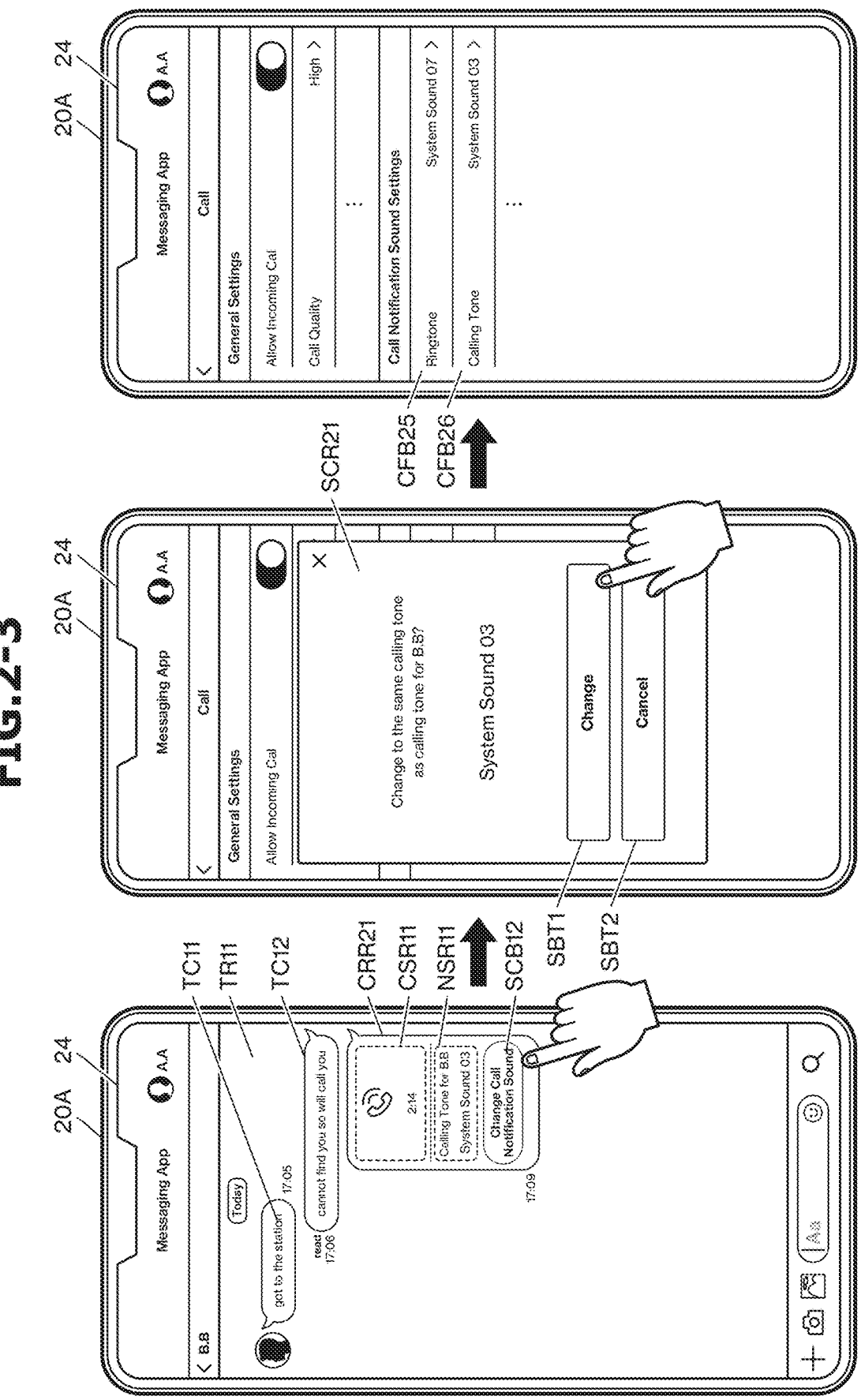
Figures 2, 3, 4, 5:
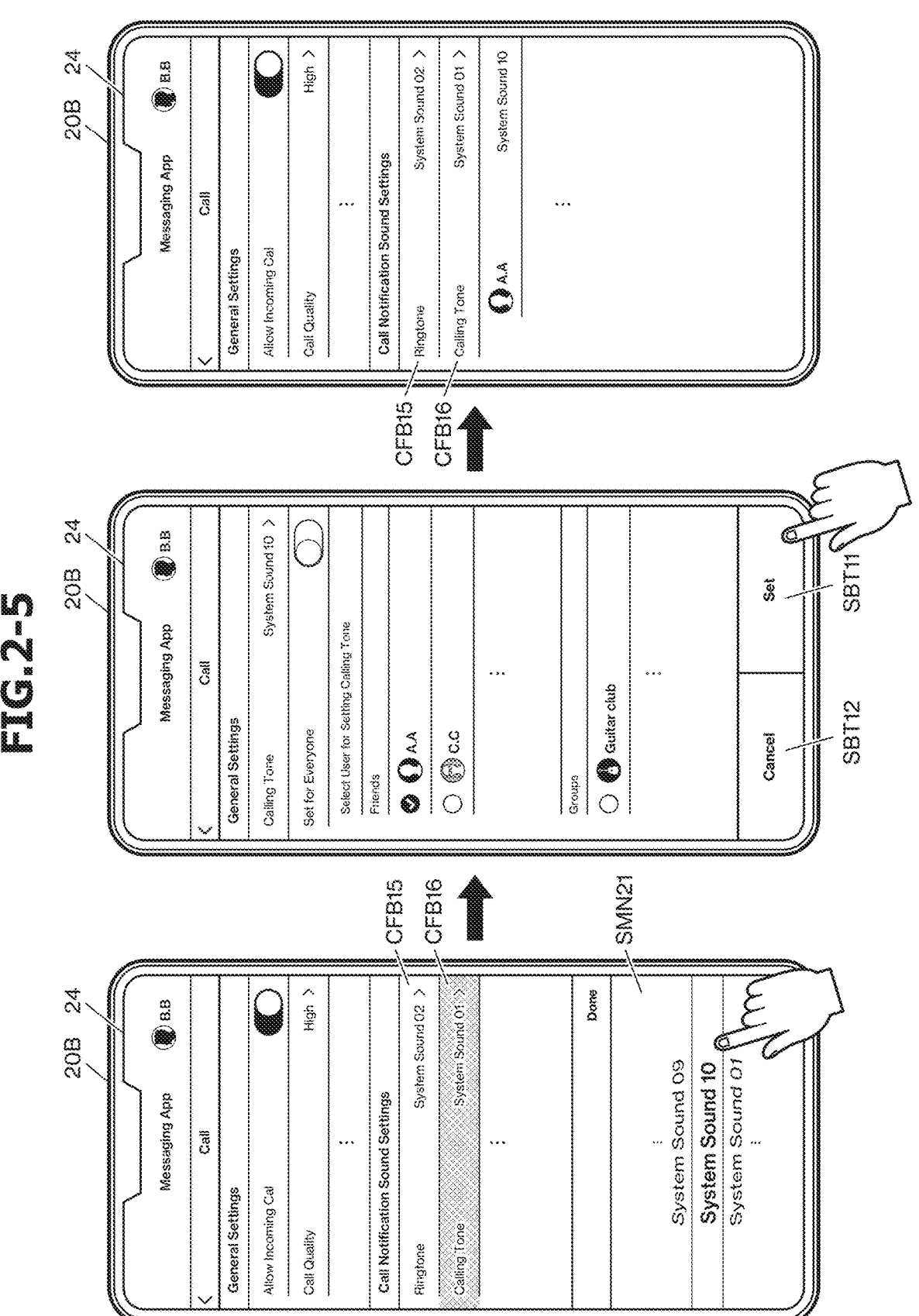
Figures 2, 3, 4, 5, 6:
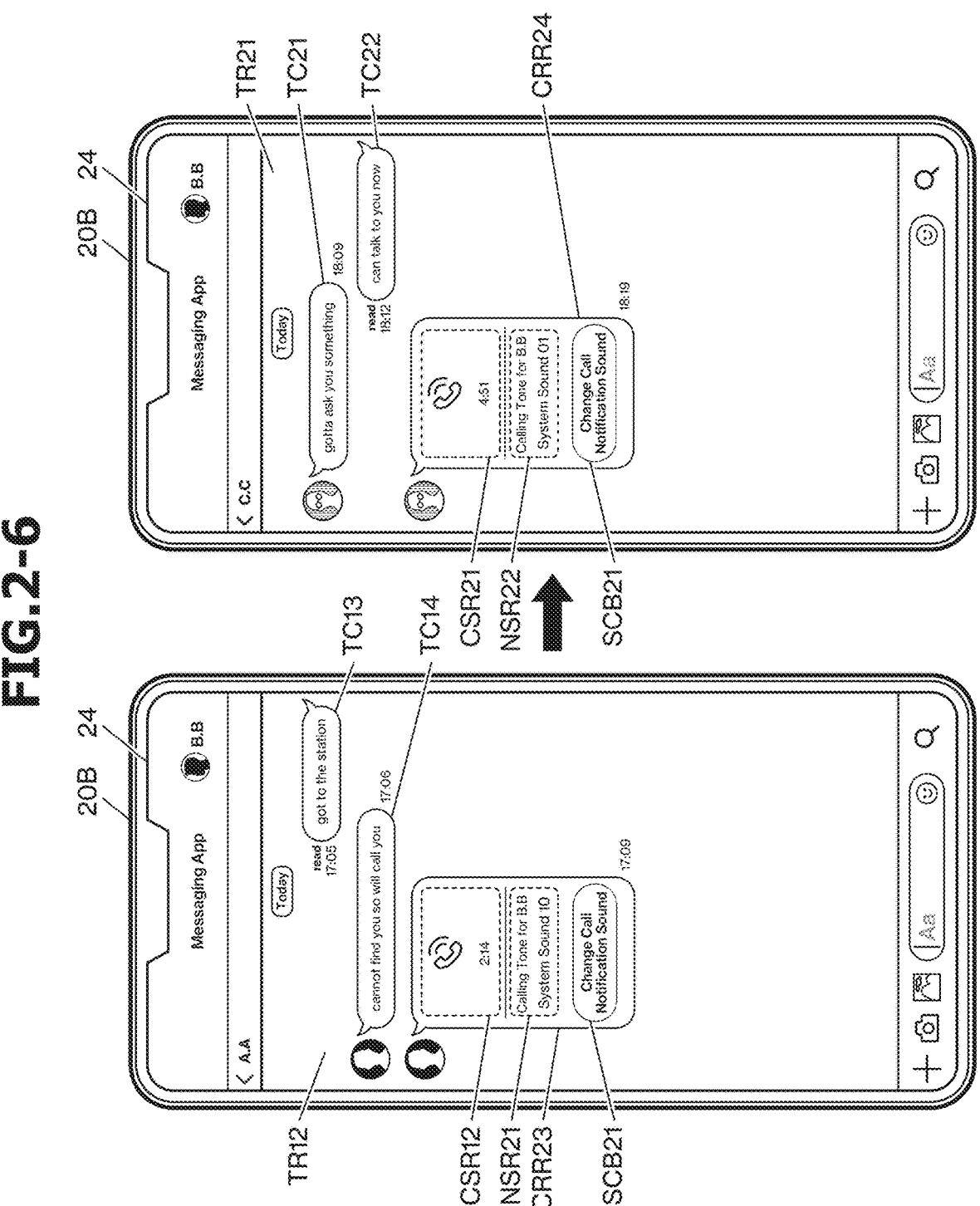
Figures 2, 3, 4, 5, 6, 7:
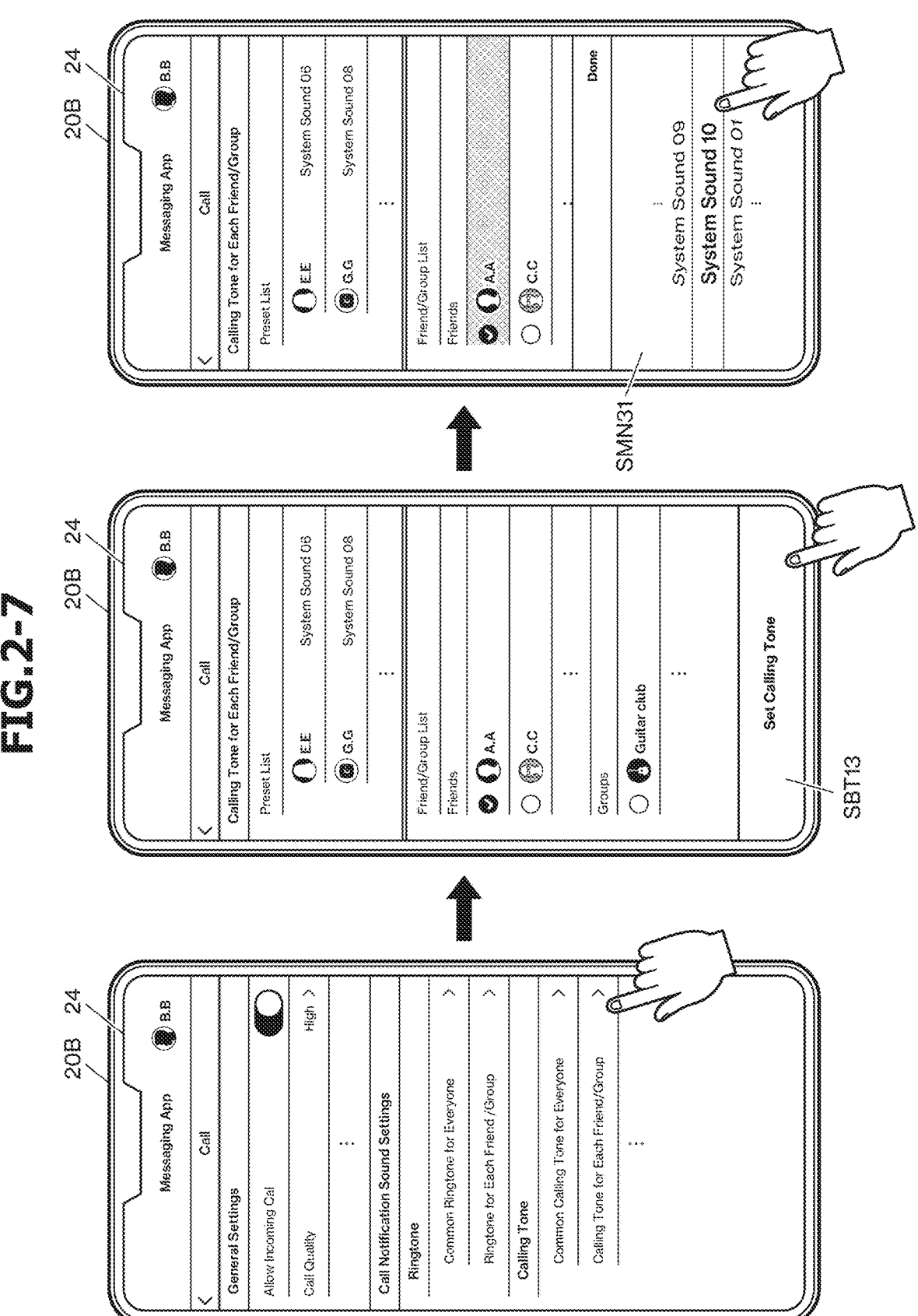
Figures 2, 3, 4, 5, 6, 7, 8:
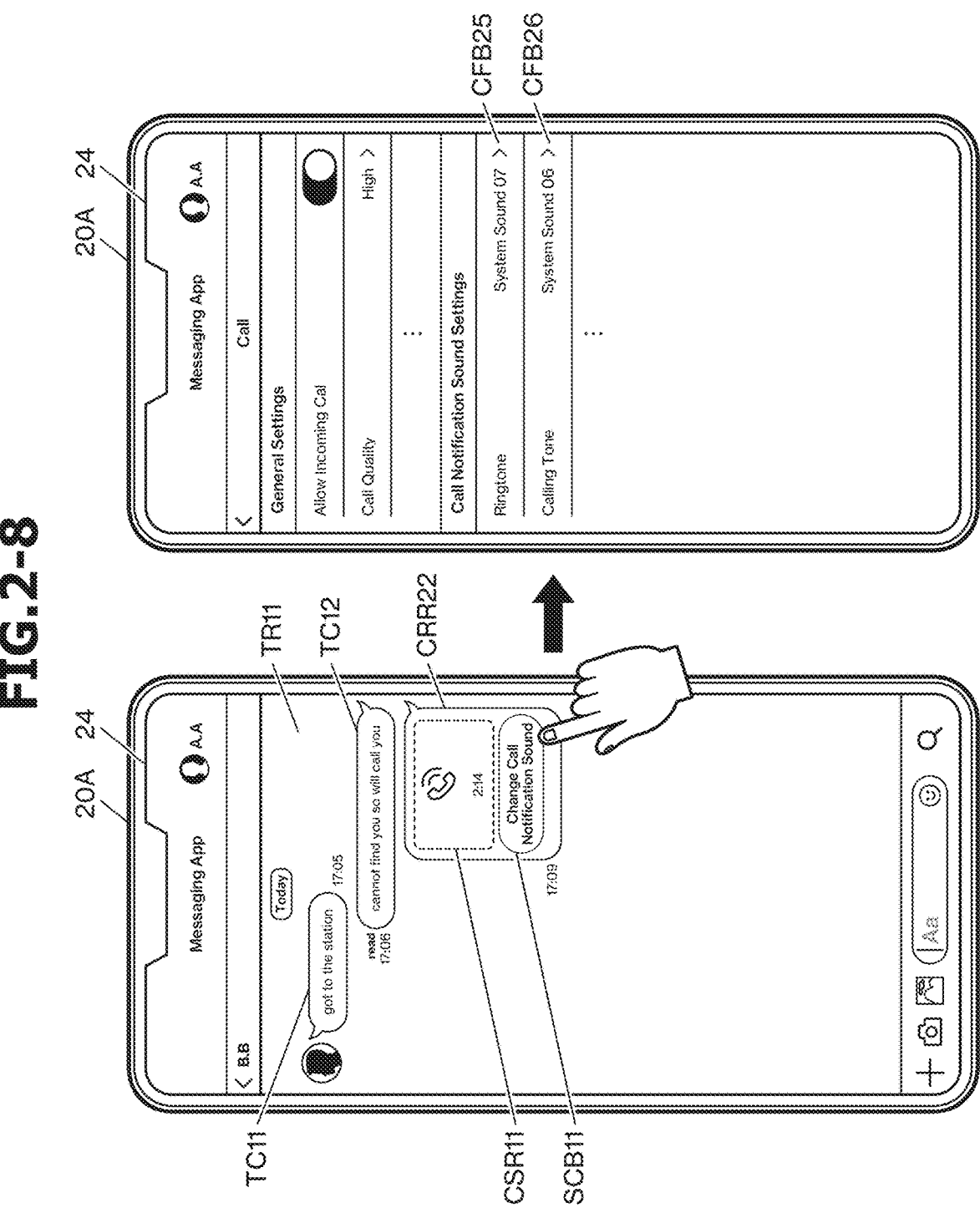
Figures 1, 3:
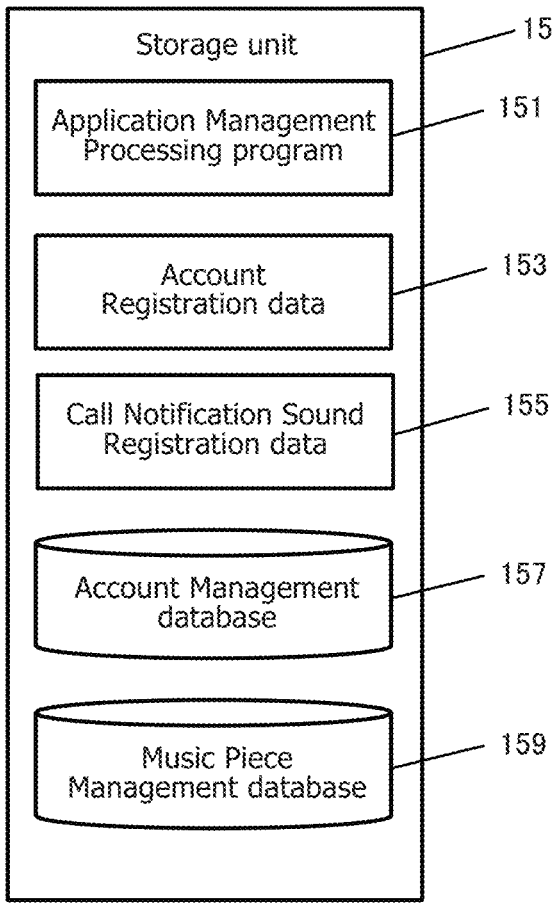
Figures 2, 3:
Figures 3, 4:
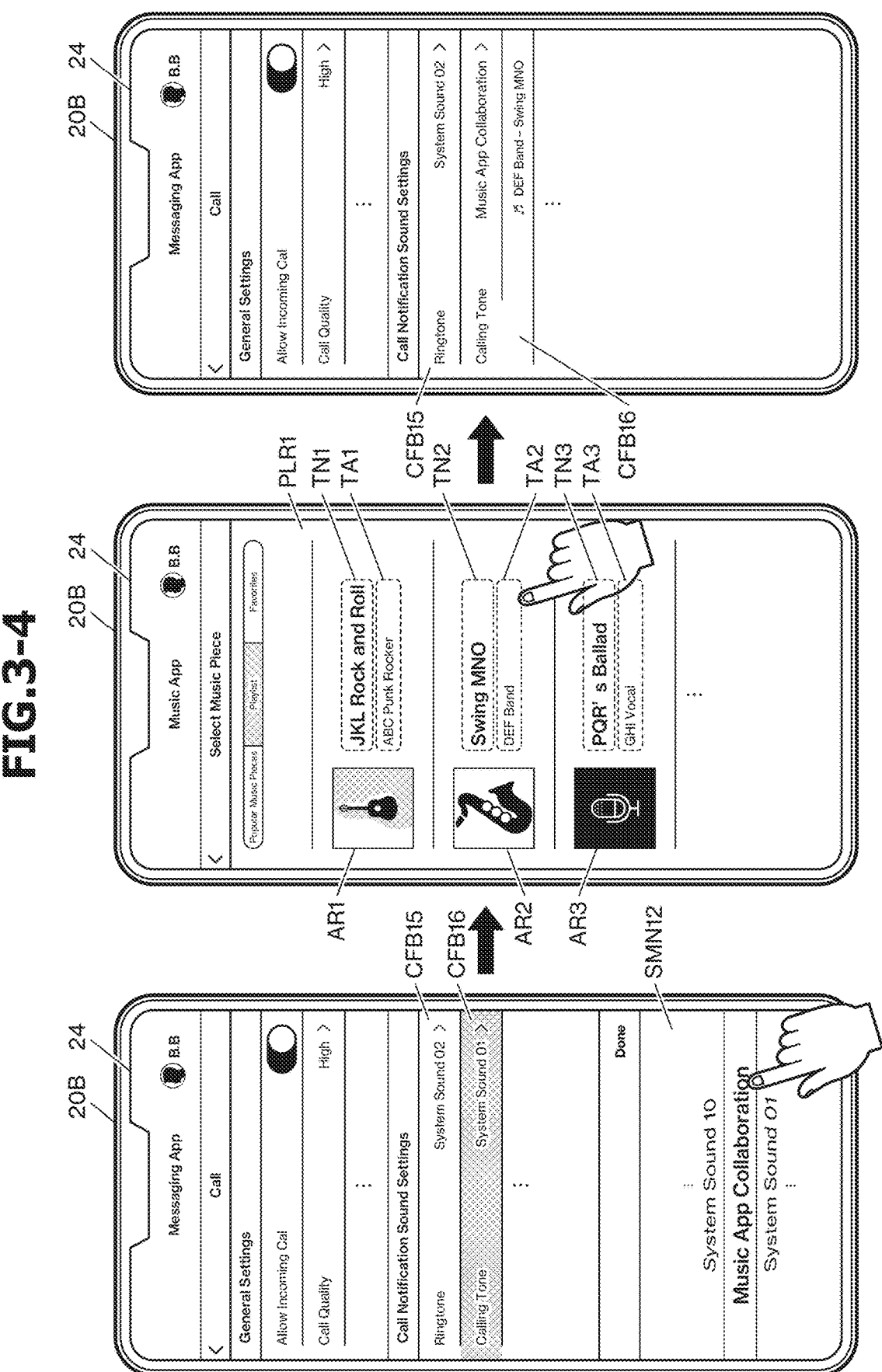
Figures 3, 4, 5:
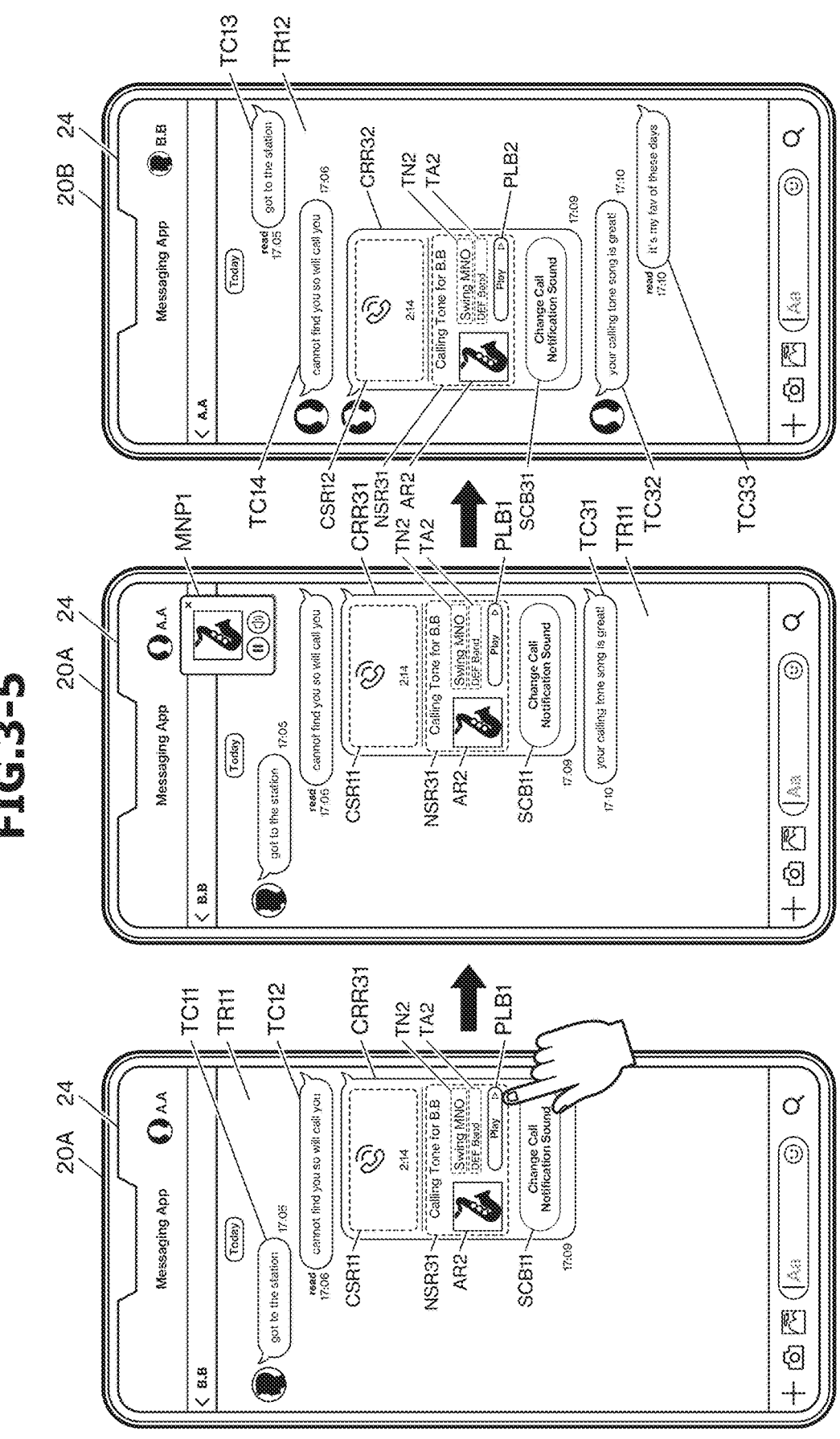
Figures 3, 4, 5, 6:
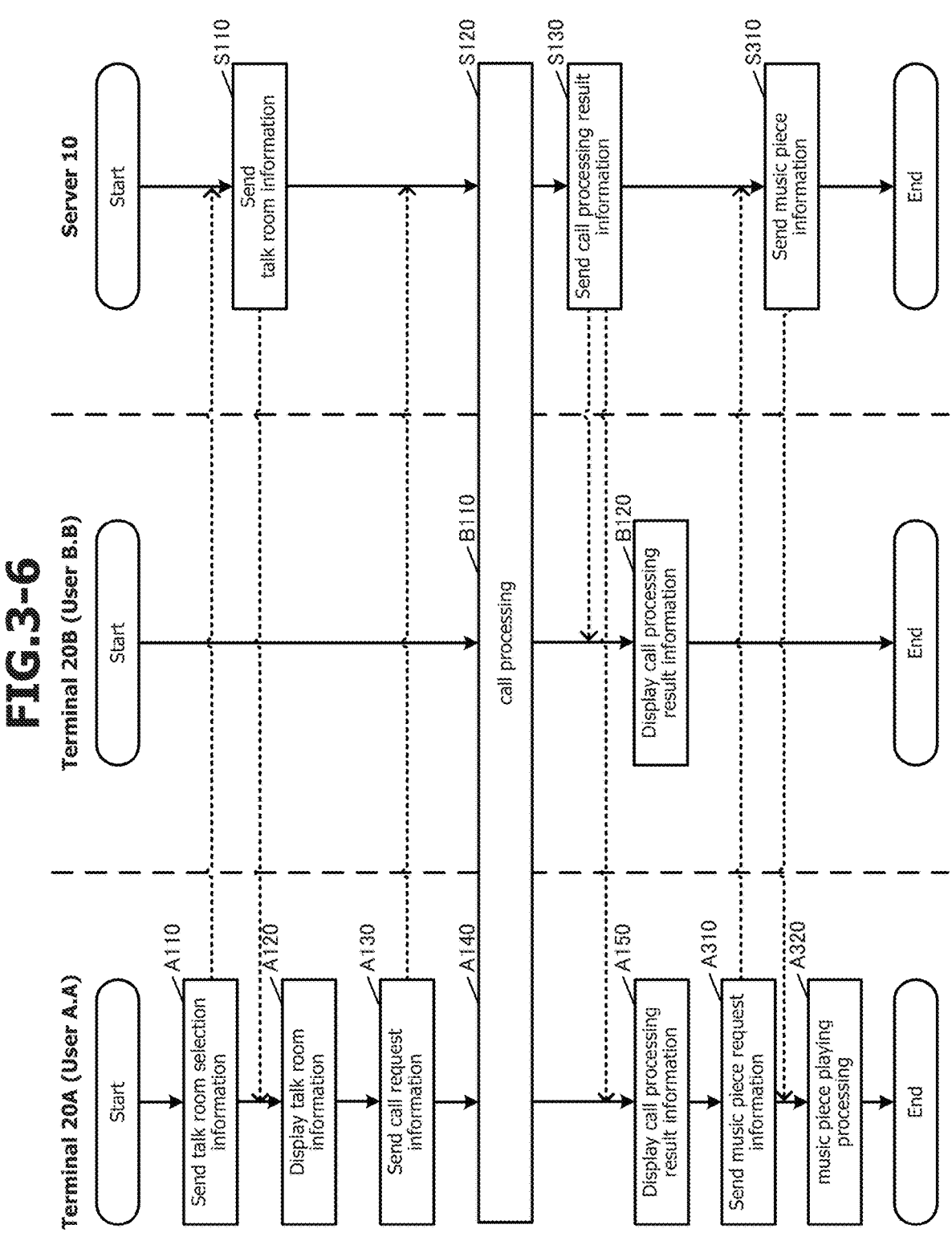
Figures 3, 4, 5, 6, 7:
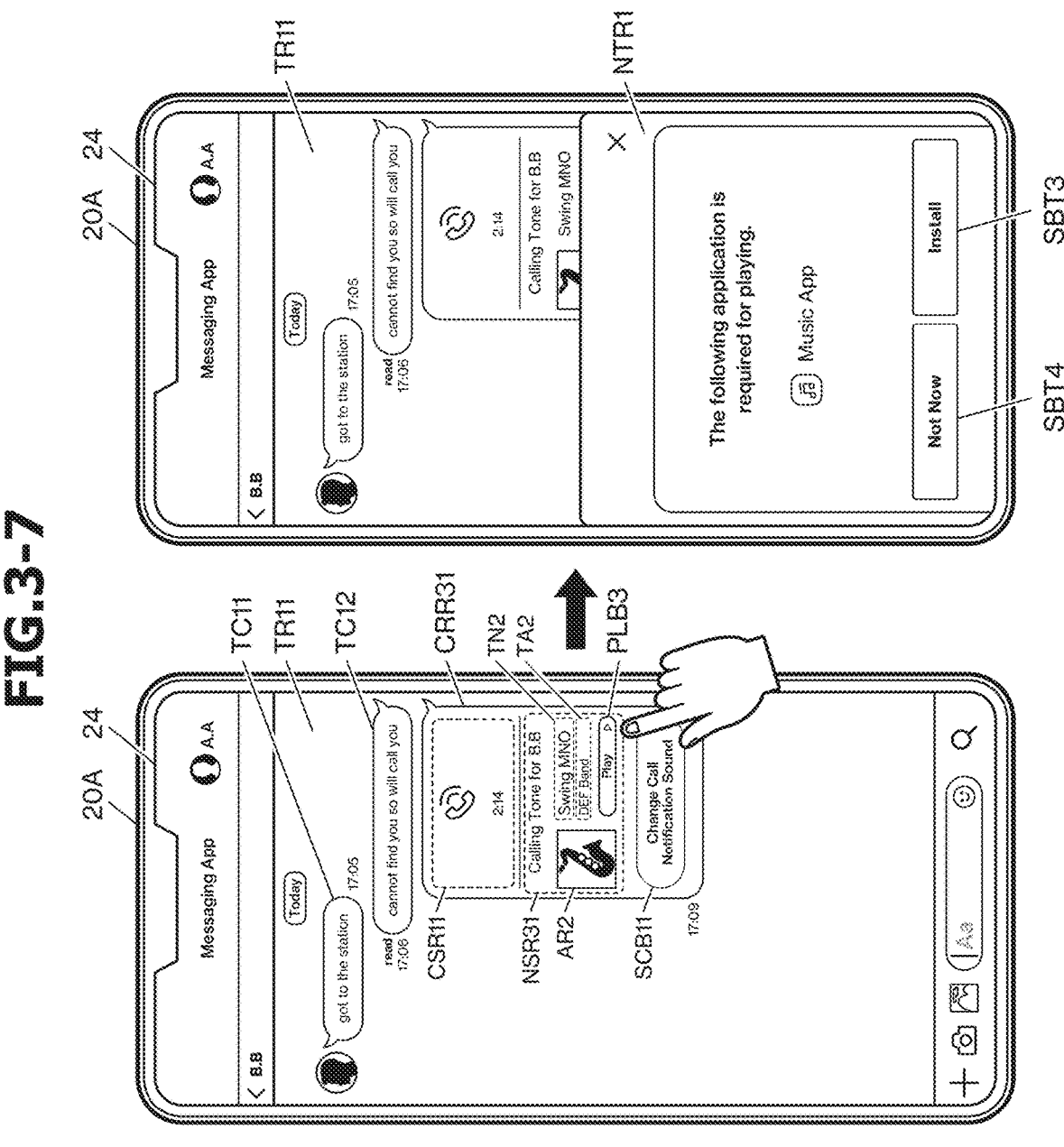
Figures 3, 4, 5, 6, 7, 8:
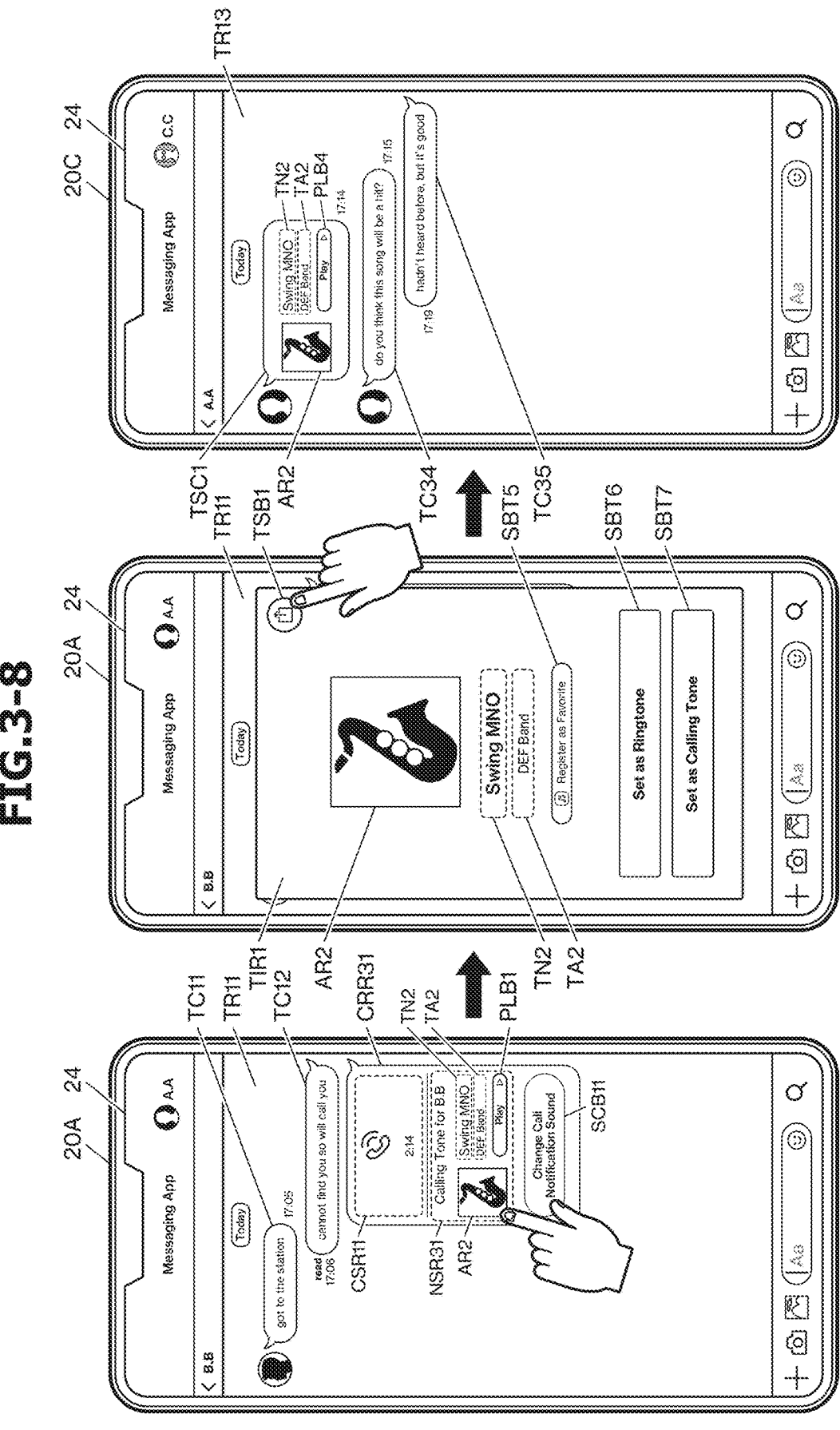
Figures 3, 4, 5, 6, 7, 8, 9:
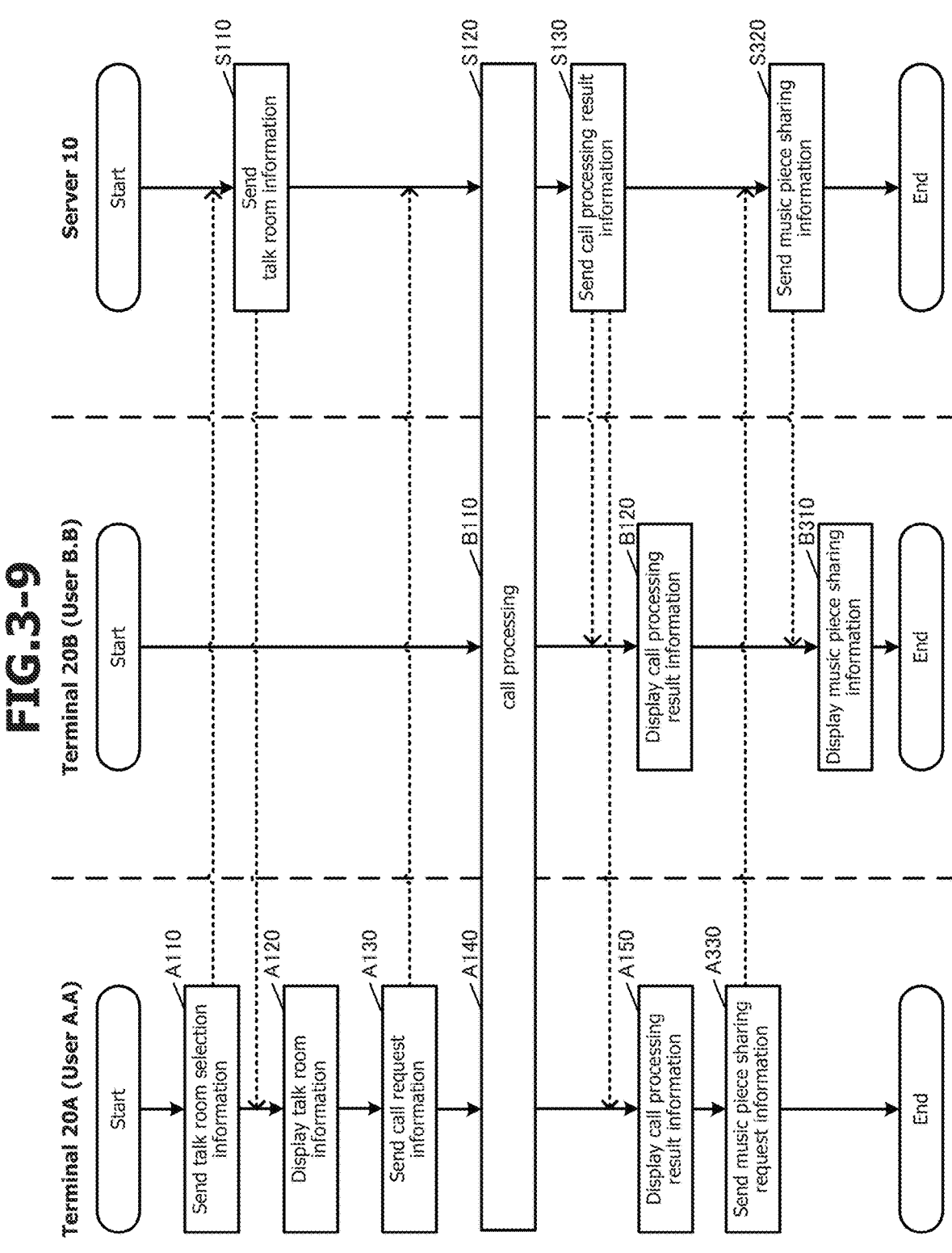
Figures 1, 4:
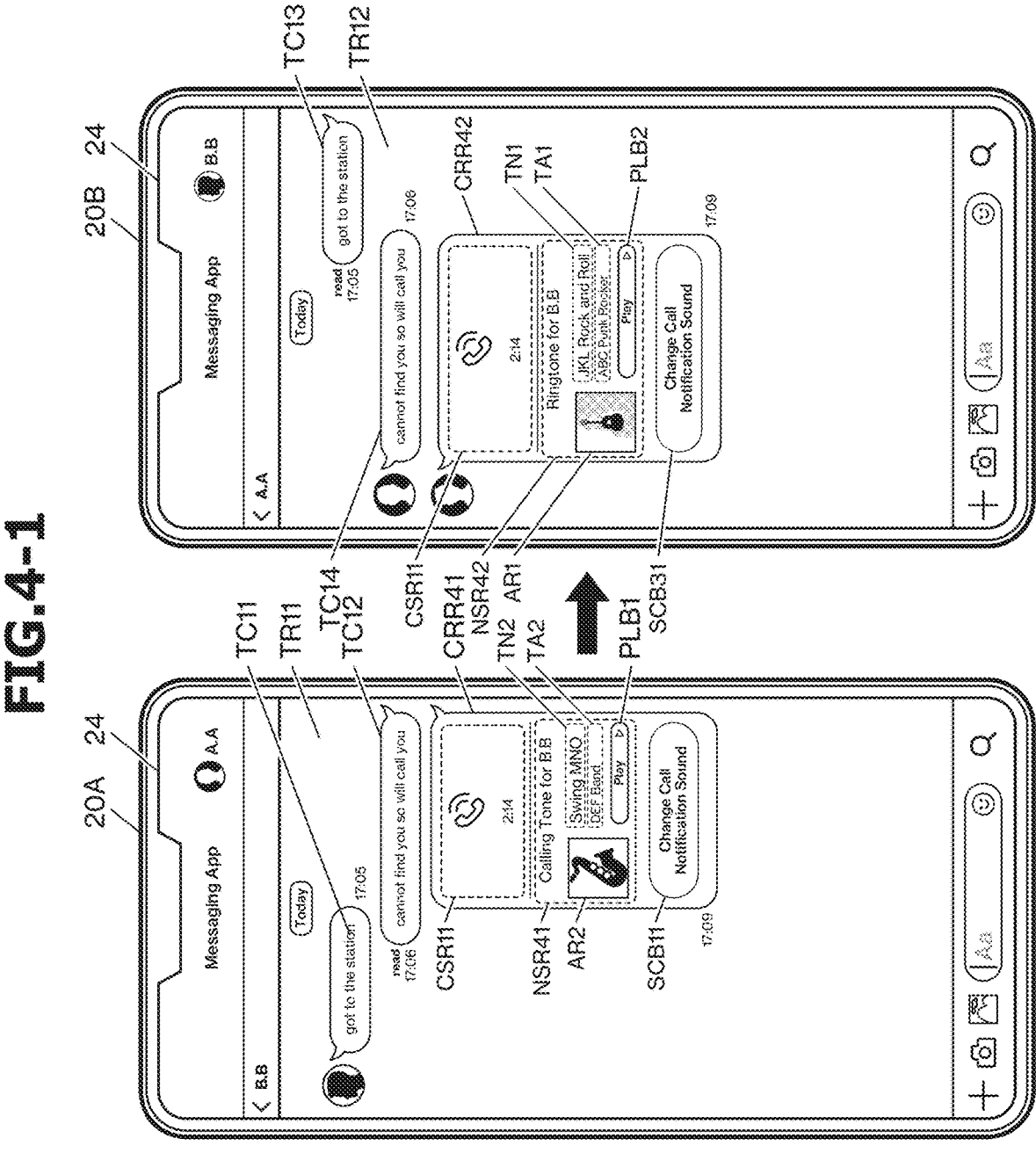
Figures 3, 4:
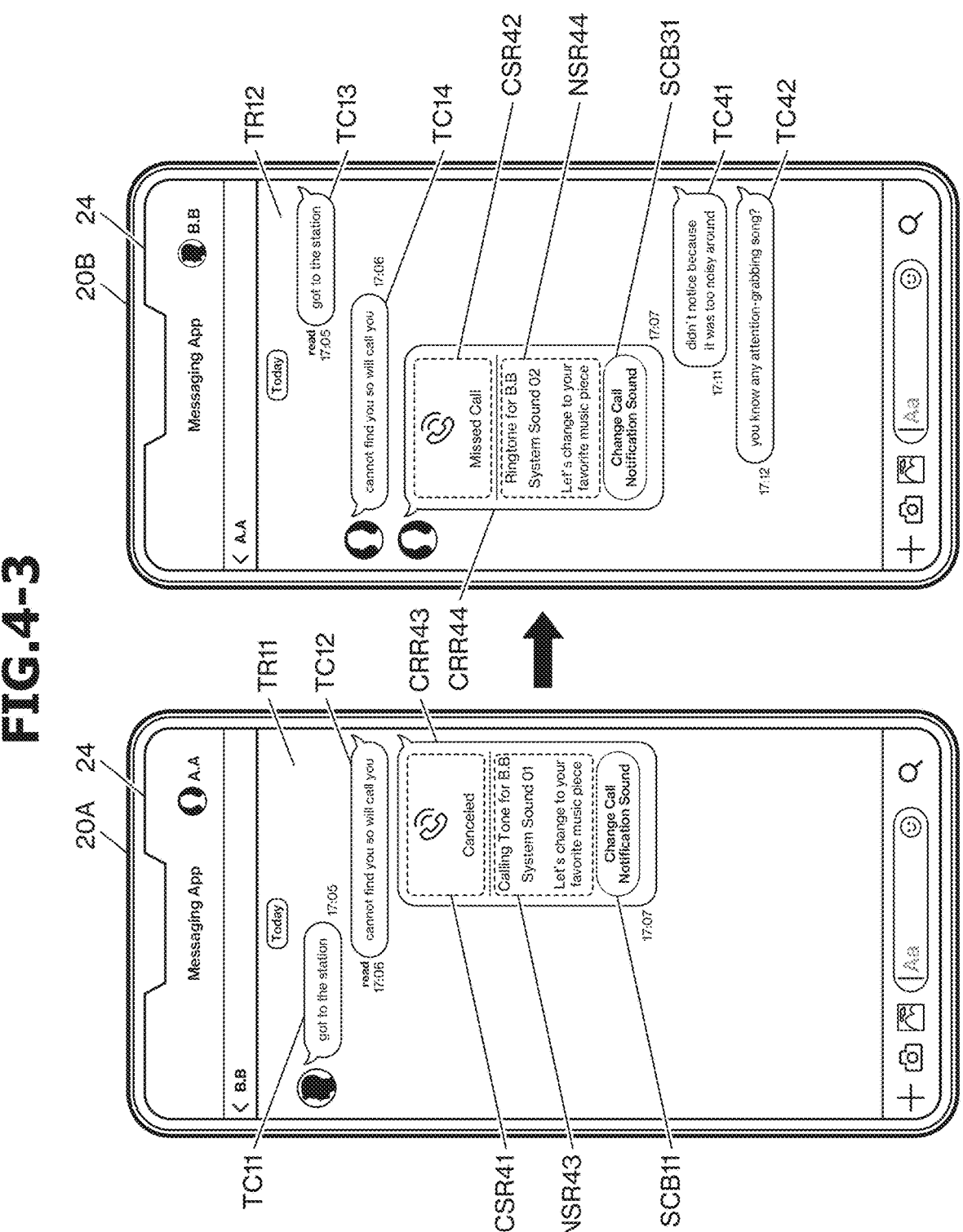
Figure 4:
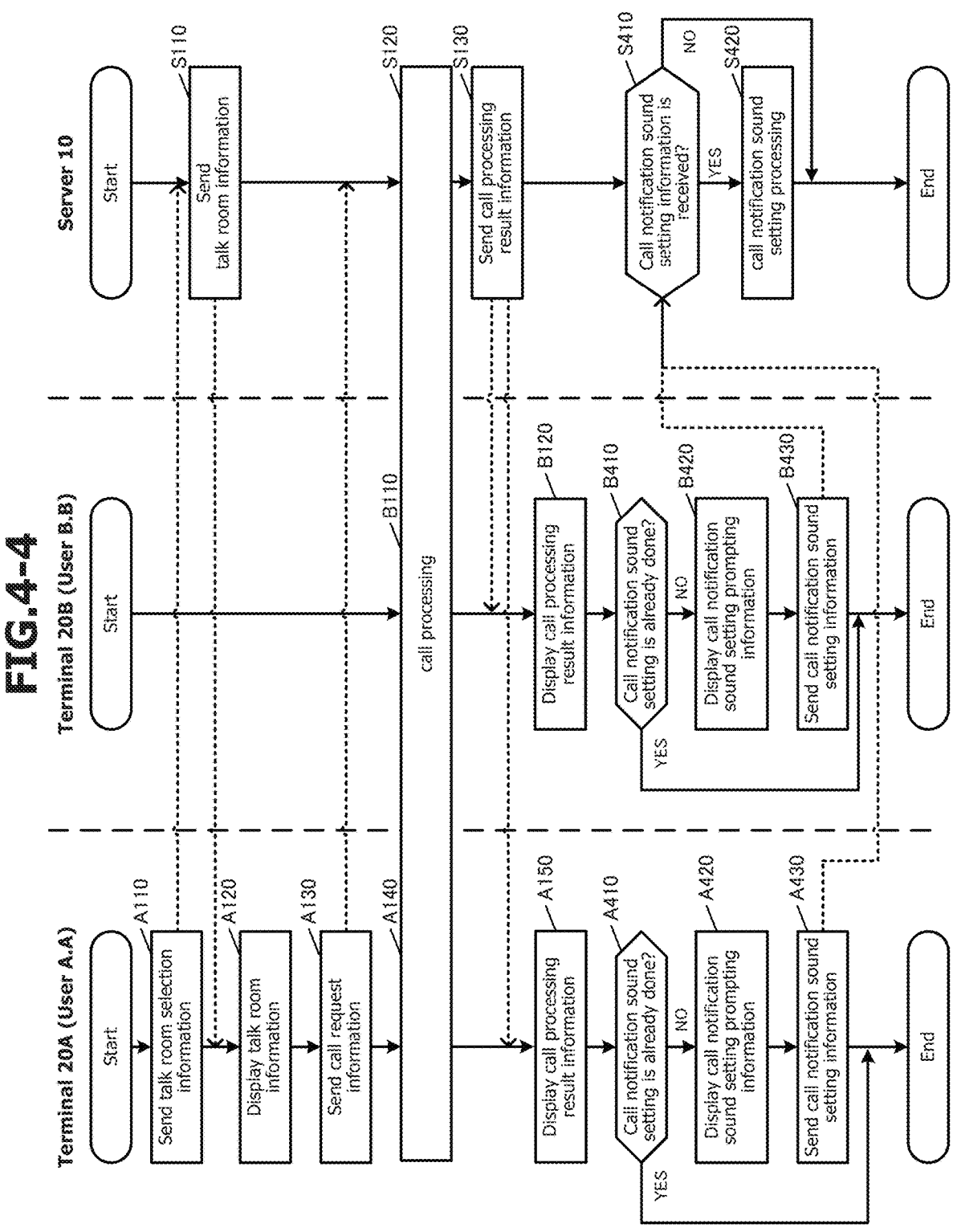
Figures 1, 5:
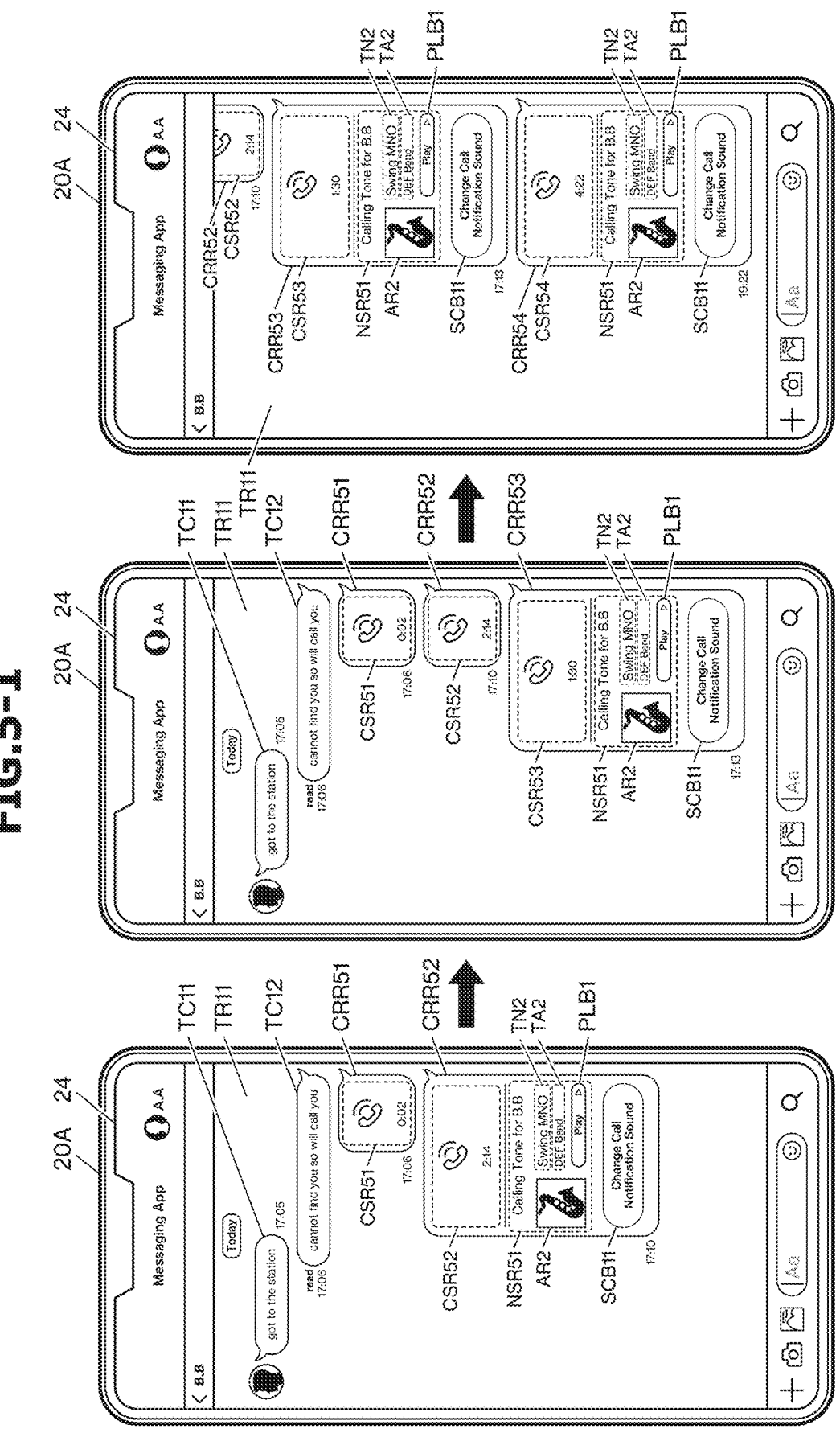
Figures 2, 5:
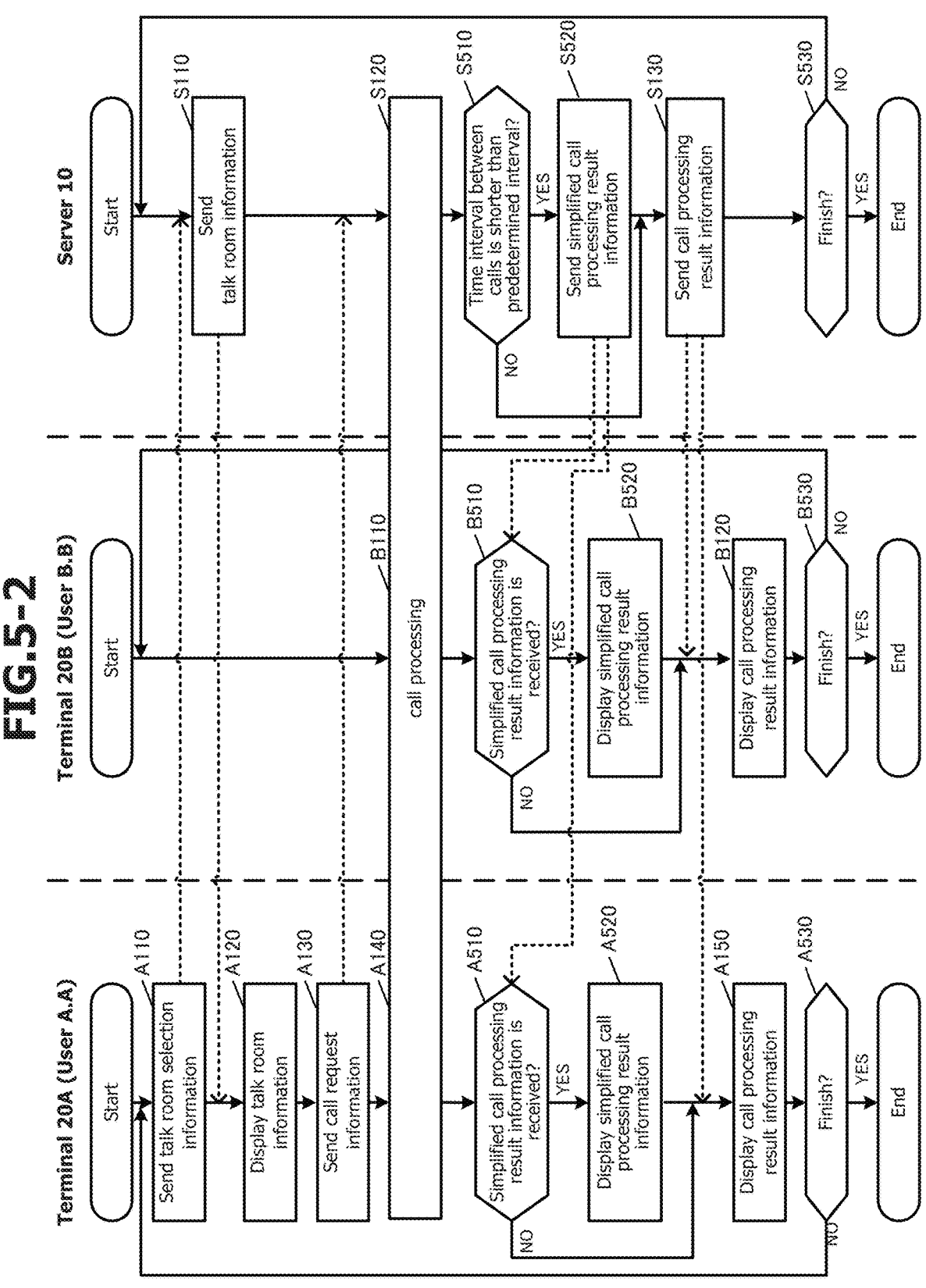
Figures 3, 5:
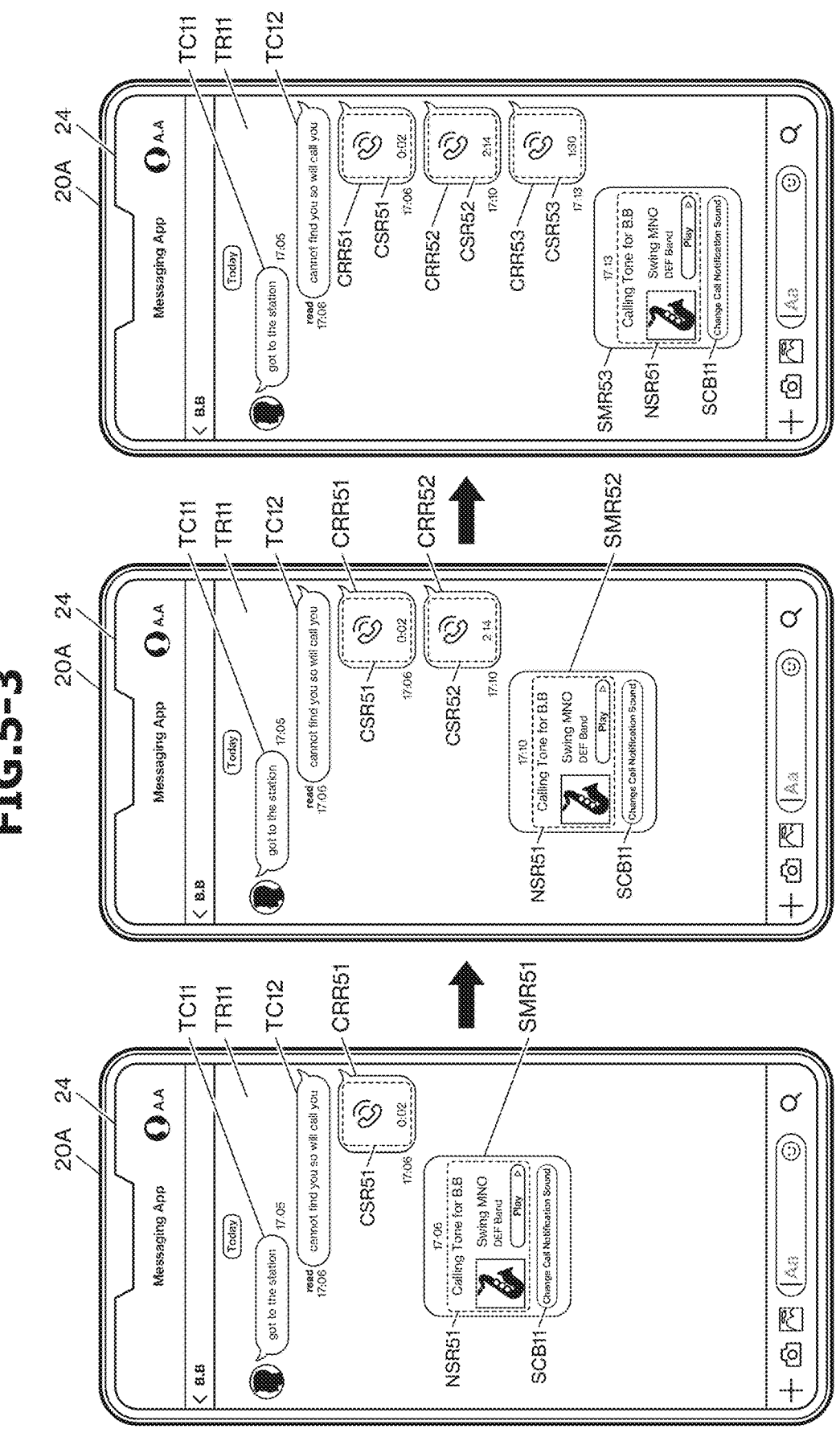
Figure 5:
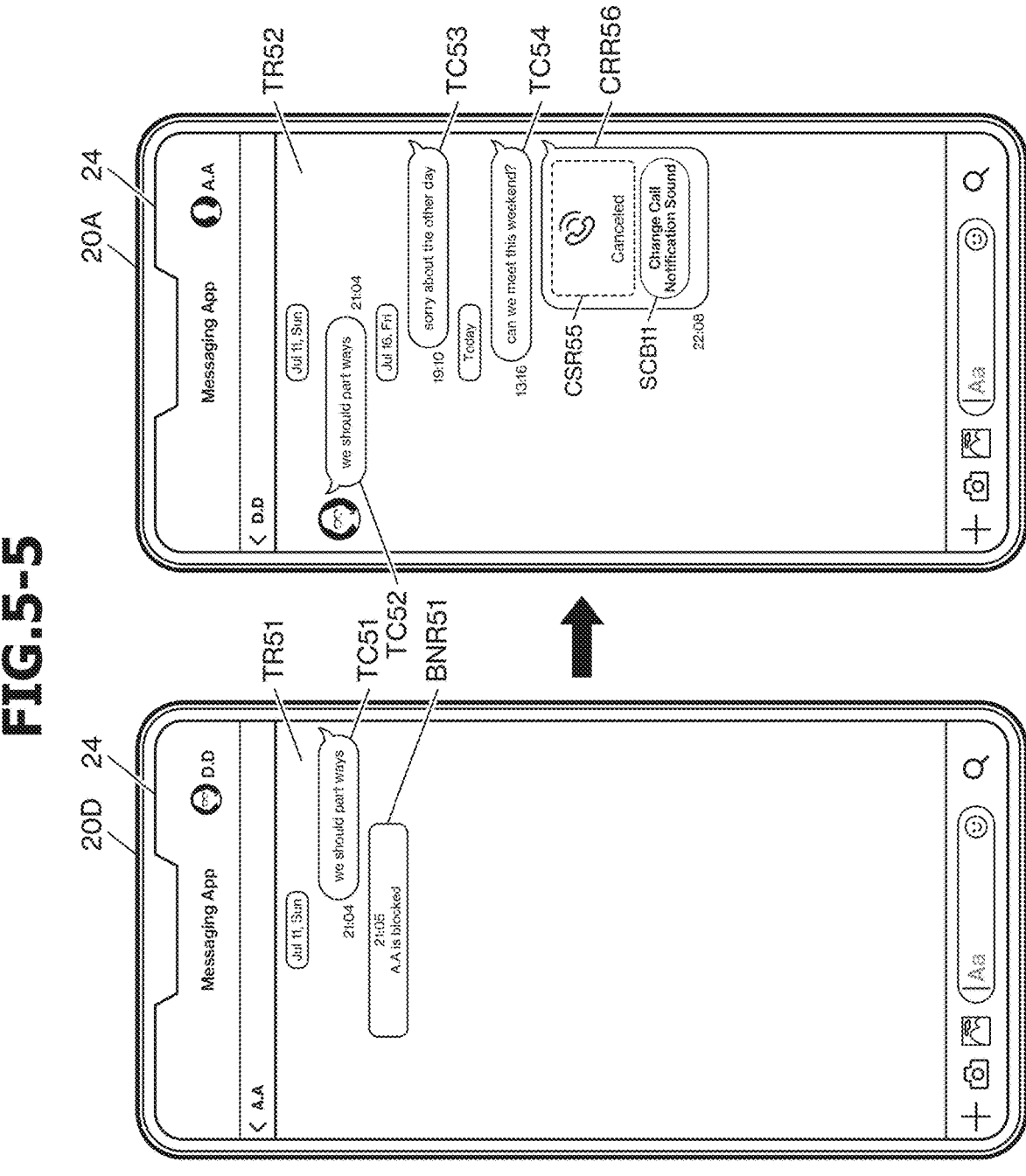
Figures 1, 6:
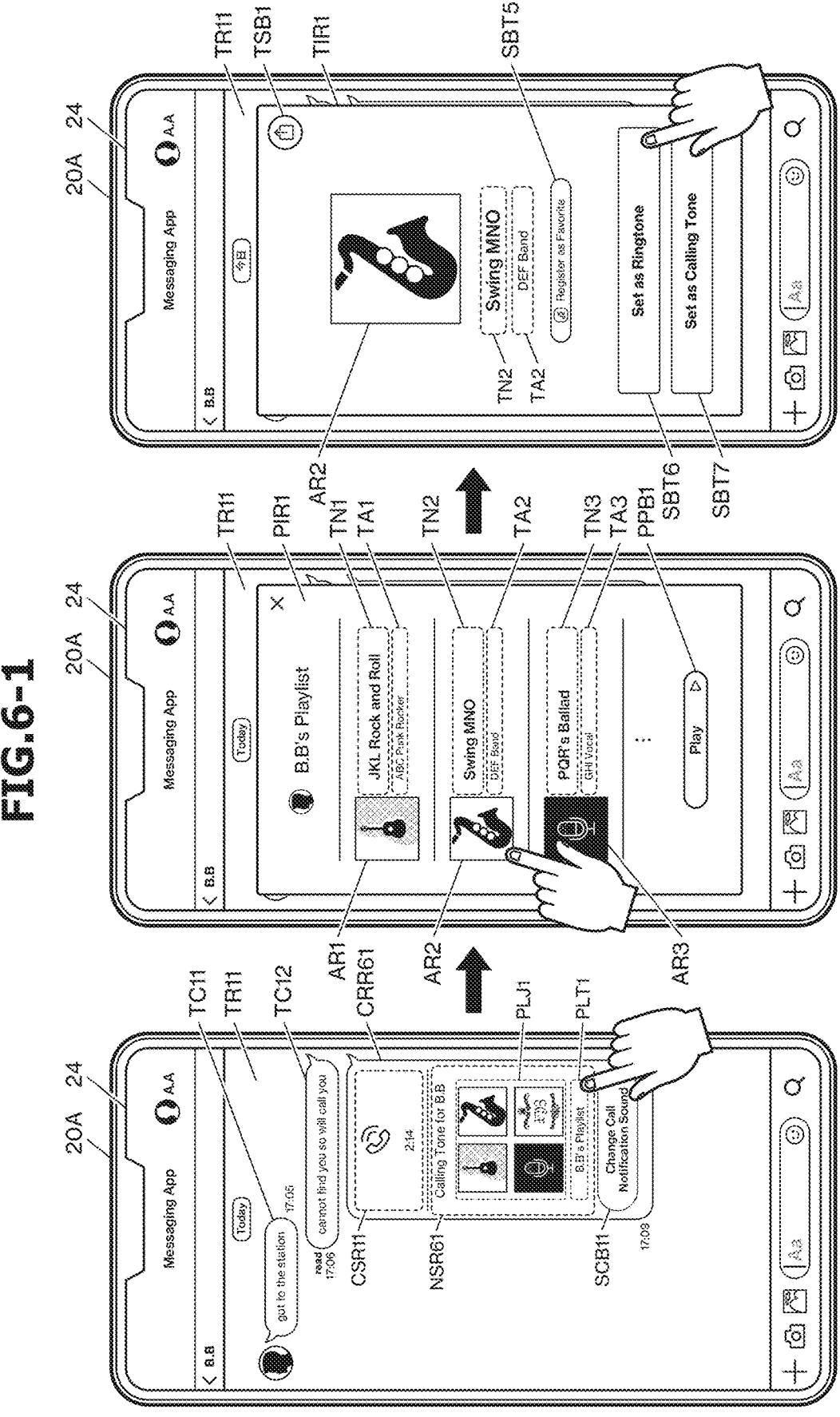
Figures 2, 6:
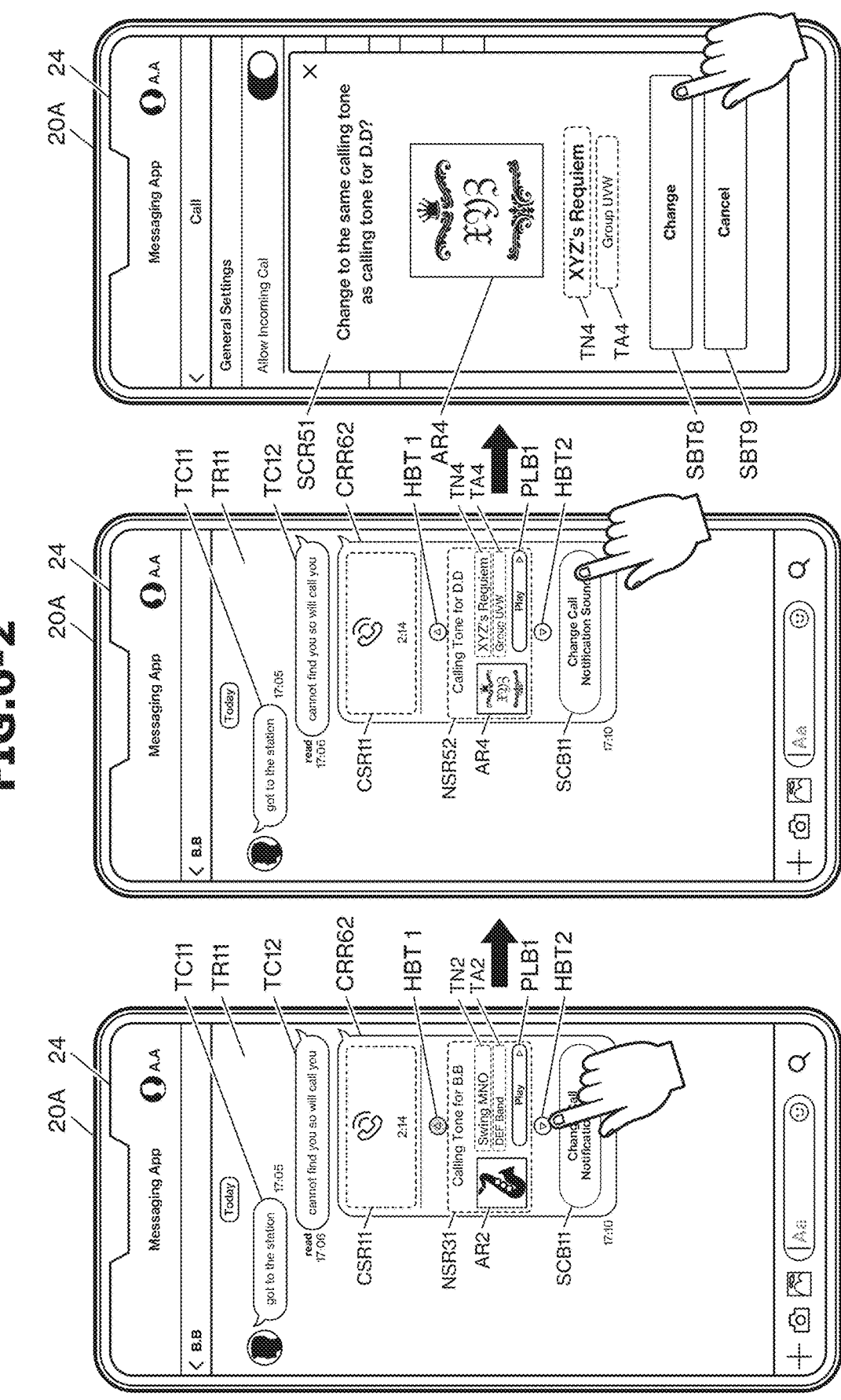

FIG. 6-1 shows an example of a screen transition displayed on the display 24 of the terminal 20 in this example embodiment.

The talk room screen on the left side of FIG. 6-1 is an example, not a limitation, of a talk room screen after a call is ended at the terminal 20A of the call origin account corresponding to the left side of FIG. 3-5, when a desired (or alternatively, predetermined) playlist (in this example, "B.B's playlist") is set as a calling tone for the user B.B in the setting screen of the right side of FIG. 3-4. In this screen, the call notification sound information NSR61 is configured to be displayed as the call notification sound information in the call processing result information CRR61.

In the call notification sound information NSR61, in addition to an indication that the call notification sound being displayed is a calling tone for the user B.B, which is the call destination account, the artwork thumbnails PLJ1 that summarize the artworks of the music pieces registered in the playlist as the call notification music piece information, and the playlist title PLT1 are also displayed. The artwork thumbnails PLJ1 are configured to display thumbnails of artworks AR1 to AR4 of the music pieces registered in the title "B.B's playlist", as an example, not a limitation.

When a playlist is set as the call notification sound, the following examples can be given as the content of the sound to be produced.

play music pieces in playlist in order
    play ones randomly selected from among music pieces in playlist
    play music pieces sequentially in playlist for a set duration (as an example, not a limitation, "15 seconds") each, starting from the beginning
    play music pieces sequentially in playlist for a set duration (as an example, not a limitation, "15 seconds") each, starting from the chorus phrase.
    randomly play music pieces in playlist for a set duration (as an example, not a limitation, "15 seconds") each, starting from the beginning.
    randomly play music pieces in playlist for a set duration (as an example, not a limitation, "15 seconds") each, starting from the chorus phrase.

When "A.A's playlist" is set as ringtones for the userA.A, the call notification sound information NSR61 may be configured to display, in addition to an indication that the call notification sound being displayed is ringtones for the user A.A, which is the call origin account, as the call notification music piece information, artwork thumbnails which have summarized artworks of the music pieces registered in "A.A's playlist" and the playlist title "A.A's playlist".

It may or may not be possible to set the music piece ID and/or the call notification sound ID as the music piece ID of the playlist management data in the account management database 157C.

As an example, not a limitation, when the artwork thumbnails PLJ1 or the playlist title PLT1 is tapped by the user, the display transitions to the talk room screen in the center of FIG. 6-1, as an example, not a limitation.

This screen is configured to display the playlist information display area PIR1 for displaying information pertaining to the playlist, superimposed on the talk room screen on the left side of FIG. 6-1.

The playlist information display area PIR1 is configured to display the title of the playlist, the words "B.B's Playlist", as an example, not a limitation. Below the title, the music piece information registered in this playlist is displayed in accordance with the music piece order number. In this example embodiment, as individual music piece information, the artwork, the track name, and the artist name are displayed, as an example, not a limitation. When the track name is tapped, as an example, not a limitation, the screen transitions to the display of a list of music piece titles of the music album that includes the music pieces. Also, as an example, not a limitation, when the artist name is tapped, the screen transitions to the display of a list of music albums that include the artist name.

At the bottom of the playlist information display area PIR1, the playlist playing button PPB1 is configured to be displayed to play music pieces in the order according to this playlist. As an example, not a limitation, when the playlist playing button PPB1 is tapped by the user, the mini-player is activated to play the music pieces according to the playlist.

As an example, not a limitation, when the artwork AR2 is tapped by the user, the screen transitions to the talk room screen on the right side of FIG. 6-1. This screen is configured to display the call notification music piece information display area TIR1 for displaying call notification music piece information, being superimposed on the talk room screen on the left side of FIG. 6-1. As an example, not a limitation, the contents displayed in the call notification music piece information display area TIR1 can be configured in the same way as the contents displayed in the call notification music piece information display area TIR1 in the center talk room screen shown in FIG. 3-7.

<Processing>

The processing can be performed according to the flowchart in FIG. 3-6 as an example, not a limitation. In this case, the control unit 11 of the server 10 sends the playlist management data managed in the account management database 157C as the call notification music piece information in the call processing result information, as an example, not a limitation.

<Effect of Sixth Embodiment>

This example embodiment shows a configuration in which the sound information includes information of a playlist set by the user of the terminal or the first user of the first terminal.

As an example of the effect of this example embodiment obtained by such a configuration, information of the playlist set by the user of the terminal or the first user of the first terminal can be displayed as sound information to notify the user of the terminal.

<Sixth Variant (1)>

In the sixth example embodiment described above, the playlist is illustrated as a method of combining notification sounds and/or music pieces, but the inventive concepts are not limited thereto. As an example, not a limitation, a historical list of call notification sounds for past incoming and outgoing calls may be used as a method of combining call notification sounds and/or music pieces.

FIG. 6-2 shows an example of a screen transition displayed on the display 24 of the terminal 20 in a variant of the sixth example embodiment.

The talk room screen on the left side of FIG. 6-2 is an example of the talk room screen after the call is ended at the terminal 20A of the call origin account.

In this screen, the call notification sound information NSR31 is configured to be displayed as the call notification sound information in the call processing result information CRR62. The call notification sound information NSR31 is configured to display an indication that the displayed call notification sound is a calling tone for the user B.B, which is the call destination account, as well as information of the music piece with track name TN2 "Swing MINO" set as a calling tone by the user B.B as the call notification music piece information.

Above and below the call notification sound information NSR31, the screen is configured to display the history back button HBT2 for going back in the history of the call notification sound information in the call processing result information received by the terminal 20A and the history forward button HBT1 for advancing the history. In this screen, the history forward button HBT1 is displayed in a grayed-out manner and its function is disabled, based on the fact that call notification sound information NSR31 which is the latest history is displayed in the call processing result information CRR62.

As an example, not a limitation, when the history back button HBT2 is tapped by the user, the display transitions to the talk room screen in the center of FIG. 6-2.

In this screen, the call notification sound information NSR52 received by user A.A in the previous call is displayed as the call notification sound information in the call processing result information CRR62. The call notification sound information NSR52 is configured to display an indication that the displayed call notification sound is a calling tone for the user D.D, which is the call destination account as well as the call notification music piece information, information of the music piece of the track name TN4 "Requiem for XYZ" set as a calling tone by the user D.D.

The history back button HBT2 and the history forward button HBT1 are configured to be displayed above and below the call notification sound information NSR52. In this screen, the grayed-out display mode of the history forward button HBT1 has been removed and its function has been activated.

The call notification sound information history may or may not be switched for each call destination account. The history may or may not be displayed separately between outgoing and incoming calls.

As an example, not a limitation, when the call notification sound change button SCB11 is tapped, the screen transitions to the call setting screen at the right side of FIG. 6-2, as an example, not a limitation. This screen is configured, as an example, not a limitation, to display the call notification sound suggestion display area SCR51 as a pop-up in the center portion.

In the call notification sound suggestion display area SCR51, based on information in the call notification sound information NSR52 indicating that a calling tone of the user D.D, which is the call destination account, is set to the track name TN4 "Requiem for XYZ", a confirmation display is displayed to confirm whether or not to change the setting in the same way.

Below that, the call notification sound change button SBT8 is configured to change the call notification sound setting based on the proposed content, and the cancel button SBT9 is configured not to change the call notification sound setting.

As an example, not a limitation, when the call notification sound change button SBT8 is tapped, the call setting screen is displayed, and an indication is displayed that the call notification sound name which is currently set as a calling tone has been changed to the music piece of the track name TN4 "XYZ Requiem" by the tap of the call notification sound change button SBT8 in the call notification sound suggestion display area SCR51.

<Others>

The contents described in each of the above example embodiments and the variants thereof can be applied in combination with the contents described in the other example embodiments and variants thereof as appropriate. Some of them are exemplified below.

As an example, not a limitation, the contents pertaining to the setting of call notification sounds by each user or each group described in the second variant (2) are basically applicable to the other example embodiments and variants thereof in the same way. The settings can also be applied to both the terminal 20 of the call origin and the terminal 20 of the call destination.

The contents described in the second variant (3), in which the call processing result information includes information for setting call notification sounds but does not include call notification sound information, are applicable to the extent that they do not deviate from the purposes or intents of example embodiments or variants thereof. The contents of the second variant (3) can be applied in the same way, except that the call notification sound information must be displayed.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments of the present disclosure, sound information (a calling tone for a call origin account, a calling tone for a call destination account, a ringtone for a call origin user and/or a ringtone for a call destination user), can be easily identified and updated within a chat room without activating a separate setting function. Thus, the updated setting of the sound information may be accomplished using less computational resources and/or consuming less power.

What is claimed is:

1. A non-transitory computer-readable recording medium storing a program, which when executed by a processor of a terminal, causes the terminal to perform a process, the process including:
 displaying, on a display unit of the terminal, a chat room including a user of the terminal and a first user of a first terminal, the terminal and the first terminal being different from the terminal, and
 displaying, in the chat room, call information pertaining to a call between the user and the first user,
 wherein the call information includes sound information pertaining to a ringtone or a calling tone.

2. The non-transitory computer-readable recording medium according to claim 1, wherein the sound information is set by the user or the first user.

3. The non-transitory computer-readable recording medium according to claim 1, wherein
 the sound information includes information pertaining to the calling tone, and
 the calling tone is set by the first user.

4. The non-transitory computer-readable recording medium according to claim 1, the process further including:
 displaying, on the display unit, setting information pertaining to setting of the sound information based on an input by the user with respect to the call information displayed in the chat room.

5. The non-transitory computer-readable recording medium according to claim 4, the process further including:
 setting the sound information for the first user based on the input by the user with respect to the setting information.

6. The non-transitory computer-readable recording medium according to claim 4, the process further including:
setting the sound information for a group of the chat room based on the input by the user with respect to the setting information.

7. The non-transitory computer-readable recording medium according to claim 4, wherein the ringtone or the calling tone is set as a ringtone or a calling tone for the user based on the input by the user with respect to the setting information.

8. The non-transitory computer-readable recording medium according to claim 7, wherein
the sound information includes information pertaining to the calling tone, and
the calling tone is set by the first user,
the process further includes
displaying the information pertaining to the calling tone based on the input by the user with respect to the setting information, and
setting the calling tone set by the first user as a calling tone for the user based on the input by the user with respect to the information pertaining to the calling tone.

9. The non-transitory computer-readable recording medium according to claim 1, the process further including:
playing a music piece based on the sound information based on an input by the user with respect to the call information displayed in the chat room.

10. The non-transitory computer-readable recording medium according to claim 9, the process further including:
if an application capable of playing the music piece is not installed in the terminal, displaying, on the display unit, information pertaining to a downloading of the application based on the input by the user with respect to the call information displayed in the chat room.

11. The non-transitory computer-readable recording medium according to claim 1, wherein the sound information includes information that differs between the user and the first user.

12. The non-transitory computer-readable recording medium according to claim 11, wherein
the chat room displayed at the terminal displays information pertaining to a calling tone set by the first user as the sound information, and
the chat room displayed at the first terminal displays information pertaining to a ringtone set by the first user as the sound information.

13. The non-transitory computer-readable recording medium according to claim 11, wherein
the chat room displayed at the terminal displays information pertaining to a calling tone or a ringtone set by the user as the sound information, and
the chat room displayed at the first terminal displays information pertaining to a calling tone or a ringtone set by the first user as the sound information.

14. The non-transitory computer-readable recording medium according to claim 1, wherein the call information includes the sound information if the sound information is set, and information pertaining to setting the sound information if the sound information is not set.

15. The non-transitory computer-readable recording medium according to claim 1, the process further including:
displaying, in the chat room, first call information pertaining to a first call between the user and the first user, and second call information pertaining to a second call between the user and the first user,
wherein one of the first call information and the second call information includes the sound information if a time interval based on the first call and the second call is shorter than a set interval, and the first call information and the second call information include the sound information if the time interval based on the first call and the second call is longer than the set interval.

16. The non-transitory computer-readable recording medium according to claim 1, wherein the call information does not include the sound information if the user is blocked by the first user.

17. The non-transitory computer-readable recording medium according to claim 1, the process further including:
sending the sound information based on an input by the user with respect to the call information.

18. The non-transitory computer-readable recording medium according to claim 1, wherein the sound information includes information of a playlist set by the user or the first user.

19. The non-transitory computer-readable recording medium according to claim 1, wherein the call information includes, if a call has been made between the user and the first user, information pertaining to a duration of the call.

20. An information processing method of a terminal, comprising:
displaying on a display unit of the terminal, a chat room including a user of the terminal and a first user of a first terminal, the first terminal being different from the terminal, and
displaying, in the chat room, call information pertaining to a call between at least the user and the first user,
wherein the call information includes sound information pertaining to a ringtone or a calling tone.

21. A terminal comprising:
a display unit configured to
display a chat room including a user of the terminal and a first user of a first terminal, the first terminal being different from the terminal, and
display, in the chat room, call information pertaining to a call between the user and the first user,
wherein the call information includes sound information pertaining to a ringtone or a calling tone.

* * * * *